(12) United States Patent
Campana, Jr.

(10) Patent No.: US 6,337,628 B2
(45) Date of Patent: *Jan. 8, 2002

(54) OMNIDIRECTIONAL AND DIRECTIONAL ANTENNA ASSEMBLY

(75) Inventor: Thomas J. Campana, Jr., Orland Park, IL (US)

(73) Assignee: NTP, Incorporated, Annandale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/750,147

(22) Filed: Dec. 29, 2000

Related U.S. Application Data

(63) Continuation of application No. 09/382,777, filed on Aug. 25, 1999, now Pat. No. 6,169,485, which is a continuation of application No. 08/982,532, filed on Dec. 2, 1997, now Pat. No. 5,973,601, which is a continuation of application No. 08/605,956, filed on Feb. 23, 1996, now Pat. No. 5,714,937, which is a continuation-in-part of application No. 08/568,416, filed on Dec. 6, 1995, now Pat. No. 5,722,059, and a continuation-in-part of application No. 08/568,434, filed on Dec. 6, 1995, now Pat. No. 5,722,064, and a continuation-in-part of application No. 08/394,263, filed on Feb. 22, 1995, now Pat. No. 5,609,307, and a continuation-in-part of application No. 08/394,267, filed on Feb. 24, 1995, now Pat. No. 5,650,769.

(51) Int. Cl.⁷ .............................................. G08B 23/00

(52) U.S. Cl. ..................................... 340/573.4; 343/741
(58) Field of Search .......................... 340/572.7, 573.4, 340/573.1; 343/741, 789, 833, 866, 912; 342/147, 417

(56) References Cited

U.S. PATENT DOCUMENTS

| 3,568,206 A | * | 3/1971 | Sisson et al. ........... 343/789 X |
| 4,071,835 A | * | 1/1978 | Gross ......................... 342/433 |
| 4,183,027 A | * | 1/1980 | Ehrenspeck ............. 343/789 X |
| 5,280,286 A | * | 1/1994 | Williamson .................. 342/44 |
| 5,371,509 A | * | 12/1994 | Wallace et al. ............. 343/741 |
| 5,714,937 A | * | 2/1998 | Campana, Jr. ........... 340/573.1 |

* cited by examiner

Primary Examiner—Thomas Mullen
(74) Attorney, Agent, or Firm—Antonelli, Terry, Stout 7 Kraus, LLP

(57) ABSTRACT

An antenna assembly providing selectable omnidirectional or directional reception of radio transmissions in a frequency band. The assembly includes an electrically conductive reflector (432) defining a cavity (702) having a bottom (708), an opening (714) and a surface (704 and 706) extending from the bottom to the opening and an electrical output (763) and an electrically conductive loop (431) coupled to ground and having an electrical outlet (766) for coupling to an RF amplifier (407), the loop being positioned between the bottom opening of the cavity.

1 Claim, 38 Drawing Sheets

OMNI TO SMALL APERTURE ANTENNA SWITCH

TIME SAMPLES BY DSP BEFORE RECONSTRUCTION

TIME SAMPLES BY DSP AFTER RECONSTRUCTION

FIG. 35

FREQUENCY (f) = 920 MHz

DISTANCE IN :

| FEET | MILES | FREE SPACE LOSS |
|------|-------|-----------------|
| 100  | 0.019 | 61.4 dB |
| 300  | 0.057 | 70.9 dB |
| 500  | 0.095 | 75.4 dB |
| 700  | 0.133 | 78.3 dB |
| 900  | 0.170 | 80.5 dB |
| 1100 | 0.208 | 82.2 dB |
| 1300 | 0.246 | 83.7 dB |
| 1500 | 0.284 | 84.9 dB |
| 1700 | 0.322 | 86.0 dB |
| 1900 | 0.360 | 87.0 dB |
| 2300 | 0.436 | 88.6 dB |
| 3000 | 0.568 | 90.9 dB |
| 4000 | 0.758 | 93.4 dB |
| 5000 | 0.947 | 95.4 dB |
| 5280 | 1.000 | 95.9 dB |

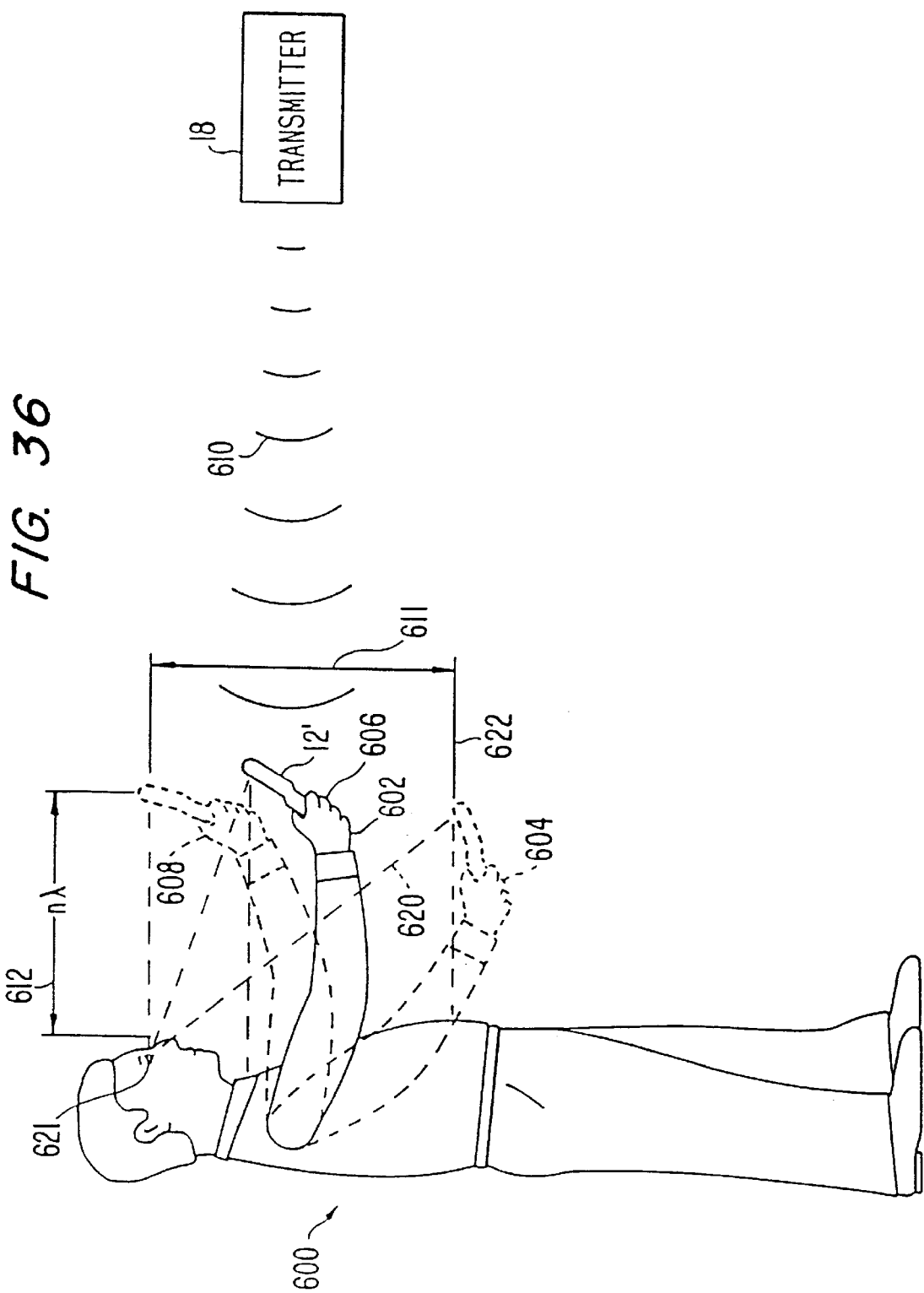

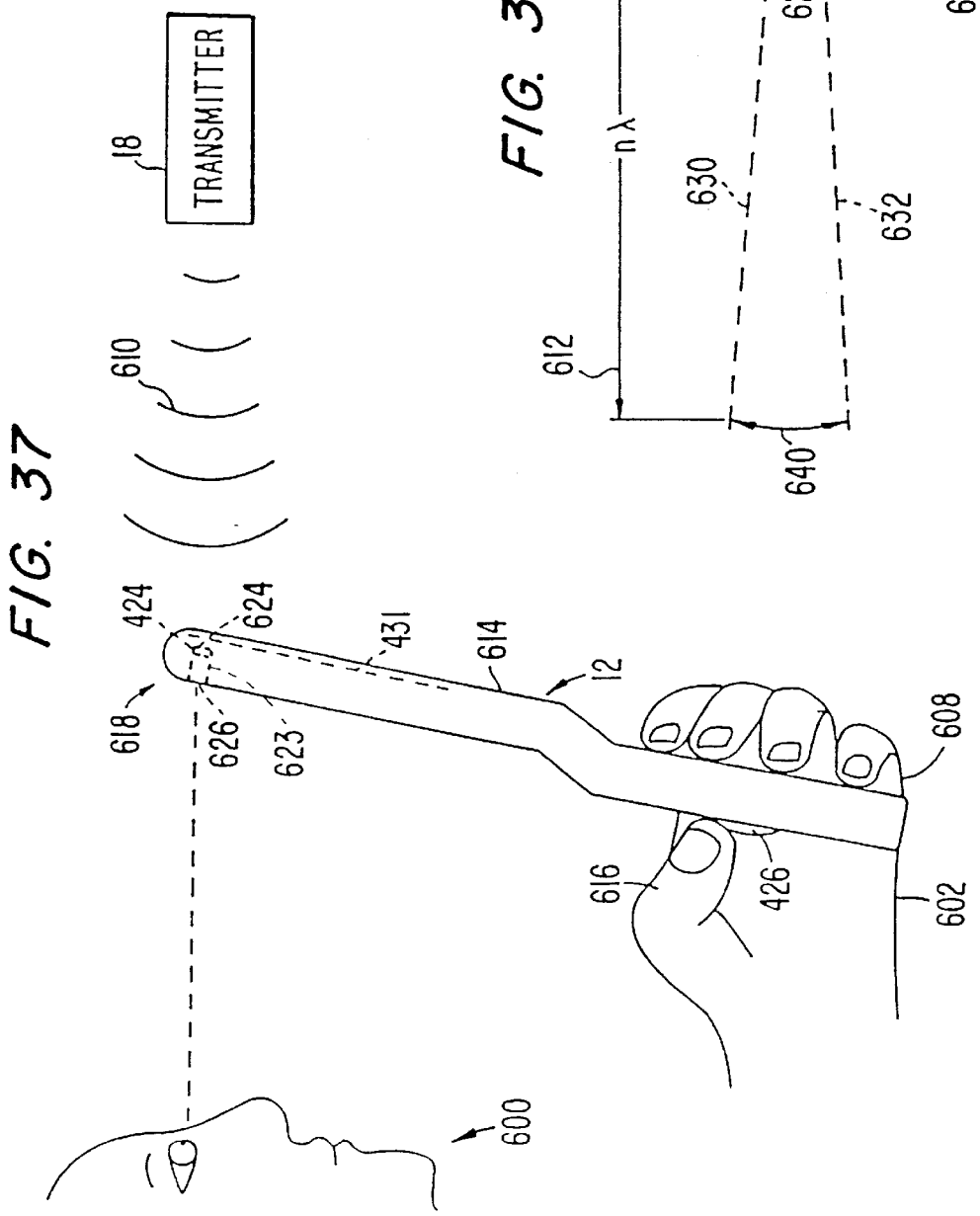

LOOP / REFL ASSEMBLY

OMNIDIRECTIONAL AND DIRECTIONAL ANTENNA ASSEMBLY

CROSS-REFERENCE TO RELATED APPLICATIONS

This is a Continuation Application of Ser. No. 09/382,777, filed Aug. 25, 1999, now U.S. Pat. No. 6,169,485; which is a Continuation of Ser. No. 08/982,532, filed Dec. 2, 1997, now U.S. Pat. 5,973,601; which is a Continuation Application of Continuation-In-Part application Ser. No. 08/605, 956, filed Feb. 23, 1996, now U.S. Pat. No. 5,714,937, issued Feb. 3, 1998, which is a Continuation-In-Part Application of U.S. Pat. application Ser. No. 08/568,416, filed Dec. 6, 1995, now U.S. Pat. No. 5,722,059, issued Feb. 24, 1998, entitled "Radio Receiver For Use In a Radio Tracking System and Method of Operation Thereof", and of U.S. application Ser. No. 08/568,434, filed Dec. 6, 1995, now U.S. Pat. No. 5,722,064; issued Feb. 24, 1998, entitled "Radio Receiver For Use In a Radio Tracking System"; and of U.S. application Ser. No. 08/394,263, filed Feb. 22, 1995, now U.S. Pat. No. 5,609,307, and of U.S. application Ser. No. 08/394,267, filed Feb. 24, 1995, now U.S. Pat. No. 5,650,769, which applications are incorporated by reference in their entirety.

Reference is made to U.S. patent application Ser. No. 08/386,060, filed Feb. 7, 1995, now U.S. Pat. No. 5,751,773, issued May 12, 1998, entitled "System for Wireless Serial Transmission of Encoded Information", U.S. patent application Ser. No. 08/385,312, filed Feb. 7, 1995, now U.S. Pat. No. 5,742,644, issued Apr. 21, 1998, entitled "Receiving Circuitry for Receiving Serially Transmitted Encoded Information", and U.S. patent application Ser. No. 08/385, 143, filed Feb. 7, 1995, now U.S. Pat. No. 5,694,428, issued Dec. 2, 1997, entitled "Transmitting Circuitry for Serial Transmission of Encoded Information" all filed on Feb. 7, 1995, which applications are Continuations-in-Part of U.S. application Ser. No. 08/112,256, filed Aug. 26, 1993, entitled "Information Transmission System and Method of Operation", now U.S. Pat. No. 5,446,759; which is a Continuation-In-Part of U.S. application Ser. No. 07/850, 275, filed Mar. 12, 1992, entitled "Low Power Information Transmission System Having High Information Transmission and Low Error Rates and Method of Operation" (now abandoned); Ser. No. 07/850,276, filed Mar. 12, 1992, entitled "High Speed, Low Power and Low Error Information Receiver and Method of Operation" (now abandoned); and Ser. No. 07/850,487, filed Mar. 12, 1992, entitled "Low Power Information Transmission and Receiving System Having High Information and Low Error Rates and Method of Operation" (now abandoned), which applications are incorporated herein by reference in their entirety.

TECHNICAL FIELD

The present invention relates to radio tracking systems for locating a mobile radio transmitter and for determining if the mobile radio transmitter has moved outside of a set range measured from a radio receiver and to mobile radio transmitters which transmit an alarm of a user of the radio transmitter to a radio receiver, and methods of operation thereof.

BACKGROUND ART

Parents are becoming increasingly concerned that their children may be harmed when they are out of their sight. Almost daily the media reports events involving small children being harmed when the small children have wandered from sight of their parents. Furthermore, in today's increasingly mobile society families with small children regularly visit malls, amusement parks and other public places where crowds of people are found which provide an environment where small children can be harmed or become lost or wander from sight of their parents because of their natural inquisitiveness, tendency to explore their surroundings, or their desires to be free from control of their movements by their parents.

Devices are commercially available to limit or monitor movements of children. Devices exist for tethering children to their parents. Further radio systems are commercially available which generate an alarm when children move outside a radius from a radio receiver which receives transmissions from a transmitter worn by children. The tethering devices have a limited restraint radius and create animosity between a child and the parents. The radio systems have a fixed radius of approximately fifteen feet which is too small to permit useful monitoring if a parent does not wish to totally keep a child in sight and cannot be used for tracking.

Numerous radio tracking systems have been proposed which utilize radio communications to locate a mobile radio transmitter and/or to determine when a mobile radio transmitter carried by a person has exceeded a set range measured from a radio receiver. These systems have one or more radio transmitters which broadcast a coded identification of each radio transmitter which is received by a radio receiver and processed to determine the distance and, in some of these systems, the direction between each transmitter and receiver. See U.S. Pat. Nos. 4,785,291, 5115,223, 5,119,072, 5,245, 314, 5,289,163, 5,307,053 and 5,357,259, Patent Application WO 87/06748, U.K. Patent Application GB 2182183A and Japanese Patent Application No. 64-311842. A wide range of implementations of radio tracking systems are described in the above-referenced patents and published applications.

The determination if a mobile radio transmitter has moved out of range from a radio receiver receiving an identification code of the radio transmitter is accomplished in many different ways in these patents and applications. Two ways which are described for determining if a mobile transmitter has moved out of range are by determining if the received identification code signal has dropped below a predetermined signal strength or the received identification code signal has not been received for an elapsed time interval.

Radio communication systems which are designed to determine when a mobile transmitter worn by a person has moved outside of a set range and/or to track a person encounter severe problems because of (1) limitations of transmitter power imposed by the Federal Communications Commission which limit broadcast power below 100 milliwatts, and (2) various environmental factors which cause interference, fading, or signal attenuation of the identification code signal which is periodically sent from the mobile radio transmitter to the monitoring radio receiver. The transmitter identification code signal may be severely attenuated by passage through the bodies or body parts of people or other structures in the line of site between the radio transmitter and the radio receiver. The presence of people and structures in the line of sight causes substantial attenuation of the transmitted identification code signal which may cause the identification code of the radio transmitter to be periodically or permanently attenuated below the discrimination level of the radio receiver causing a false indication that the mobile radio transmitter has moved out of a set range and an inability to further track the mobile radio transmitter.

Furthermore, natural fading phenomena, such as Rayleigh fading, which is a function of the transmitting frequency and the relative velocity between the mobile radio transmitter and radio receiver are severely aggravated by low speed movement, such as when a child or patient is walking with a transmitter attached to their person to facilitate their tracking. These fading phenomena affect the determination if a set range has been exceeded and a direction determination of the transmitter relative to the receiver. Additionally, other man-made interferences, such as electrical noise and multipath interference caused by buildings, can periodically cause the identification code signal transmitted from the radio transmitter to be attenuated to a level below the discrimination level of the radio receiver tracking the transmitter which also causes a false indication that the radio transmitter is outside a set range and/or the inability to track the direction of the radio transmitter movement relative to the radio receiver with a directional antenna.

Error correction code may be transmitted in a frame of bits encoding the identification code of the radio transmitter. One or more frames encoding the identification code of the transmitter may each contain a set number of error correction code bits which are processed by the radio receiver to correct minor bit errors such as one or two bits which occur within the identification code frame bits. One well known error correction code for accomplishing this function is the BCH code.

The serial processing of the bits of frames which contain error correction code is typically implemented with a series of EXCLUSIVE OR gates. When a number of bit errors in a frame exceeds the error correction capacity of error correction code, the data within the frame is erroneous. The prior art methods of wireless data transmission do not permit the recovery of valid data bits from a frame containing a number of bit errors which exceed the bit error correction capacity of the error code therein which error correction capacity, for most types of error correction codes, is two bits.

The cumulative effects of mis-synchronization of a radio receiver to receive transmissions from radio transmitters, Rayleigh fading, and man-made noise noticeably reduces the reliability of current digital radio receivers to receive error free data. A gap in a data transmission in excess of 1 millisecond may cause a radio receiver to terminate the receiving process. In a situation of tracking a radio transmitter with a radio receiver which receives a periodic digital transmission of the radio transmitter's identification code, termination of the receiving process results in the correct identification of the radio transmitter not being received. As a result, the transmission from a radio transmitter which is, in fact, within a set range of a radio receiver which is monitoring the distance of the radio transmitter from the radio receiver is falsely received as being out of range. This results in an erroneous condition of monitoring the distance of the radio transmitter from the radio receiver and further, may cause a panic situation or otherwise cause the person using the radio receiver to not trust the reliability of the radio tracking system.

An analysis of wireless prior art data transmission protocols in accordance with accepted mathematical relationships for their evaluation reveals that they are poorly suited for data transmissions of more than a few characters in length. The following mathematical relationships are used to analyze fading:

Fading Rate $$F_o = SF/670 \tag{1}$$

S=Speed MPH

F=Frequency in MHz $F_o$=Hz

Fade Length $$t = \tfrac{1}{2}\, rF_o\, (e^{+0.693\, r^2} - 1) \tag{2}$$

r=ST/SM Threshold/Median

The threshold ST is the receiver threshold detection level and the median SM is the median field strength level.

Fade Below Threshold $$F_R = 2re^{-0.693\, r^2} F_o \tag{3}$$

Probability of Message Loss $$P(\text{error}) = 1 - e^{\,F_R L P_w} \tag{4}$$

L=Message Time (Length)

$P_w$=Probability of fade larger than catastrophic failure length $P_w = 1.5 e{-}1.1\, t/\bar{t}$ The quantity $\bar{t}$ is the net probability of a fade divided by the mean rate of fading and equals $$\tfrac{1}{2}\, rF_o\, (e^{+0.693\, r^2} - 1) \tag{5}$$

The fading rate $F_o$ is the natural frequency at which atmospheric radio frequency transmissions periodically fade as a function of the channel frequency $F_o$ and the speed of the radio receiver in miles per hour; the fade length t in seconds is the length of fade; the fade below threshold $F_R$ is the time duration in seconds that a transmission drops below the detection capability of the radio receiver; and the probability of message loss $P_{(error)}$ is the probability that a message transmission will not be completed as a result of a loss of synchronism between the data transmission and the receiver. See S. 0. Rice; Statistical Properties of a Sine Wave Plus Random Noise; Bell System Technical Journal, January, 1948; T. A. Freeburg; An Accurate Simulation of Multipath Fading; Paper; 1980; Caples, Massad, Minor; UHF Channel Simulator for Digital Mobile Radio; IEEE VT-29; May 1980; and P. Mabey, D. Ball; Application of CCIR Radio Paging Code No. 1; 35th IEEE V.T. Conf.; May 1985 for a discussion of the above-referenced equations.

U.S. Pat. No. 4,868,885 discloses the rapid measurement of a received signal strength indicator (RSSI signal) generated from reception of a received radio frequency signal which is used in a cellular radio system to control handoff. Samples of the RSSI signal are taken successively in time and compared with the larger of the two samples being stored throughout a desired sampling interval. Sample values exceeding the value obtained from an immediately preceding sample time and a value obtained from an immediately succeeding sample time are stored twice while samples values that are less than an immediately preceding or succeeding sample value are never stored. The resulting average is very close to a true average signal amplitude and is unaffected by Rayleigh fading phenomena but is responsive to rapid changes in received signal amplitude caused by obstacles in the transmission path.

U.S. Pat. No. 5,193,216 detects when a radio receiver of the type which receives data transmissions is out of range.

The radio receiver responds to a decreasing slope of a RSSI signal after the receiver fails to receive its coded identification code from the transmitter to signal the out of range condition. The '216 Patent discloses sampling the received signal strength coincident with the detection of a predetermined characteristic of the signal, such as the sync code, so that the signal for which the received signal strength is measured is indeed the desired signal. If at the time the sync code is to be detected there is no signal which is detected, a predetermined number of the most recently stored RSSI values are read. If the slope of the stored RSSI values indicates that the radio receiver was moving toward an out of range condition before the loss of reception, a display is generated upon loss of reception indicating that the radio receiver is out of range from the radio transmitter.

Loop antennas and their characteristics are well known. Loop antennas were originally used as directional antennas for direction finding applications. However, loop antennas are now also widely used in miniature radio receivers, such as pagers, as omnidirectional antennas.

To achieve a maximum omnidirectional response with a loop antenna, several design constraints must be observed. Typically, the length of the loop antenna must be less than approximately 0.4 wavelength of the frequency band being received with 0.2 wavelength being optimal; a high ratio of length to diameter of the loop electrical conductor (typically 100:1) is desirable and the loop should be formed into a perfect square. When operated in the aforementioned fractional wavelength configuration, the loop antenna receiving characteristics typically are dependent upon the cross-sectional area of the perfect square of the antenna configuration. This configuration, however, has a low feed resistance (less than 5 ohms) and has a relatively high inductive reactance which must be cancelled with series capacitors inserted into the loop. In high frequency bands, such as 900 MHz., even a single turn loop of a loop antenna may have 200–300 ohms of inductive reactance.

Directional beam antennas are known which use multiple active and passive elements in a configuration typically having a quarter wavelength between the elements to provide directivity and gain in a plane of the elements. This configuration is not applicable to miniaturized radio products in high frequency bands, such as 900 MHz.

Phased antenna arrays may be used for direction finding applications. Phase arrays typically rely upon tuning networks that change the phase relationship between the receiving elements so as to exhibit, directional characteristics. However, phased arrays are, also not applicable to miniaturized products in high frequency bands, such as 900 MHz.

None of the aforementioned directional antenna configurations are applicable to integration into a miniaturized radio tracking receiver of a small form factor which is ergonomically acceptable to be worn or carried by a person to track mobile objects, such as pets or children.

DISCLOSURE OF INVENTION

The present invention is an improved radio tracking system comprised of a mobile radio frequency receiver and at least one mobile radio frequency transmitter. Each radio frequency transmitter periodically broadcasts a radio frequency carrier which is modulated with an identification code which uniquely identifies the broadcasting radio frequency transmitter which is decoded, by the radio frequency receiver. The radio frequency receiver has an adjustable range control which sets a, maximum range of movement of each radio frequency transmitter measured from the 'radio frequency receiver that is permissible without the generation of an alert that a radio frequency transmitter has exceeded the set, range. The range setting generates a voltage having a numerical value which is compared to a RSSI signal to determine if the set range has ben exceeded. When the radio frequency receiver verifies that an identification code transmitted with a modulated radio frequency carrier is assigned to a radio frequency transmitter which is being tracked or monitored by the radio frequency receiver, the radio frequency receiver generates the RSSI signal which is processed by a processor within the radio frequency receiver to compute an average of successively received RSSI signals from each of the radio frequency transmitters being monitored. The average is compared to the numerical value representing the set range by the processor and the processor alerts the user of the radio frequency receiver when the set range for any receiver is exceeded.

Preferably, each RSSI signal is integrated to remove the effects of electrical noise before averaging. The average of RSSI signals and preferably the average of the integrated RSSI signals generated from transmissions of the radio frequency carriers containing the identification code of each radio frequency transmitter being monitored and tracked are compared to the numerical value representing the set range and an alert is generated by the microprocessor (preferably a digital signal processor) of radio frequency receiver when the comparison reveals that at least one of the at least one radio frequency transmitter is outside the set range.

Preferably, the average of the RSSI signals and the preferred average of the integrated RSSI signals is updated to include newly calculated RSSI signals and preferably, newly calculated integrals of the RSSI signals only when each newly calculated RSSI signal or integral thereof differs from the computed average by less than a function of the average so as to exclude from the computation of the average those RSSI signals or integrals thereof which differ from the average by more than the function. This process discards unreliable and statistically aberrant RSSI signals or integrals thereof which unreliable and statistically aberrant RSSI signals or integrals thereof would interject erroneous data into the range determination process. Phenomenon, such as interference from people in the line of sight, Rayleigh fading, multipath interference, etc., can cause substantial magnitude variation of the magnitude of successively received RSSI signals or integrals thereof which falsely would be interpreted as motion of a radio frequency transmitter outside the set range which is not occurring and which would cause an erroneous alert to be generated that a radio frequency receiver has moved outside the range.

Once the radio frequency receiver determines that a radio frequency transmitter has moved outside the set range, the user may switch the antenna configuration from an omnidirectional antenna to a directional antenna by closing a "find me" switch in the housing of the radio frequency receiver to permit directional tracking by the radio frequency receiver. Also, directional tracking may be performed by closing the "find me" switch any time the user of the radio frequency receiver desires to monitor the position or motion of each radio frequency transmitter being monitored.

A display of the magnitude of successive RSSI signals and preferably, integrals thereof, which are generated in response to the radio frequency receiver detecting the radio frequency carrier containing the identification code of the radio frequency receiver being tracked, is used to locate a direction from which a maximum signal magnitude of the signal radio frequency carrier is being transmitted by the radio frequency transmitter being tracked. The direction from which the maximum magnitude signal is being received, which is detected by displaying the magnitude of a quantity which is a function of individual RSSI signals generated by the reception of sequential transmissions of the identification code of the radio frequency transmitter being tracked is the true bearing of the radio frequency transmitter relative to the radio frequency receiver. A preferred function without limitation is the integral or average signal magnitude of the RSSI signal which has the effects of noise removed.

The present invention further permits a user of each radio frequency transmitter to close a "panic" switch to generate an alert which the user of the radio frequency receiver responds to by closing the "find me" switch to cause the control processor to change the antenna configuration of the radio frequency receiver from an omnidirectional antenna used for tracking all of the radio frequency receivers to a directional antenna to permit directional tracking of the user of the radio frequency transmitter which transmitted the alert to the radio frequency receiver. The directional tracking process by the radio frequency receiver of each radio frequency transmitter transmitting an alert is the same as the tracking function described above when a radio frequency transmitter exceeds the set range.

The processor of the radio frequency receiver further utilizes error correction code which is transmitted with the frames of information encoding the identification code of each radio frequency transmitter which is being monitored or tracked to reconstruct valid data from frames which cannot be corrected using the error correction code. In a preferred embodiment of the invention, an IDENTIFICATION FRAME GROUP, which is comprised of a plurality of frames with each frame containing bits of BCH error correction code and bits of many of the frames encoding the identification code of the radio frequency transmitter and one of the frame encoding the status of the user of the radio frequency transmitter, is processed by the radio frequency receiver to determine if at least one erroneous uncorrectable bit is contained in any of the frames. Those frames containing at least one erroneous uncorrectable bit, which cannot be corrected by processing with the error correction code, are further processed to reconstruct valid data in the frame containing the at least one erroneous uncorrectable bit by searching for a bit pattern of the erroneous uncorrectable bits being totally within the bits of the error correction code bit field. When the bits of the error correction code of a frame totally contain the erroneous uncorrectable bits within the frame, the data which is the identification code, status of the user of the radio frequency transmitter or any other information may be recovered. The bit pattern is a number of successive bits having an identical numerical value of either zero or one with the number being at least one greater than a number of bits which may be corrected with the error correction code in the frame which contains the at least one erroneous uncorrectable bit. As a result of reconstruction of frames by recovering valid data from frames containing at least one erroneous uncorrectable bit, a greater number of radio frequency carriers containing the identification code of the radio frequency transmitters being monitored are-detected. This enables the processing of a greater number of RSSI signals which enhances the data which is processed to determine the range and direction of the radio frequency transmitters being monitored as described above.

In a preferred embodiment of the invention, the identification code of each of the radio frequency transmitters being monitored is encoded in frames containing error correction code. The bits of the frames modulate a subcarrier and the subcarrier modulating the radio frequency carrier. Analog modulation of the subcarrier or digital modulation of the subcarrier may be used. The analog modulation modulates cycles of the subcarrier with bits encoding the plurality of frames of the identification code and any other information such as the information in the IDENTIFICATION FRAME GROUP. Each cycle of the analog subcarrier is modulated by bits at a plurality of separated angular positions. Digital modulation of the subcarrier modulates a pulse width of the subcarrier. The width of parts of the digital subcarrier are modulated with at least one bit of the frames of the information. This form of subcarrier modulation permits the preferred form of data transmission as formatted into the IDENTIFICATION FRAME GROUP to be rapidly transmitted at a low error rate which enhances battery life.

The processing of the detected individual cycles of the subcarrier by the digital signal processor of the radio frequency receiver includes calculating an integral of at least one selected modulated part of each of the individual cycles, numerically comparing each of the calculated integrals with a plurality of stored numerical ranges which ranges each represent one of a plurality of possible numerical values that the selected part may encode to identify a stored range numerically including the calculated integral and substituting for the at least one selected part of each of the cycles the one of the plurality of numerical values representative of the identified stored range including the calculated integral with each numerical value encoding one bit when the subcarrier is an analog subcarrier and at least one bit when the subcarrier is a digital subcarrier. Furthermore, the processing of the detected individual cycles of the subcarrier by the digital signal processor includes calculating the integral by taking a plurality of samples of each selected modulated part of each of the individual cycles with each sample having a numerical value and each sample is compared with a range of numerical values representing a valid sample which should be included within the calculation of the integral and when the comparison reveals that the sample value is outside the range of numerical values, the compared sample value is replaced with a value which is a function of the sample values adjacent the sample value which is replaced. The compared sample value is preferably replaced with a value which is an average of at least one sample value which precedes the compared sample value and at least one sample value which exceeds the compared sample value.

The above-described processes, which are performed by a digital signal processor of the radio frequency receiver for processing the modulated cycles of the subcarrier, ensure that reliable detection of the identification code of each radio frequency transmitter is achieved and reliable data which is a function of the RSSI signal generated during the reception of a valid identification code of one of the radio frequency, transmitter being monitored is used to determine the range and direction of a radio frequency transmitter relative to the radio frequency receiver. The reliability of the range detecting function and further the tracking function of each radio frequency transmitter upon the generation of an alert by the radio frequency receiver when a radio frequency transmitter moves out of range or further when a user of the radio frequency transmitter pushes the panic switch is directly influenced by the reliability of the detection process of the identification code of the radio frequency transmitter. The RSSI signals, which are used ultimately to determine if a radio frequency transmitter has moved outside the set range and further to track the direction of a radio frequency transmitter relative to the radio frequency receiver, are qualified by an accurate and high speed detection of the identification code of each radio frequency carrier which is transmitted from each of the radio frequency transmitters being monitored. Therefore, a highly accurate detection process of the identification code of each radio frequency transmitter by the radio frequency receiver insures that the maximum number of qualified RSSI signals are presented for further processing which enhances the accuracy of the determination if the range set by the user of the radio frequency receiver has been exceeded and further, the accuracy of the detection of the direction of the radio frequency transmitter relative to the radio frequency receiver.

Furthermore, in accordance with the invention, the housing containing the receiver has a display to permit the user of the receiver, who is directionally tracking at least one transmitter transmitting radio transmissions to the receiver, to view the strength of the received radio transmissions to facilitate radio tracking. A field of view limiter is associated with the display and the housing to limit a field of view of the display of the strength of the radio transmissions to within a field of view causing the user of the receiver to hold the receiver at the waist or above and away from the body of the user to minimize radio interference with the: transmissions in the line of sight between the at least one radio transmitter and the receiver. Preferably, the field of view limiter causes the user of the radio receiver to hold the receiver away from the body and at or above chest level. The field of view defined by a pair of straight lines representing light rays; respectively extends from opposed edges of the display to corresponding opposed edges of an opening within the housing. The opening extends inward from an outer surface of the housing to define a recess having a bottom within the housing. The display is mounted on the bottom. The field of view subtends an angle which preferrably is no greater than 45° and preferably 30° or less.

Moreover, a switch for activating the directional antenna of the receiver is positioned relative to the housing so that the hand of the person using the receiver unit to directionally track the at least one transmitter holds the switch in a closed position with the directional antenna being positioned relative to the housing so that during the holding of the with in the closed position a line of sight between the antenna of the receiver and the at least one radio transmitter is not occluded by the hand of the person holding the switch in the second position.

The aforementioned field of view limiter causes the user of the receiver unit to position it relative to the user's body to provide optimal radio reception of low power transmissions from the at least one transmitter being monitored. Reception of low power transmissions is important with the present invention because of its preferred use of small batterys to provide electrical power over many hours of continued use (e.g. 40 hours or more). In this circumstance, the radiated power from the at least one transmitter may be as low as five milliwatts which makes minimizing all forms of interference and positioning of the receiver in an optimal position to provide maximum received signal strength extremely important to achieve maximum distance of reception between the at least one transmitter and the at least one receiver and maximum directional sensitivity.

The positioning of the receiver in a position at or above the waist away from the body of the user provides a spacing of one or more wavelengths of the carrier of the transmissions which minimizes body interference and maximizes the height of the antenna of the receiver which also enhances signal reception. Moreover, positioning of the switch which activates the directional antenna relative to the housing of the receiver which requires the hand of the user to close the switch while the hand is positioned out of the line of sight between the. antennas of the at least one transmitter and the receiver also minimizes interference caused by the user's hand.

Furthermore, the use of frequency hopping spread spectrum transmissions by the receiver and the at least one transmitter permits acceptable and sufficiently accurate matching of identification code digits to qualify the received signal strength indicator signal for further signal processing as described below without a complete match of stored and received identification code digits to achieve a reliable decoding of the identification code. Once a frequency hopping radio frequency receiver is synchronized to hop synchronously with the at least one frequency hopping radio frequency transmitter being monitored for range and/or direction, a partial identification digit match between the transmitted identification code digits and the receiver's stored complete transmitter identification code digits, which the synchronized frequency hopping radio frequency receiver is assigned to monitor, provides statistically reliable decoding sufficient to qualify the corresponding received signal strength indicator signal for further processing which contributes to the generation of a, highly reliable processed signal as described below used for range and/or directional tracking. It is statistically improbably that a receiver will partially decode the identification code digits of a transmitter which is not synchronously frequency hopping with the receiver.

A preferred antenna design for implementing the combined omnidirectional and directional antenna of the radio receiver of the invention in a form factor of a low power hand-held radio receiver is described as follows. The present invention provides an antenna assembly which is small enough to be integrated into a hand-held radio receiver of the present invention to provide the required selectable omnidirectional or directional reception of radio transmissions from mobile objects wearing the miniaturized transmitter of the present invention having a size approximately that of a pager. Omnidirectional reception permits the reception of transmissions from the mobile transmitters of the invention to determine whether each transmitter is inside or outside of the range set by the operator of the receiver. The directional reception has a front to back ratio of at least 10 db. to permit the user of the receiver to visibly determine, by viewing the lighted dots of the direction finding display, a direction of the transmitter relative to the receiver with an approximate resolution (beam width) producing maximum signal response (sensitivity) from 30° to as little as 10° in, for example, high frequency bands such as 902–928 MHz.

The antenna assembly implements the omnidirectional antenna function with a combination of an electrically conductive reflector and an electrically conductive loop. One end of the loop is always coupled to ground and the other end of the loop is coupled to an input of an RF amplifier. The electrically conductive reflector defines a cavity having a bottom, an opening, a surface extending from the bottom to the opening and an electrical output. The loop is positioned between the bottom and the opening of the cavity. The electrically conductive reflector and loop are electrically coupled together by a RF switch and to an input of the RF amplifier during operation as an omnidirectional antenna. The electrical coupling of the reflector is produced by the RF switch closing a conductive path to the loop and further a relatively close spacing between the loop and the reflector which produces mutual coupling via parasitic capacitance. The collective electrical coupling produced by the conductive coupling through the RF switch and the capacitive coupling improves the omnidirectional sensitivity over that achievable with the loop alone.

The antenna assembly implements the directional antenna function with the RF switch electrically coupling the reflector to ground which cuts off side lobes of reception of the loop to provide a highly focused beam width representing a maximum directional antenna response (sensitivity) of between 10° and 30°. This is an optimal beam width for directional tracking of mobile objects, such as children and pets, with the radio receiver of the present invention.

When the antenna assembly is operated between 902 and 928 MHz. with a loop length of approximately 0.4 wavelength, the feed impedance appears to increase to a 20–40 ohm region which further facilitates impedance matching to a standard 50 ohm input impedance of a RF amplifier available in integrated circuit form. Moreover, the overall dimensions of the antenna assembly permit integration into a miniaturized receiver as described herein to monitor the transmitter relative to the set range and direction of the transmitter relative to the receiver to monitor the whereabouts of the objects which may be mobile, such as children, pets, etc.

An antenna assembly providing selectable omnidirectional or directional reception of radio transmissions in a frequency band in accordance with the invention includes an electrically conductive reflector defining a cavity having a bottom, an opening, a surface extending from the bottom to the opening and an electrical output; an electrically conductive loop electrically coupled to ground and having an electrical output for coupling to an RF amplifier, the loop being positioned between the bottom and the opening of the cavity; an RF switch having an input and first and second outputs, the RF switch having a first switching state electrically connecting the input to the first output and a second switching state electrically connecting the input to the second output, the first switch output being electrically coupled to ground and the second switch output being electrically coupled to the output of the electrically conductive loop; and wherein the first switching state provides the directional reception and the second switching state provides the omnidirectional reception of the radio transmissions. A closest separation of the loop from the cavity is preferably not greater than one-tenth of a wavelength of the frequency band of the radio transmissions and more preferably, a closest separation of the loop from the cavity ranges between 0.005 and 0.02 of a wavelength of the frequency band of the radio transmissions. The directional antenna has a beam width producing a maximum signal response to the radio transmissions between 10° and 30°. The electrically conductive loop has a length between the output and the electrical coupling to ground greater than 0.2 of a wavelength of the frequency band and preferably approximately 0.4 of a wavelength of the frequency band; the cavity comprises at least two parts divided by a fold line which is the bottom of the cavity with the fold line being parallel to a directional axis of the directional reception and being a vertex of an oblique angle with first and second parts of the at least two parts of the cavity being sides of the oblique angle with ends of the first and second parts spaced from the vertex defining the opening of the cavity. Furthermore, the invention includes a circuit board having the RF amplifier mounted thereon with the electrical output of the electrically conductive loop coupled to the RF amplifier with the circuit board being located further from the electrically conductive loop than the vertex.

A preferred frequency band of operation of the antenna is between 902 to 928 MHz; a closest separation of the loop from the cavity preferably ranges between 0.1 and 0.2 inches; the loop is rectangular in cross section when viewed into the opening; and the directional antenna has a beam width producing a maximum signal reception of the radio transmissions between 10° and 30°. The reflector, when viewed from the opening, is rectangular in cross section and has a width and a length across the width and length of the cross section which are less than 2.5 inches; and the loop, when viewed from the opening, is rectangular (preferably square) in cross section and has a width and a length across the width and length of the cross section which are less than 2 inches; and the loop is centered symmetrically with respect to the bottom of the reflector.

The antenna assembly further comprises a radio receiver containing the antenna assembly, the RF amplifier, a digital signal processor, coupled to the RF amplifier and a display, coupled to the digital signal processor, for displaying a received signal strength indicator. The digital signal processor controls switching of the first and second switching states and is responsive to a command to operate the antenna assembly as either an omnidirectional antenna during which the digital signal processor compares the received signal strength indicator representing the radio transmissions to a numerical value representing a set range between a radio transmitter broadcasting the radio transmissions and the radio receiver and generates an alert when-the comparison reveals that the radio transmissions are received from the radio transmitter outside the set range or a directional antenna during which the digital signal processor drives the display to display a relative magnitude of the received signal strength indicator so that the display of the magnitude of the received signal strength indicator is usable for direction finding of the transmitter relative to the radio receiver.

BRIEF DESCRIPTION OF THE DRAWINGS

FIG. 12 illustrates the digital modulation of the subcarrier of FIG. 10B to encode groups of a plurality of bits in each half cycle of the subcarrier.

FIG. 35 is a table of free space loss as a function of separation distance between a radio frequency transmitter and the radio frequency receiver.

FIG. 36 illustrates a range of positions of the radio receiver unit of the present invention relative to the body of a user to obtain optimal radio reception of transmissions, in a line of sight with at least one transmitter.

FIG. 37 illustrates optimal positioning of the receiver unit to obtain maximum signal reception of the transmissions from the at least one transmitter and optimal positioning of a user's hand relative to an on/off switch of the directional antenna and a line of sight between the directional antenna of the receiver unit and an antenna of the at least one transmitter.

FIG. 38 illustrates a preferred embodiment of a field of view limiter of the display of the received signal strength of the transmissions from the at least one transmitter.

Like reference numerals identify like parts throughout the drawings.

BEST MODE FOR CARRYING OUT THE INVENTION

Figure 1:
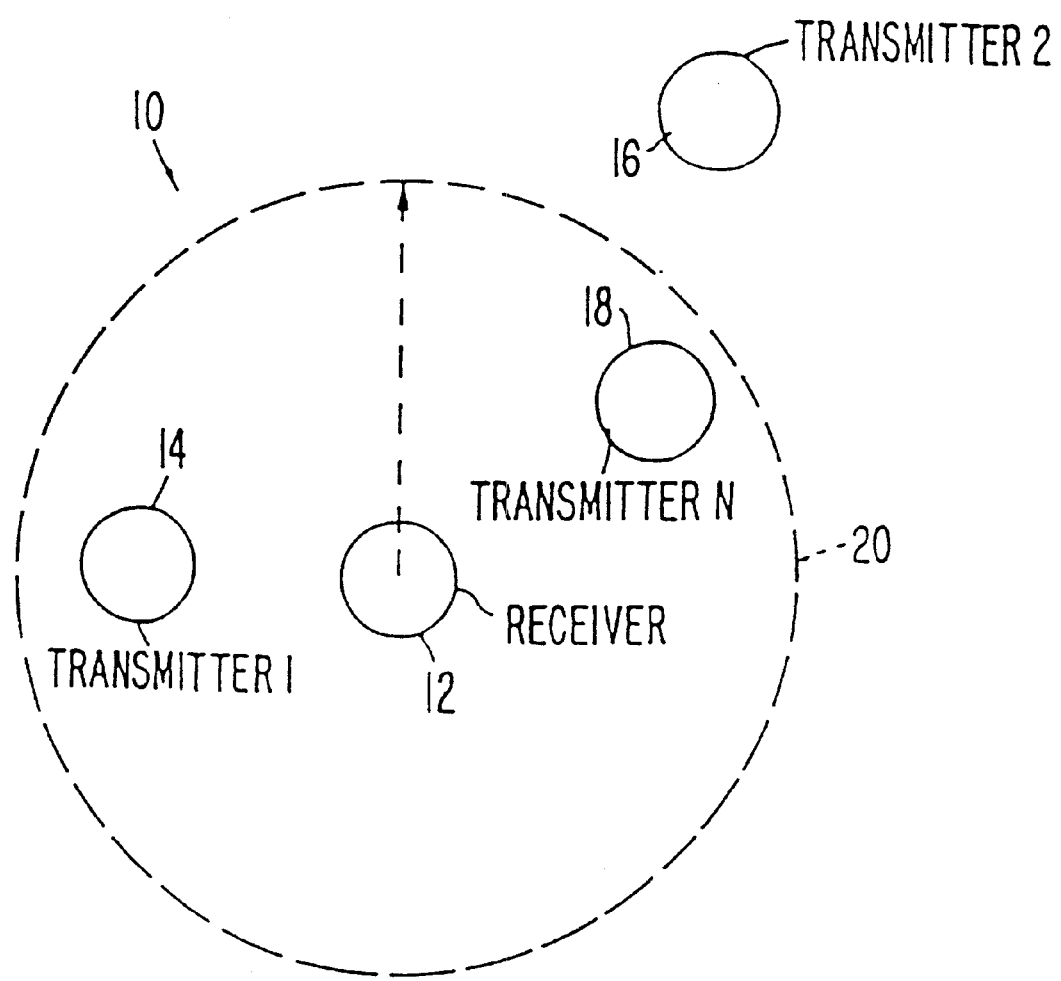
FIG. 1 illustrates a system diagram of the present invention.
Figure 3:
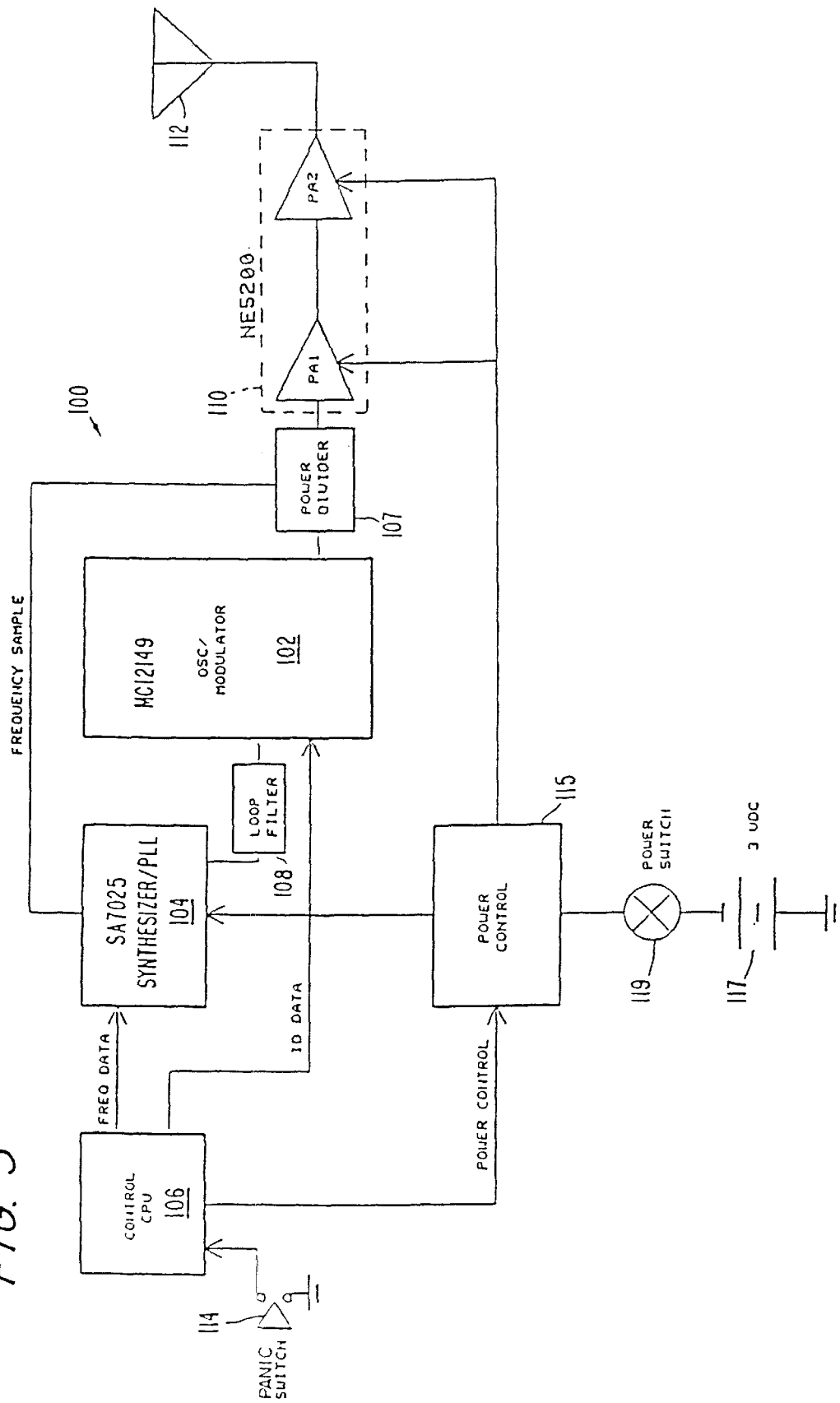
FIG. 3 is a block diagram of a preferred embodiment of a radio frequency transmitter in accordance with the present invention.

FIG. 1. illustrates a system diagram of a radio tracking and ranging system 10 in accordance with the present invention. The system is comprised of a radio receiver 12 and a variable number of radio frequency transmitters 14–18. The designation "N" of radio frequency transmitter 18 indicates that the total number of radio frequency transmitters which could be monitored and tracked within the system 10 may be any desired number. In a preferred embodiment of the invention described below, only two radio frequency transmitters are tracked by a single radio frequency receiver. The detailed description of the architecture and operation of a preferred embodiment of the radio frequency receiver 12 is described in conjunction with FIGS. 14–32 below and a preferred embodiment of the radio frequency transmitters 14–18 is described in conjunction with FIGS. 3–13 below. The radio tracking and ranging: system 10 has the capability, in the embodiment described below, with the radiated power of the radio frequency transmitters limited to 100 milliwatts or less in accordance with power limiting regulations of the Federal Communications Commission for unlicensed wireless applications to detect radio frequency transmitters 14, 16 and 18 at a range which is calculated to be adjustable to possibly one mile measured from the radio frequency receiver 12. The radio tracking and ranging system 10 further has the capability of tracking the direction of each radio frequency transmitter 14, 16 and 18 relative to the radio receiver 12 when either the radio frequency receiver determines that one or more of the radio frequency transmitters has moved outside of a set distance 20, which is variable by setting the range control 420 of the preferred embodiment 400 of the radio frequency receiver illustrated in FIG. 14 as described below which causes the radio receiver to generate an alert, or when the user of one or more of the radio frequency transmitters 14, 16 or 18 has generated an alert by pushing the panic switch 114 in the preferred embodiment 100 of the radio frequency transmitter as illustrated in FIG. 3 as described below. Each radio frequency transmitter 14, 16 and 18 is assigned an identification code which uniquely identifies it from other radio frequency transmitters being monitored and tracked by the radio frequency receiver 12. Each radio frequency transmitter 14, 16 and 18 periodically transmits its unique identification code to the radio frequency receiver 12. Detection of the identification code qualifies the RSSI signals used for determining if the set range 20 has been exceeded or for tracking the direction of the radio frequency transmitter relative to the radio frequency receiver as discussed below. The identification code may be periodically transmitted, such as ten times per second, to the radio frequency receiver 12. The radio frequency receiver 12 uses the decoding of the identification code to qualify processing of each RSSI signal representing the signal strength received at the antenna of the radio frequency receiver of each radio frequency carrier which is detected and is determined to contain a valid identification code of one of the radio frequency transmitters assigned to the radio frequency receiver to determine the range and the direction of the radio frequency transmitters relative to the radio receiver 12 as described below. The identification code is preferably encoded in at least one IDENTIFICATION FRAME GROUP as discussed below in conjunction with FIG. 9. Each of the radio frequency transmitters 14, 16, and 18 preferably uses spread spectrum frequency hopping of the radio frequency carriers. Each carrier is modulated with identification code of the transmitter, such that each radio frequency transmitter repeatedly broadcasts its identification code on a cycling sequence of fifty frequencies. The frequency hopping sequence of the radio frequency carrier is used to avoid interference between other radio transmitters also using a radio frequency carrier to encode their identification codes with the IDENTIFICATION FRAME GROUP of FIG. 9. Each of the radio frequency transmitters is preferably programmed to have the same sequence of frequencies with the transmissions of different transmitters being monitored at different times by the radio frequency receiver. The probability of multiple radio frequency transmitters synchronously hopping through the same sequence of radio frequency carriers is so small that the probability of interference between the radio frequency carriers is small.

The radio frequency receiver 12 performs a sequence of signal processing operations which substantially enhances the ability of the radio frequency receiver to detect the identification code from each of the mobile transmitters 14, 16 and 18 and further, upon detection of each identification code, processing operations which preferably include calculation of an integral of the qualified RSSI signals, as described below, to eliminate electrical noise therein and to further preferably compute an average of successive integrations of the RSSI signal. The average of the integrations of the RSSI signals accurately represents the actual received signal strength to which a numerical value representing the set range 20 is compared to determine if any of the radio frequency transmitters 14, 16 and 18 are within or outside the variable set range as illustrated in FIG. 1. Furthermore, in a preferred embodiment 400 of the radio frequency receiver 12, as described below, successive integrations of the RSSI signal are not used in the calculation of the average of the integrations of the RSSI signal when they differ by more than a function of the average which, without limitation, may be a percentage of the average of the integrated RSSI signals such as twenty percent. Upon detection that any one of the radio frequency transmitters 14, 16 and 18 is outside the set range 20 by a determination that the average of the integrated RSSI values of identification code transmissions from each of the radio frequency transmitters broadcasting a valid identification code is less than the voltage representing the variable radius 20 produced by the range control 420 of FIG. 14, the radio frequency receiver 12 may be switched by a user depressing the "find me" switch 426 of FIG. 14 to receive subsequent radio frequency carriers containing a valid identification code from the radio frequency transmitter which is outside the set range 20 with a directional antenna as described below. The radio frequency receiver 12 during the first portion of the monitoring operation in which it determines if any of the radio frequency transmitters 14, 16 and 18 is outside of the set variable range 20 utilizes an omnidirectional antenna to receive radio frequency carriers containing the valid identification codes which are transmitted from all of the radio frequency transmitters.

However, when the radio frequency receiver 12 determines that any of the radio frequency transmitters 14, 16 and 18 have moved outside of the variable set range 20 or, alternatively, any of the users of the radio frequency transmitters have indicated a change in their status by pushing the "panic" switch as described below, the radio frequency receiver is switched to receive the subsequent transmissions of the identification codes with the radio frequency carrier with a directional antenna. The magnitude of each individual RSSI signal which is qualified by reception of a valid identification code of the radio frequency transmitter being tracked is displayed by the radio frequency receiver 12 to provide information enabling the user of the radio frequency receiver to rotate the radio frequency receiver to an orientation which produces a maximum display of the successive integrated RSSI signals as described below in conjunction with FIG. 2. The RSSI signal is preferably integrated to remove the effects of noise as described below. The direction of the radio frequency transmitter 14, 16 or 18, relative to the radio frequency receiver 12 from which the greatest magnitude RSSI signals are sequentially generated by the reception of valid identification codes is the true bearing of the radio frequency receiver.

Figure 2:
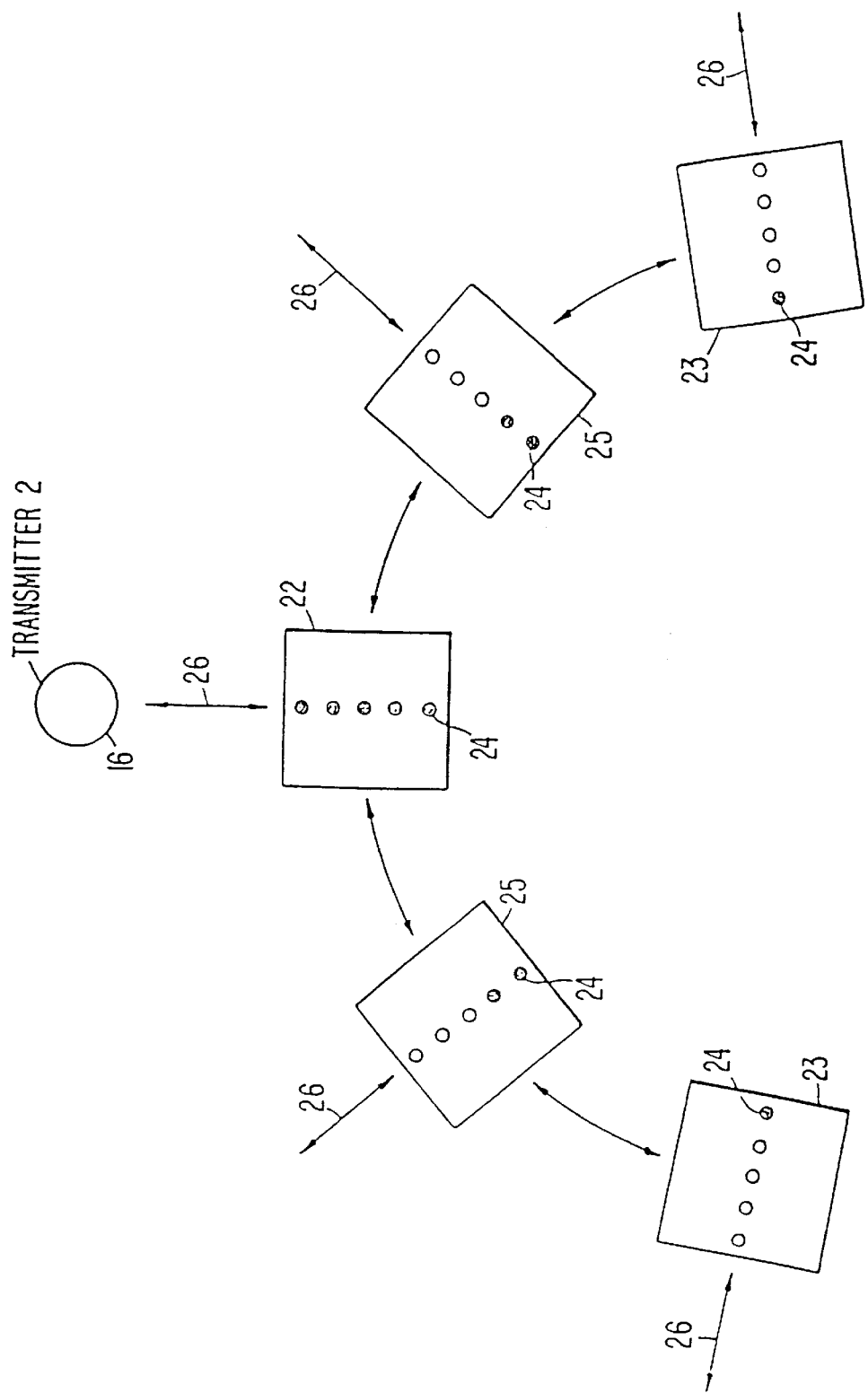
FIG. 2 illustrates the methodology of how the display of the radio frequency receiver is used to locate the directional orientation of a radio frequency transmitter being tracked in accordance with the present invention.

FIG. 2 illustrates how the display by the radio frequency receiver 12 of the magnitude of the integrated sequence of RSSI signals is used by the user of the radio frequency receiver to track the direction of the transmitter 16 which is outside the set range 20 of FIG. 1 by use of the directional antenna relative to the radio frequency receiver. The display of the magnitude of each integrated RSSI signal, which is not the average of the integrated RSSI signals calculated during monitoring with the omnidirectional antenna to determine if the set range 20 has been exceeded, drives a magnitude indicator of the display which is a series of lighted dots 24, such as those generated by LCDs or LEDs, to display the magnitude of each integrated RSSI signal produced in response to each reception of each valid identification code from the radio frequency transmitter being tracked. As illustrated in FIG. 2, the maximum number of dots 24 is activated in display 22 when the axis 26 of the directional antenna is directly pointed toward the radio frequency transmitter 16 which is beings tracked. While a maximum number of dots 24 are illustrated as being activated in display 22, it should be understood that depending upon the distance of the radio frequency receiver 12 from the radio frequency transmitter 16, a lesser number of the dots would typically be activated. The displays 23 and 25, which are generated when the axis 26 is not directly pointed at the radio frequency transmitter 16, have a lesser number of dots 24 activated which is a function of the misalignment of the axis 26 of the directional antenna from direct alignment with the radio frequency transmitter 16 as in display 22. It should be understood that the relative magnitude of the display of each successive integrated RSSI signal will vary depending upon the alignment by the user of the radio frequency receiver 12 of the axis 26 of the direction antenna toward the radio frequency transmitter 16 being tracked and/or relative motion occurring between the radio frequency transmitter. The signal processing described above and below eliminates the effects of interference and fading, etc., to minimize the display of erroneous magnitudes of the RSSI signals to provide highly accurate information useful for locating the direction of radio frequency transmitter 16 relative to the radio frequency receiver 12. The display of the magnitude of each integrated RSSI signal, without the averaging used to determine when the set range 20 is exceeded as explained above, permits motion of the radio frequency transmitter 16 relative to the radio frequency receiver 12 to occur without an unacceptable time lag occurring in the display of the radio frequency receiver representing the true direction of the radio frequency transmitter relative to the radio frequency receiver. Furthermore, it should be understood that the illustration of the display 22 showing a maximum number of the dots 24 activated when there is true alignment of the directional antenna axis 26 with the radio frequency transmitter 16 and a minimum number of the dots 24 being activated in display 23 when there is a misalignment by 90° of the directional antenna axis with the radio frequency transmitter is only intended for purposes of illustrating how direction finding is accomplished. Namely, as the user of the radio frequency receiver 12 rotates the axis of the directional antenna 26 toward true alignment with the radio frequency transmitter 16 from the positions represented by displays 23 and 25, an increasing number of the individual dots 24 are activated in direct proportion to the magnitude of each integrated RSSI signal generated from each of the qualified successive transmissions of the identification code of the radio frequency transmitter which are received by the radio frequency receiver.

The radio frequency receiver 12 is designed to initially be clipped to the belt of the person, such as an adult, tracking the position of two children. Furthermore, the radio frequency transmitters 14, 16 and 18 may have a belt loop which prevents quick removal of the radio frequency receiver 12 from a child when, for example, an adult tries to defeat the tracking ability of the tracking system 10. Both the radio frequency receiver 12 and the radio frequency transmitters 14, 16 and 18 are designed to be powered with rechargeable batteries to provide up to a possible 40 or more hours of use between battery changes.

Figure 14:
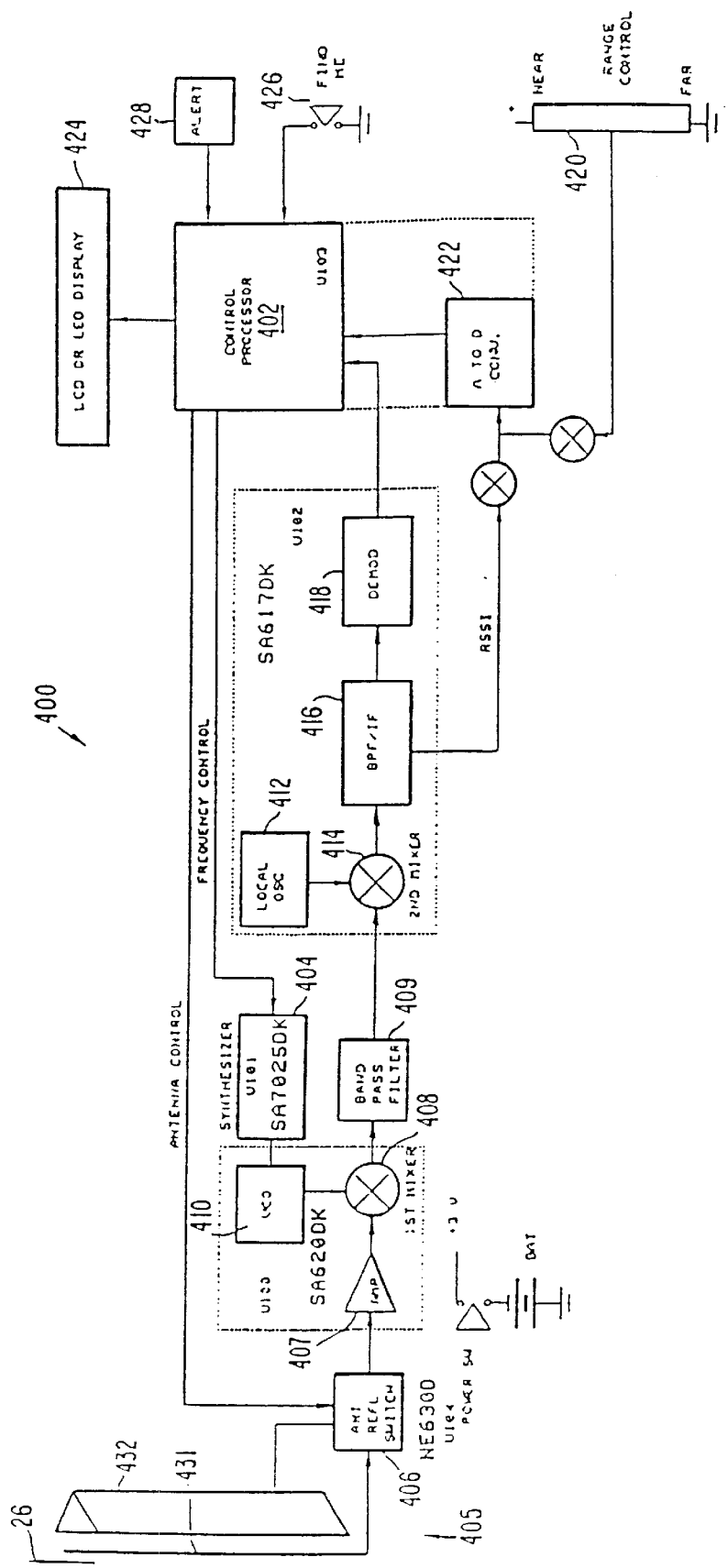
FIG. 14 is a block diagram of a preferred embodiment of a radio frequency receiver in accordance with the present invention.

After the receipt of either a panic alarm, as generated by a user of the radio frequency transmitters 14, 16 and 18 caused by closing of the "panic" switch 114 of FIG. 3, or the detection by the radio frequency receiver 12 of the radio frequency transmitter being outside the set range 20 by preferably averaging the integrated RSSI signals while discarding aberrant integrated RSSI signals from being included in the average of the integrals and comparing the average of the integrated RSSI signals to a set voltage representing the set range, the user of the radio frequency receiver 12 causes switching of the antenna of the radio frequency receiver from an omnidirectional antenna configuration used for tracking all of the radio frequency transmitters 14, 16 and 18 to a true directional antenna having the axis 26 by closing the "find me" switch 426 of FIG. 14. After closing the "find me" switch, in accordance with programming in the radio frequency receiver control CPU, which is preferably a digital signal processor, only a single one of the radio frequency transmitters is tracked, such as the radio frequency transmitter 16 of FIG. 1 which has exceeded the set range 20. Alternatively, the invention may be practiced with the switching of the antenna configuration from an omnidirection to a directional configuration under the control of the control CPU 106 of FIG. 3 without closing the "find me" switch 426

Tracking of only one radio frequency transmitter 14, 16 and 18 with the radio frequency receiver 12 at a time is desirable to avoid the possibility of movement of the radio frequency receiver during tracking of one radio frequency transmitter causing another out of range condition to occur when the set range 20 is exceeded between the radio frequency receiver and another radio frequency transmitter. This would then create the undesirable circumstance of making it difficult to track the direction of the first radio frequency transmitter which, in this circumstance, is radio frequency transmitter 16 being outside the set range 20.

The radio frequency receiver digital signal processor, as part of the preferred process for averaging of the integrated RSSI signals, discards any integration of a RSSI signal calculated from a single transmission of an identification code from a radio frequency transmitter when that integrated value exceeds or is less than the average integrated value by a function of the average of the calculated integrals. This methodology excludes from the computation of the average of the calculated integrals newly calculated integrals which differ from the average of the calculated integrals by more than the function. The function may be a constant, a percentage of the magnitude of the average of the calculated integrals, a scaler which varies in magnitude in accordance with the magnitude of the average of the RSSI signals or integrated RSSI signals or any other mathematical expression which is designed to include only those integrated RSSI signals or non-integrated RSSI signals in the computation of the average used to determine if the set distance 20 has been exceeded which represent valid signal strengths. This methodology of discarding selected integrations of the RSSI-signals or RSSI signals lessens the effects of Rayleigh fading and other fading phenomena from influencing the calculation of the average of the RSSI signals or integrals thereof which can cause the average to fluctuate in a manner which is not indicative of true distance of the radio frequency transmitter 14, 16 or 18 from the radio frequency receiver 12 as is discussed below in conjunction with FIGS. 31 and 32. The threshold amount of the function between the magnitude of the calculated average of the integrated RSSI signals and a single new RSSI signal or integral thereof generated by the transmission of a single identification code from a transmitter to the receiver 12 may vary but it is believed that an amount of 20% or less of the average risk sufficient to insure the discarding of unreliable and statistically aberrant integrations of the RSSI signal which are indicative of invalid range data.

The assumption is that because the range of the tracking capability of the system 10 is many hundreds of feet, a difference by an amount, such as 20% between the average of the integrated RSSI signals or RSSI signals used to compute the average and a single integrated RSSI signal or RSSI signal, would represent a physically impossible motion of the radio frequency transmitter 14, 16 or 18 relative to the radio frequency receiver 12 especially given the fact that the periodic broadcast of the identification codes may be many times a second. In other words, if a small child or an adult is being tracked, it would be physically impossible for their motion to occur representing a significant percentage of the maximum range 20 which may be tracked by the radio frequency receiver 12 between successive samples. Furthermore, the set threshold function between the average of the integrated RSSI signals or the RSSI signals used to compute the average and the integrated value of each successive integrated RSSI signal or the RSSI signal may be less than 20% especially when the frequency of transmitting individual identification codes from each of the radio frequency transmitters 14, 16 and 18 to the radio frequency receiver 12 is at a relatively high frequency, such as ten times per second, as described above.

FIG. 3 illustrates a block diagram of a preferred embodiment 100 of a radio frequency transmitter 12 in accordance with the present invention. The radio frequency transmitter 100 may be implemented with the circuits illustrated in and described below in conjunction with FIGS. 4–8 in association with the source code of columns 155–167 of U.S. Pat. No. 5,714,931. The radio frequency transmitter 100 is designed to utilize 900 MHz. spread spectrum technology which periodically transmits its identification code, as described above, preferably with utilization of the protocol, as described below, in conjunction with FIG. 9 and as generally described in U.S. patent application Ser. No. 08/386,060, filed Feb. 7, 1995, entitled "System for Wireless Serial Transmission of Encoded Information", U.S. patent application Ser. No. 08/385,312, filed Feb. 7, 1995, entitled "Receiving circuitry for Receiving Serially Transmitted Encoded Information" now U.S. Pat. No. 5,742,644, and U.S. patent application Ser. No. 08/385,143, filed Feb. 7, 1995, entitled "Transmitting Circuitry for Serial Transmission of Encoded Information" now U.S. Pat. No. 5,694,428.

The functional blocks of the radio frequency transmitter 100 illustrated in the block diagram of FIG. 3 may be implemented with commercially available integrated circuits as identified in FIG. 3 and in FIGS. 4–8. However, it should be understood that the invention may be practiced using other circuits, including integrated circuits, than those illustrated in FIGS. 4–8. The main components of the radio frequency transmitter are: oscillator/modulator 102, synthesizer/phase lock loop 104, control CPU 106, which is preferably a digital signal processor, power divider 107, loop filter 108, power amplifier 110, "panic" switch 114, power control 115, batteries 117 which may be rechargeable and power switch 119.

Figure 7:
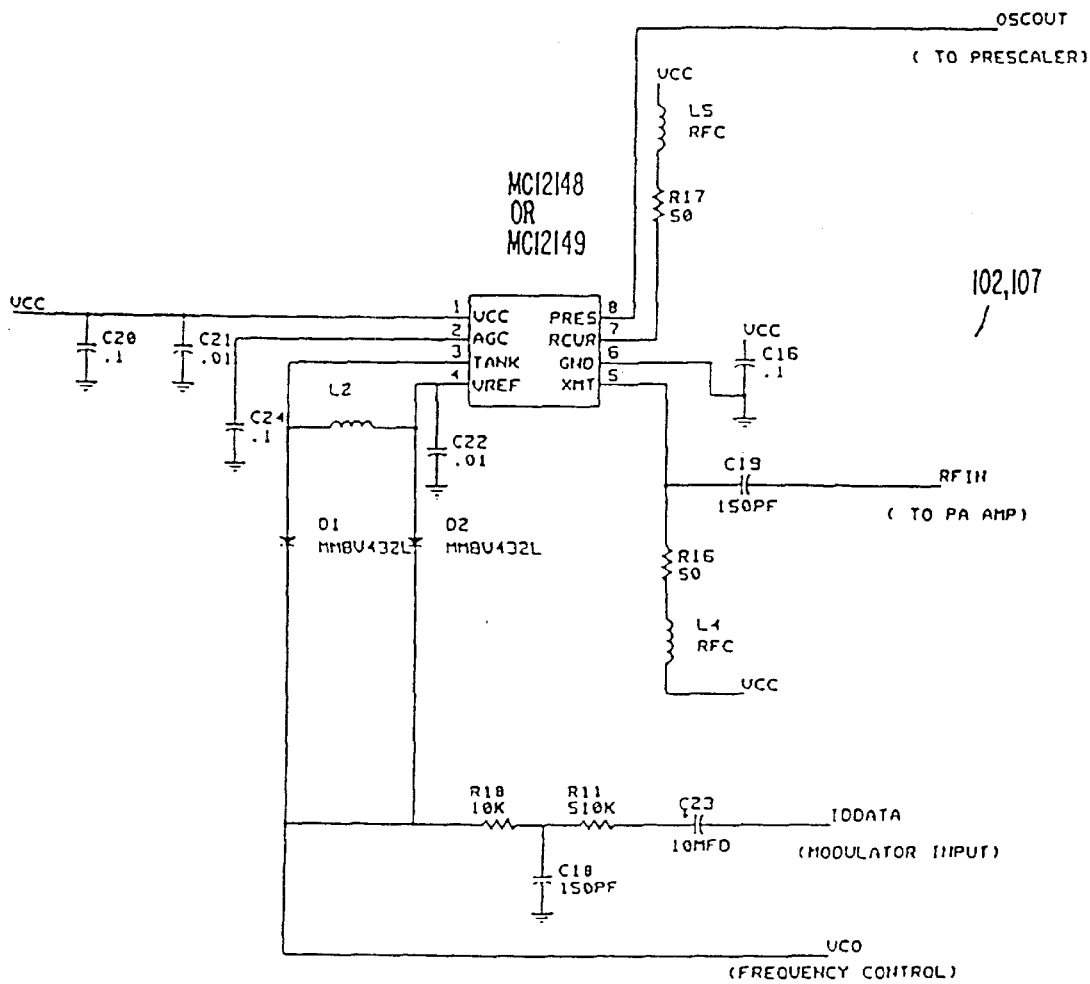
FIG. 7 is a circuit diagram of a preferred oscillator modulator and power divider of the radio frequency transmitter of FIG. 3.

The oscillator/modulator 102 functions as a 900 MHz. oscillator which includes buffering electronics and functions as a modulator to encode the identification information of the protocol as described below in conjunction with FIG. 9. FIG. 7 illustrates a preferred circuit for implementing the function of the oscillator/modulator 102. The frequency of oscillation of the oscillator/modulator 102 is determined by an inductor which, with parasitic capacitance that is present within the integrated circuit board containing the transmitter, forms a tank circuit which produces the rest frequency of the oscillator. The rest frequency is varied by variable magnitude DC voltage which is an input of a pin of the integrated circuit of FIG. 7 from the control CPU 107. The DC voltage modulates the frequency of the oscillator/modulator 102 to produce the sequential incrementing of the radio frequency carrier frequency in a stair step fashion by the synthesizer/phase lock loop 104 to sequentially change the frequency of the radio frequency carrier modulated with a subcarrier modulated with the IDENTIFICATION FRAME GROUP of FIG. 9 to avoid interference with other transmitters. The oscillator/modulator 102 produces the fifty different transmitting frequencies which are used sequentially as the radio frequency carriers to broadcast successive IDENTIFICATION FRAME GROUPS of FIG. 9 containing the transmitter identification code and the status of the "panic" switch 114. The carrier frequency jumps approximately in a range between 100 milliseconds and 400 milliseconds to a new transmitting frequency to broadcast each successive IDENTIFICATION FRAME GROUP. A modulation input pin of the integrated circuit of FIG. 7 provides the methodology for encoding the protocol as described below in conjunction with FIG. 9 to the oscillator/modulator 102 from the control CPU 106. Multistage buffers are provided within the oscillator/modulator 102 to prevent loading of the oscillator/modulator sections and to provide an approximate fifty ohm output impedance for direct coupling to the power divider 107 that immediately follows. A reference oscillator is contained within the oscillator/modulator 102.

Figure 6:
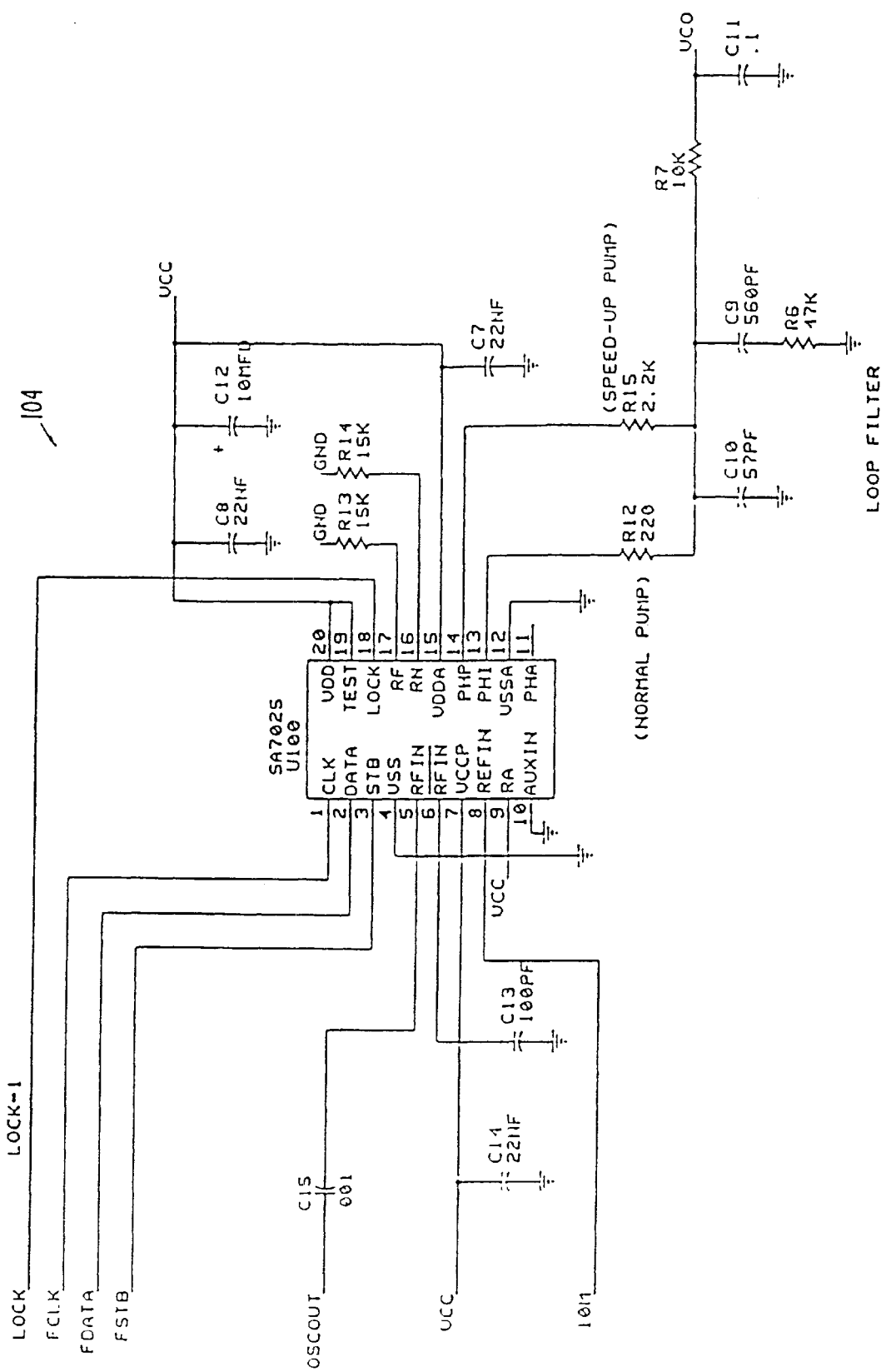
FIG. 6 is a circuit diagram of a preferred synthesier/phase lock loop of the radio frequency transmitter of FIG. 3.

The synthesizer/phase lock loop 104 is a digitally programmable 900 MHz. synthesizer and phase lock loop circuit. FIG. 6 illustrates a preferred circuit for implementing the function of the synthesizer/phase lock loop 104. A prescaler is also contained within the synthesizer/phase lock loop 104 to take a sample of the oscillator frequency and compare it to the preprogrammed frequency programmed by the control CPU 106 to determine if any frequency error exists. Upon determination of any frequency error, a DC control voltage is varied and is sent through the loop filter 108 (to negate the effects of the modulation) to return the rest frequency of the oscillator/modulator 102 to the desired frequency. The synthesizer/phase lock loop 104 is dynamically programmable to any frequency in the 902–928 MHz. band and is under direct digital control of the control CPU 106. The synthesizer/phase lock loop 104, upon being programmed by the control CPU 106, sends a DC control voltage, corresponding to the desired frequency of the fifty frequencies within the staircase of frequencies used to sequentially broadcast the IDENTIFICATION FRAME GROUP of FIG. 9, to the oscillator/modulator 102. As soon as the oscillator/modulator's frequency is sampled and compared by the phase comparator with the desired frequency, a lock on frequency signal is sent to the control CPU 106 to indicate that the radio frequency transmitter is on the proper frequency and is prepared to receive modulation information from the control CPU of the IDENTIFICATION FRAME GROUP of FIG. 9. The synthesizer/phase lock loop 104 contains a master crystal oscillator. The reference frequency of the master crystal oscillator is then utilized for comparison by the phase lock loop of the synthesizer/phase lock loop 104 to the preprogrammed frequency to generate a control voltage to vary the frequency as needed.

The power divider 107 immediately following the oscillator/modulator 102 is an integral part of a closed loop that determines the transmitting frequency of the transmitter. FIG. 7 illustrates a preferred circuit for implementing the function of the power divider 107. The power divider 107 provides impedance matching and removes a portion of the power from the oscillator/modulator 102 for return to the synthesizer/phase lock loop 104 for sampling of the transmitted frequency. The power divider 107 has discrete components that provide the correct impedance match between the oscillator/modulator 102, the power amplifiers 110, as described below, and an input to the prescaler of the synthesizer/phase lock loop. The power derived from the oscillator/modulator 102 buffered output is a few milliwatts. An amount of this power (less than 50%) is removed for frequency sampling by the synthesizer/phase lock loop 104. The remainder of the power obtained from the oscillator/modulator 102 is outputted to the first stage PA1 of power amplifier 110.

Figure 8:
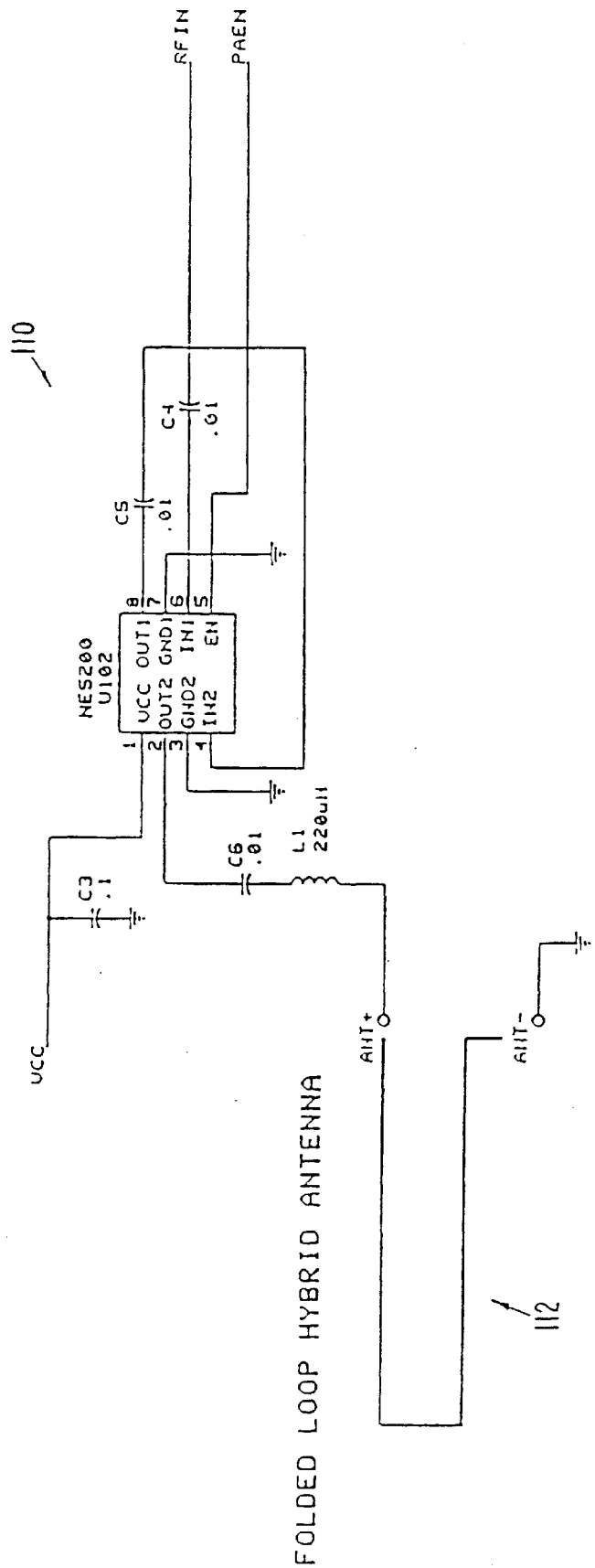
FIG. 8 is a circuit diagram of a preferred power amplifier and antenna of the radio frequency transmitter of FIG. 3.

The power amplifier 110 consists of two stages PA1, as referred to above, and PA2, which amplify the output signal from the power divider 107 to a power level of approximately 100 milliwatts. FIG. 8 illustrates a preferred circuit for implementing the power amplifier 110 and the antenna 112 which is a folded loop hybrid antenna. Each stage PA1 and PA2 of the two-stage power amplifier 110 has a fifty ohm input impedance and output impedance which minimizes the number of coupling components required. The integrated circuit, which implements the power amplifier 110, has a power control pin that permits the amplifiers to be placed in a deactivated state to conserve battery power when not in use.

The antenna 112 is a loop and is made from a relatively heavy gauge wire and a portion of the printed circuit foil that provides the equivalent of a loaded fifty ohm quarter wave antenna. This type of antenna design provides an omnidirectional pattern that is affected minimally by circuit board influences and has a high radiation efficiency. The antenna design is such that it is broad band in its operation and therefore, will operate over a wide transmitting bandwidth as required for the frequency hopping technique of spread spectrum technology utilized in the radio frequency transmitter 100.

Figure 4:
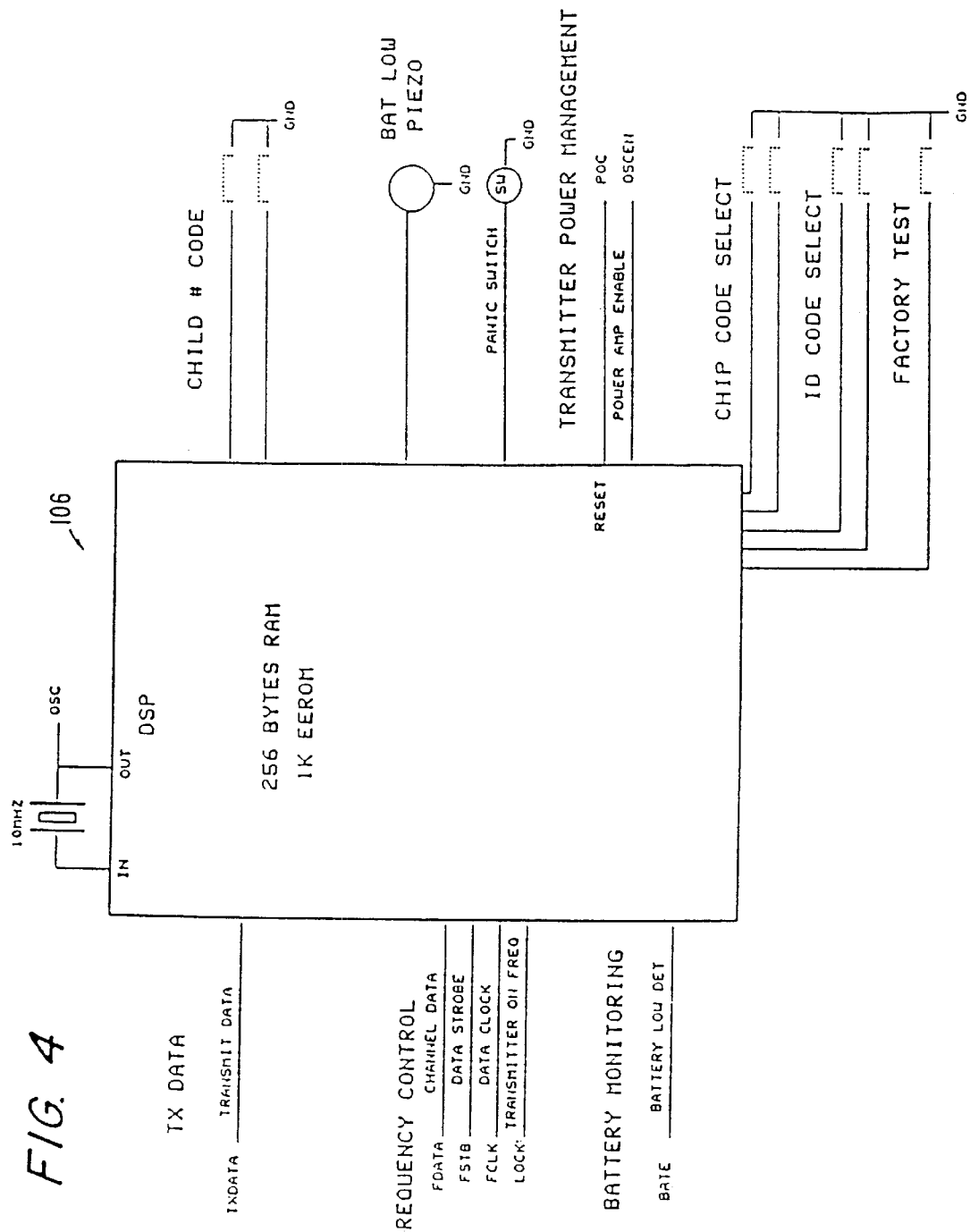
FIG. 4 is a circuit diagram of a preferred control CPU of the radio frequency transmitter of FIG. 3.

The control CPU 106 is preferably a digital signal processor. FIG. 4 illustrates a preferred circuit for implementing the function of the control CPU 106. The digital signal processor, which is used to implement the control CPU 106, preferably includes a multitude of functional components to provide the processing functionality required to provide the bits or groups of bits which encode the IDENTIFICATION FRAME GROUP of FIG. 9 and to modulate the subcarrier with the IDENTIFICATION FRAME GROUP bits or groups of bits as described below in conjunction with FIGS. 10A, 10B, 11 and 12. The modulated subcarrier modulates each of the fifty radio frequency carriers. The modulated radio frequency carriers transmit information which is used by the radio frequency receiver 12 for determining the distance and location of the radio frequency transmitter 100 in mobile applications such as finding children relative to the radio frequency receiver. The digital signal processor contains a high speed microprocessor, random access memory, programmable read only memory, input/output ports, watchdog and reset electronics and all of the supervisory inputs to control the functionality of the transmitter 100.

FIG. 4 illustrates a functional block diagram of the numerous control functions which the digital signal processor performs to accomplish the tasks which the CPU 106 must perform. The digital signal processor has strap selectible inputs that determine the operating sequence of carrier frequencies modulated with the subcarrier modulated with the IDENTIFICATION FRAME GROUP of FIG. 9 on which each radio frequency transmitter of the plurality of radio frequency transmitters 14, 16 and 18 will broadcast. Additional jumpers determine the unique identification code of each radio frequency transmitter 14, 16 and 18 that is utilized by the radio frequency receiver 12 as described below to enable the radio frequency receiver to differentiate each of the radio frequency transmitters from which the radio frequency receiver 12 may be receiving identification code transmissions as part of the tracking and ranging process. A test jumper is also included for initial factory adjustment and servicing as required. The digital signal processor controls a piezoelectric transducer that alerts the user of the radio frequency transmitter via a series of beeps when the battery voltage is low indicating that the battery should be recharged, as described below, in conjunction with FIG. 13. An input "panic" switch of FIG. 4 permits the user of the radio frequency receiver 12 to perform the function of "panic" switch 114 of FIG. 3 that may be used by the user of the radio frequency transmitter, as described above, to alert the user of the radio frequency receiver 12, which would typically be an adult in the case of tracking children, that the user of the radio frequency transmitter wishes to be found or requires assistance.

The digital signal processor also performs all of the necessary transmitter power management functions to maximize the battery lifespan between recharging cycles. To accomplish this objective, the digital signal processor during periods of non-transmission, shuts down all unnecessary circuits to perform power conservation.

Additional data ports provide digital data control for the synthesizer/phase lock loop 104 as described above which are necessary for programming of the desired and next desired radio carrier frequency frequencies when operation in a frequency hopping mode of 'spread spectrum technology is used. The digital signal processor also has an input data line that indicates status of the synthesizer/phase lock loop 104. When a new operating frequency has been sent to the synthesizer/phase lock loop 104, the digital signal processor waits for a lock on signal, as described below in conjunction with FIG. 13, via a data line to indicate that the synthesizer/phase lock loop has programmed the oscillator/modulator 102 and that the oscillator therein is on the correct operating frequency. Upon receipt of the lock on signal, the digital signal processor continues to perform the necessary powerup steps to prepare and send the protocol, as described below, in conjunction with FIG. 9 and FIG. 13.

The digital signal processor also has a logic input that permits monitoring of the status of the batteries. Upon change of logic level of the monitoring input, the digital signal processor will generate alert tones to indicate to the user of the radio frequency transmitter 100 that the batteries are in need of recharging.

The digital signal processor also maximizes the battery lifespan by performing numerous tasks which improve the operating efficiency of the radio frequency transmitter 100. Only those portions of the circuits of the radio frequency transmitter 100 which must be operational at any given time are turned on by the digital signal processor. For example, the digital signal processor, during its off duty cycle, remains in a low power consumption state and upon a predetermined timing cycle, commences the power up operation to permit the radio frequency transmitter 100 to transmit. The digital signal processor first turns on the power to the synthesizer/phase lock loop 104. The digital signal processor forwards via a serial data bus the desired frequency in the form of data to the synthesizer/phase lock loop 104. Immediately following programming of the synthesizer/phase lock loop 104, the digital signal processor turns on the power to the oscillator/modulator 102. The digital signal processor then awaits a verification that the oscillator of the oscillator/modulator 102 has achieved the correct operating frequency via the lock on signal from the synthesizer/phase lock loop 104. The digital signal processor then enables the power amplifiers 110 and after a predetermined period of time, commences sending the digital data encoding the protocol, as described below in FIG. 9 and in detail FIG. 13, to the modulator of the oscillator/modulator 102. Upon completion of the transmission of the identification code data of the radio frequency transmitter 100 contained in the format of the IDENTIFICATION CODE FRAME of FIG. 9, discussed below, the digital signal processor begins an orderly shut down of the power amplifier 110, oscillator of the oscillator/modulator 102 and synthesizer of the synthesizer/phase lock loop 104.

At all times the digital signal processor monitors the "panic" switch of FIG. 4 and the battery voltage. When the "panic" switch is pressed, the digital signal processor immediately implements a powerup sequence (as previously described) and modifies the transmitted data within the command field CB of the IDENTIFICATION CODE FRAME, as described below in conjunction with FIG. 9, to update the panic status of the panic switch.

Figure 5:
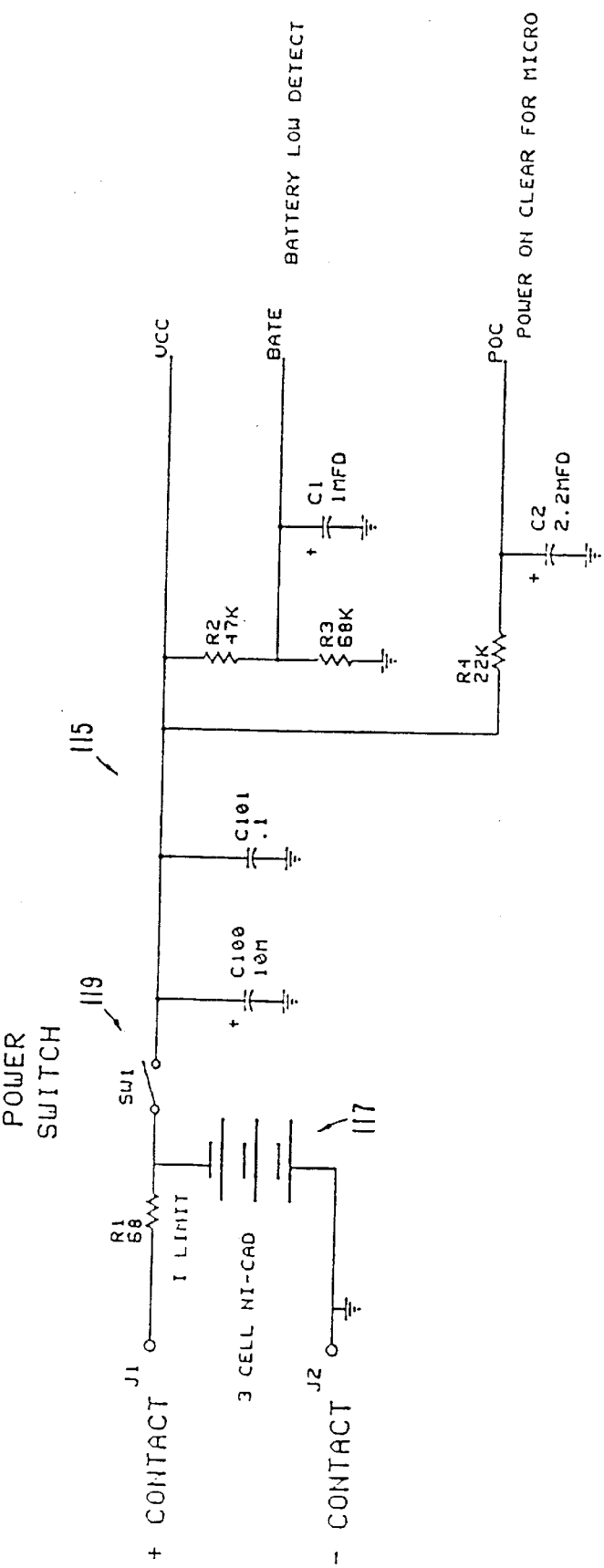
FIG. 5 is a circuit diagram of a preferred power control and power supply of the radio frequency transmitter of FIG. 3.

The power control 115 connects the batteries 117 through the power switch 119 to the various circuit components described above in conjunction with FIG. 3. FIG. 5 illustrates a preferred circuit for implementing the function of the power control 115.

Figure 9:
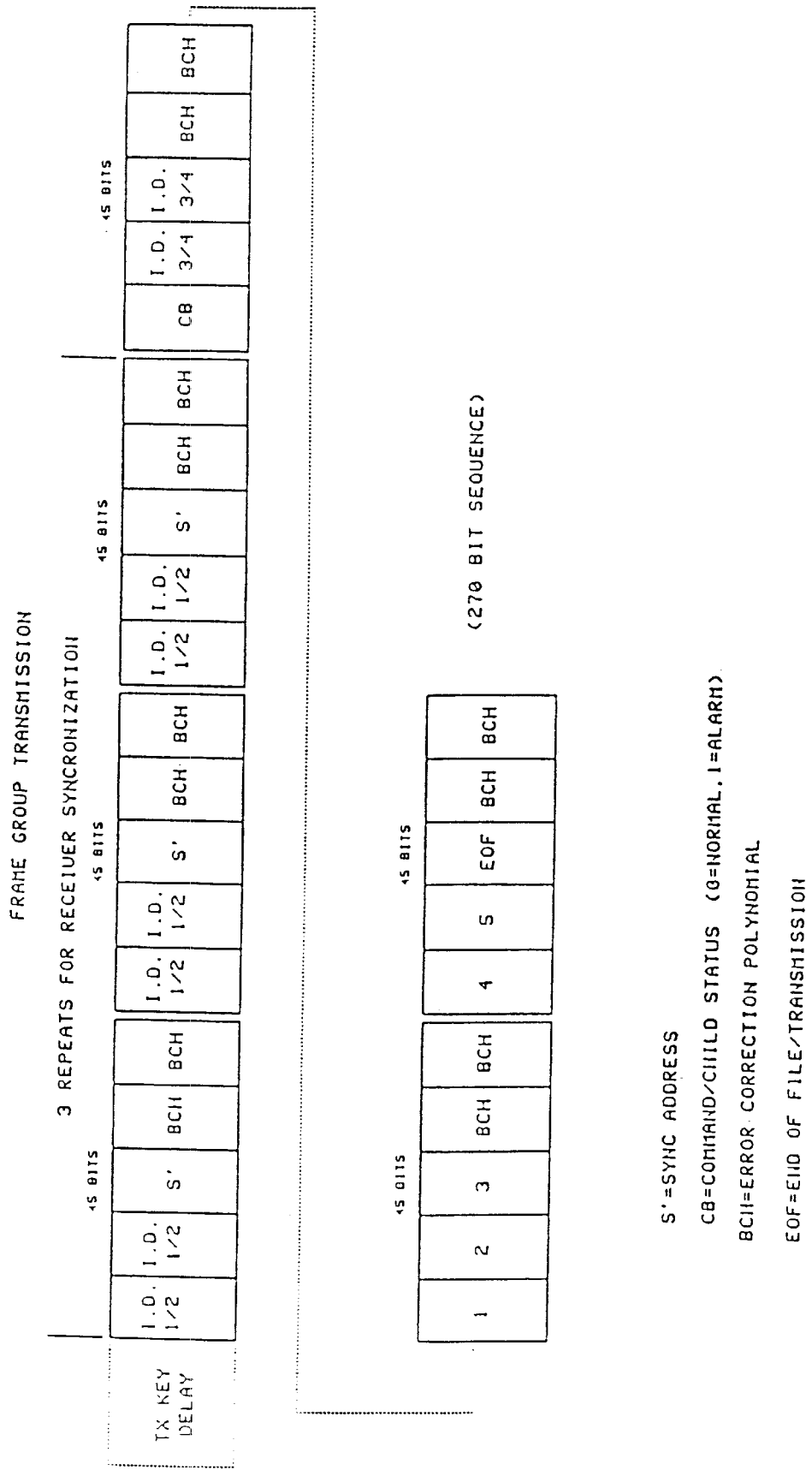
FIG. 9 illustrates a preferred protocol used for sending the identification code of the radio frequency transmitter and the status of the user of the radio frequency transmitter to a radio frequency receiver in accordance with the present invention.

FIG. 9 illustrates an IDENTIFICATION FRAME GROUP which is an example of a preferred serial protocol for encoding the identification code of the radio frequency transmitter 100, the command encoding the open or closed status of the "panic" switch 114 and other control information or data which is desired to be transmitted from the radio frequency transmitters 14, 16 and 18 to the radio frequency receivers 112. The information is transmitted in time from left to right. The IDENTIFICATION FRAME GROUP transmission is comprised preferably of six frames which are each comprised of forty-five bits. Each frame is comprised of twenty one bits of error correction code which respectively is represented in labelled blocks of ten and eleven bits identified by the label "BCH". However, it should be understood that the invention is not limited to the use of BCH error correction code. Twenty one bits define the bit field of the error correction code. The bits which are not contained in the error correction code bit field are referred to as other bits and represent data to be processed after error code processing is completed with the error correction code bits being discarded. The preceding three bit groups of each frame contain groups of eight bits. The first two eight bit groups within the first three frames each contain a repeat of eight bits of identification information which uniquely identify the first two digits of the transmitter identification code of the radio frequency transmitter transmitting the IDENTIFICATION FRAME GROUP transmission. Each block labelled "I.D." contains two four bit nibbles respectively encoding the first two base ten digits of the transmitter unique identification which, along with the other identification nibbles labelled "three/four" in frame four collectively uniquely identify each radio frequency transmitters transmitting the identification code information and other information to the radio receiver 12. The three eight bit groups, which respectively are contained in the first three frames, contain a standard sync address S' which is repeated three times as indicated to synchronize the clock of the radio frequency receiver microprocessor to decode the IDENTIFICATION FRAME GROUP.

The S'/ID fields are binary serial data used by the radio frequency receiver 12 to detect the identification code and the command field CB which encodes the status of the "panic" switch 114. The digital signal processor of the radio frequency receiver 12, as described below, looks for a bit pattern match that matches the preprogrammed synchronization information S' and the ID digits of the identification code of the transmitter. When a match occurs, the radio frequency receiver 12 turns on the balance of its electronics and begins the decoding process as described below. After the repeat three times of a frame containing two digits of identification code and the sync address S', the fourth frame of the ID frame group contains an eight bit command field CB which may contain a command to the radio frequency receiver 12 that there has been a change in status of the user by closing the "panic" switch 114 of the radio frequency transmitter or another commandos) to specify other functions to be performed by the radio frequency receiver. The programming of the command field CB to reflect a change in status of the "panic" switch 114 is produced in response to the closing of the panic switch 114 of FIG. 3. The fourth frame further includes four four-bit nibbles which encode identification digits three and four of the identification code of the transmitter, which are contained in the-next two groups of eight bits after the command field CB followed by two groups of ten and eleven bits making up the twenty-one bits of error correction code as described above. The fifth frame contains three data units of eight bits which may be used for diverse functions such as the transmission of additional information or commands from the radio frequency transmitter 100 to the radio frequency receiver 12. The fifth frame also contains the BCH code as described above. Finally, the sixth frame contains two additional eight bit groups encoding data units four and five each having eight bits which may contain data of the same general function as described in conjunction with frame five. Finally, an end of frame marker EOF of eight bits is contained in the sixth frame followed by the BCH error correction code as described above.

Figure 10A:
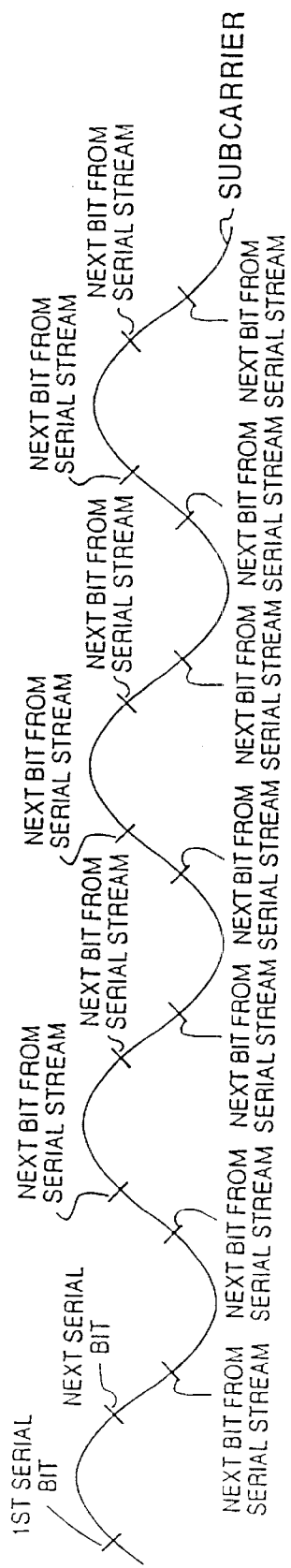
FIGS. 10A and 10B respectively illustrate analog and digital modulation of a subcarrier which is preferably used to encode protocol of FIG. 9.
Figure 10B:
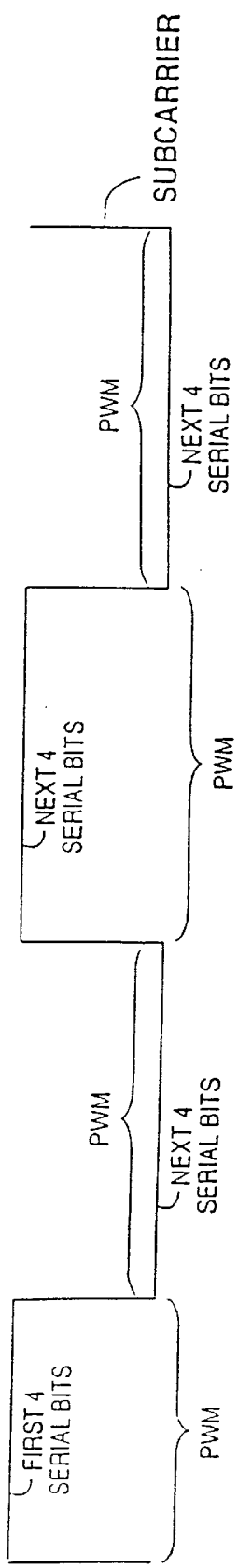

The bits encoding the IDENTIFICATION FRAME GROUP frame group of FIG. 9 modulate a subcarrier as stated above which may be analog or digital. The modulated analog subcarrier may be a sinusoidal waveform as illustrated in FIG. 10A and the modulated digital subcarrier may be a squarewave as illustrated in FIG. 10B. Moreover, the number of bits encoding the IDENTIFICATION FRAME GROUP of FIG. 9, which may modulate each cycle of the subcarrier, may be varied from the four bits per cycle of FIG. 10A and the four bits per half of cycle of FIG. 10B. The high speed integration capability of the digital signal processor used in the radio frequency receiver 12, as described below, consequent from high clock speed and a Harvard architecture permits multiples of the number of bits encoded on each cycle illustrated in FIG. 10B and especially the sinusoidal subcarrier of FIG. 10A to be achieved with the invention. The modulation of the subcarrier in either an analog or digital format with the IDENTIFICATION FRAME GROUP provides a very high speed data throughput of up to thirty-eight kilobaud which is significant in saving battery power by reducing the time required to transmit the IDENTIFICATION FRAME GROUP which is an important consideration for the utility of tracking mobile radio frequency transmitters over a long period of time.

Figure 11:
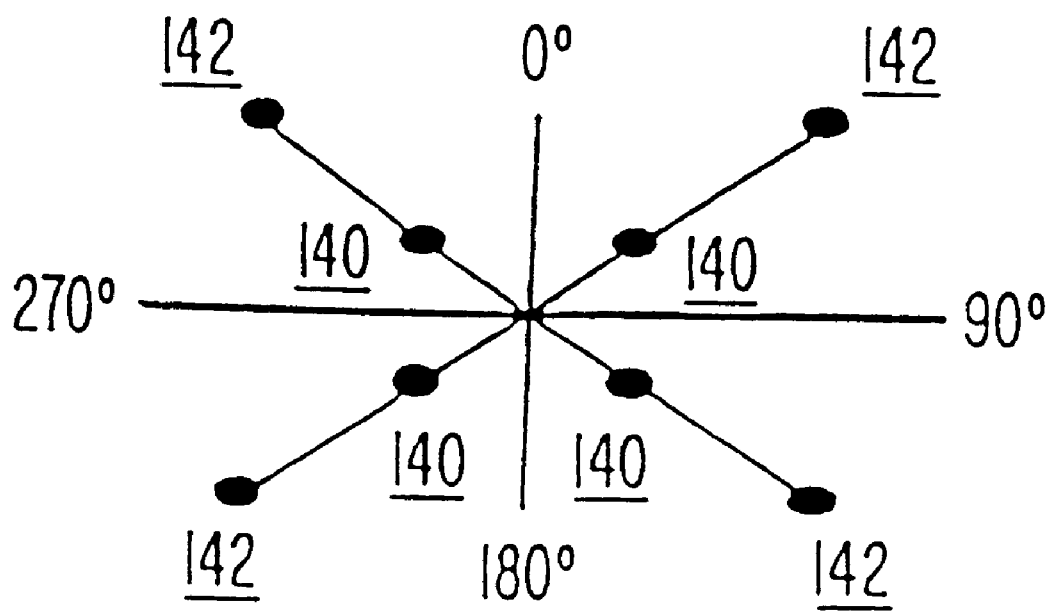
FIG. 11 illustrates a constellation illustrating the analog modulation of the subcarrier of FIG. 10A.

In FIG. 10A, the sinusoidal subcarrier is modulated at four different phases (discrete angular positions) of a 360° cycle to encode a one or a zero value of the individual bits of the IDENTIFICATION FRAME GROUP of FIG. 9 or modifications thereof. As illustrated, the modulation is diphase quadrature modulation (one or zero modulated at 45°, 135°, 225° and 315°). FIG. 11 illustrates a constellation representing the encoding of either a one or a zero at each of these four discrete angular phases.

In FIG. 10B a squarewave subcarrier is pulse width modulated with a first half of the squarewave subcarrier cycle encoding four bits of the bits of the IDENTIFICATION FRAME GROUP of FIG. 9 or modifications thereof. FIG. 12 illustrates possible numerical values representative of frame groups which may be encoded with squarewave modulation as illustrated in FIG. 10B. As illustrated, the pulse width modulation has sixteen possible widths encoding a four bit group which preferably are proportionate, i.e. a value of one is 1/16th the width of a value of sixteen which facilitates high speed integration by the digital signal processor of the radio frequency receiver 12.

The analog or digital protocols of FIGS. 10A and 10B have the advantage of requiring less radiated power than other protocols, such as POCSAG or other digital protocols, such as ERMES or modifications thereof. Because of the application of the present invention for finding the wearer of a mobile transmitter being limited to a maximum amount of radiated power by the Federal Communications Commission of 100 milliwatts for unlicensed applications, the reduction in radiated power which is achieved with the use of the IDENTIFICATION FRAME GROUP transmission in combination with the processing capability of the digital signal processor of the radio frequency receiver 12 increases the effective range of the receiver's capability of tracking the mobile radio frequency transmitters 14, 16 and 18.

Figure 13:
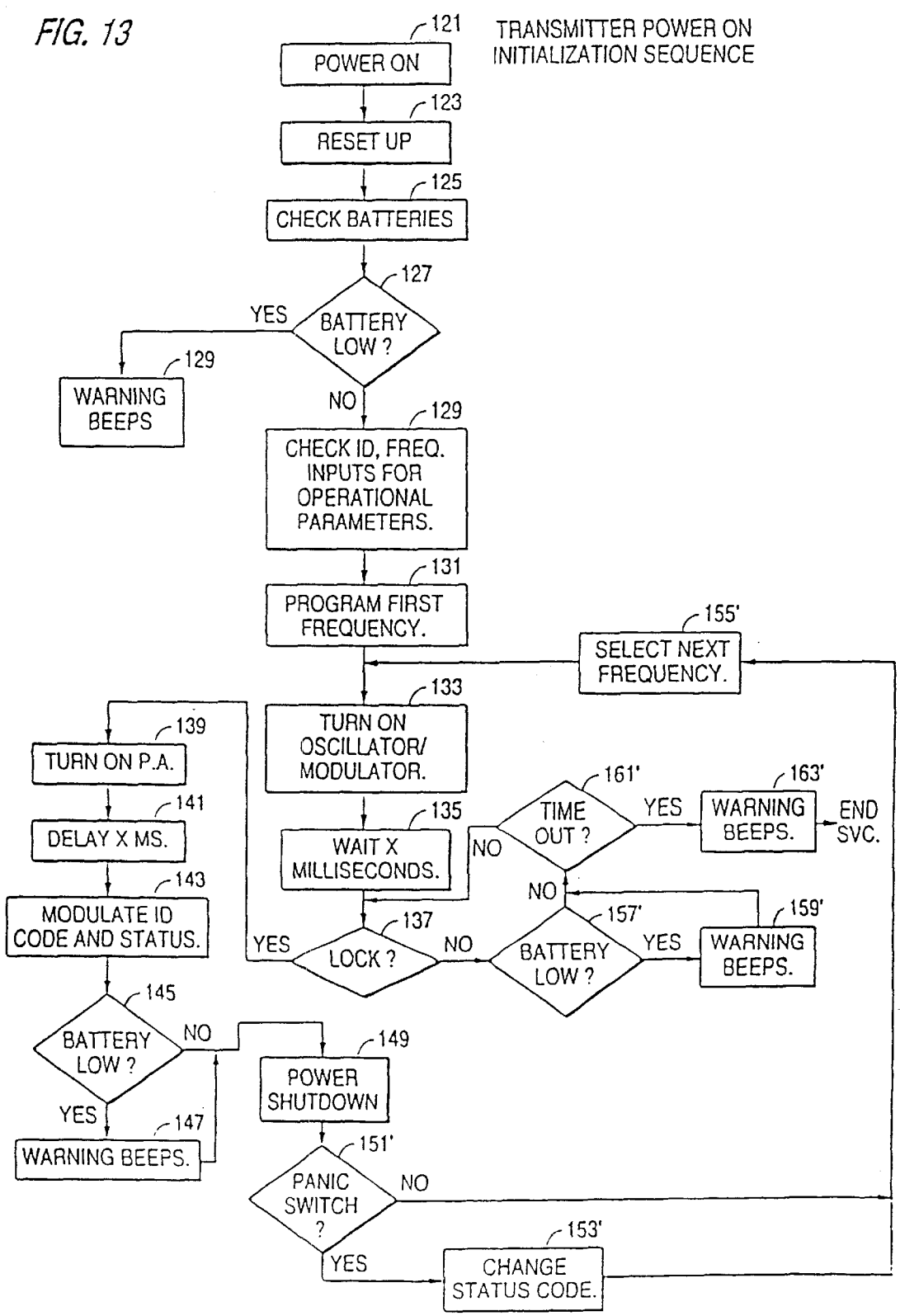
FIG. 13 is a flowchart of the operation of the radio frequency transmitter including the power on and initialization sequence.

FIG. 13 illustrates a detailed flowchart of the operation of the radio frequency transmitter 100 of the present invention which has been generally described above in conjunction with FIGS. 3 and 4. Processing proceeds from the turning on of power at point 121 to step 123 where the control CPU 106 is reset. Processing proceeds to point 125 where the potential of the batteries 117 is read. Processing proceeds to decision point 127 where a determination is made if the potential of the rechargeable batteries 117 read at point 125 is too low to operate the transmitter. If the answer is "yes" at decision point 127, processing proceeds to point 129 where the control CPU 106 causes warning beeps to be emitted by the piezoelectric battery low indicator of FIG. 4 to alert the user of the low battery condition. If the answer is "no" at decision point 127, processing proceeds to point 129 where a check is made for the identification code and the frequency inputs for determining the operation parameters of the transmitter, including its frequency hopping sequence, which is used to avoid interference with other radio frequency transmitters. The processing proceeds to point 131 where the first frequency of the frequency hopping sequence is programmed. The processing proceeds to point 133 where the oscillator/modulator 102 is turned on. The processing proceeds to point 135 where a wait interval of a set number of milliseconds is entered into to permit the power amplifier 110 to become operational prior to proceeding to decision point 137 where a determination is made of whether or not the frequency of the oscillator is locked on to the frequency commanded by the control CPU 106. If the answer is "yes" at decision point 137, processing proceeds to point 139 where the power amplifier 110 is turned on. The processing proceeds to point 141 where another delay of a specified number of milliseconds is entered into to permit the power amplifier 110 to become operational. Thereafter, at point 143, the subcarrier is modulated with the IDENTIFICATION FRAME GROUP of FIG. 9 including the identification code of the radio frequency transmitter and the stored status of the command field CB reflecting the previous state of the closing of the "panic" switch 114. At this point, the memory of the control CPU 106 stores a digitized version of the modulated subcarrier in either analog format of FIG. 10A or digital format of FIG. 10B to encode the IDENTIFICATION FRAME GROUP. The processing proceeds to decision point 145 where the control CPU 106 again determines if the potential of the battery 117 is low. If the answer is "yes" at decision point 145, processing proceeds to point 147 where warning beeps are caused to be emitted under control of the control CPU 106 which are analogous to the beeps emitted at step 129 as described above. Processing proceeds from decision point 145 if the answer is "no" and from point 147 to point 149 where the power shutdown sequence is performed. Processing proceeds to decision point 151' where a determination is made if the "panic" switch 114 has been closed. If the answer is "yes" at decision point 151', processing proceeds to point 153' where the status of the user is changed in memory of the control CPU 106 to cause the command field CB of FIG. 9 as described above to be changed to alert the radio frequency receiver 12 of the change in status of the "panic" switch 114 which will be transmitted with the next radio frequency carrier. Processing proceeds from the change in status code at point 153' or if the answer at decision point 151' is "no" to point 155' where the next frequency of the frequency hopping sequence of the radio frequency carrier is selected. Processing proceeds from point 155' back to point 133 where the oscillator/modulator 102 is turned on as described above. If the answer at decision point 137 is "no" that the radio frequency transmitter is not locked on to the commanded frequency of the radio frequency carrier, processing proceeds to decision point 157' where a determination is made if the battery 117 is at a low potential. If the answer is "yes" at decision point 157', the processing proceeds to point 159' where warning beeps are emitted which are analogous to points 147 and 129 as described above. If the answer is "no" at decision point 157' that the battery is not low, or warning beeps have been emitted at step 159', processing proceeds to decision point 161' where a determination is made if a timer has expired indicating that the radio frequency transmitter has not locked onto the programmed frequency within a predetermined period of time. If the answer is "yes" at decision point 161',processing proceeds to point 163' where warning beeps are emitted which are analogous to the warning beeps emitted at steps 159', 147, and 129 described above. Processing proceeds from point 163' to the end of service. If the answer is "no" at decision point 161', processing proceeds back to decision point 137 as described above.

FIG. 14 illustrates a block diagram of a preferred embodiment 400 of the radio frequency receiver 12 of FIG. 1. The embodiment 400 functions as a 900 MHz. spread spectrum frequency hopping radio frequency receiver that is capable of receiving and monitoring the transmissions of the radio frequency transmitters 14, 16 and 18 described above which contain the information preferably of the format of FIG. 9. The embodiment 400 functions to accurately analyze the identification code status of the "panic" switch 114 and other information. Upon determining that the IDENTIFICATION FRAME GROUP of FIG. 9 contains an identification code of a radio frequency transmitter assigned to the radio frequency receiver 400 for monitoring and tracking purposes, the embodiment 400 determines the distance of the radio frequency transmitter from the radio frequency receiver as well as the bearing of the radio frequency transmitter relative to the radio frequency receiver when the antenna configuration of the radio frequency receiver is switched from an omnidirectional pattern which is used to monitor the group of radio frequency transmitters 14, 16 and 18 to a directional antenna which is used to monitor the range and direction of a single radio frequency transmitter. The embodiment 400 utilizes highly integrated commercially available integrated circuits to provide a small, compact, battery operated radio frequency receiver which may be carried by the operator thereof on a belt loop or otherwise on or with the person.

The main components of the embodiment 400 of the radio frequency receiver are as follows: Control CPU 402 which is preferably a digital signal processor, a synthesizer and phase lock loop 404, antenna array 405, antenna reflector switch 406, low noise amplifier 407, first mixer 408, first intermediate bandpass filter 409, local oscillator 410, local oscillator 412, second mixer 414, second bandpass filter and intermediate frequency amplifier 416, data detector/demodulator 418, range setting control 420, analog to digital converter 422, display 424, "find me" switch 426 and alerting device 428.

Figure 15:
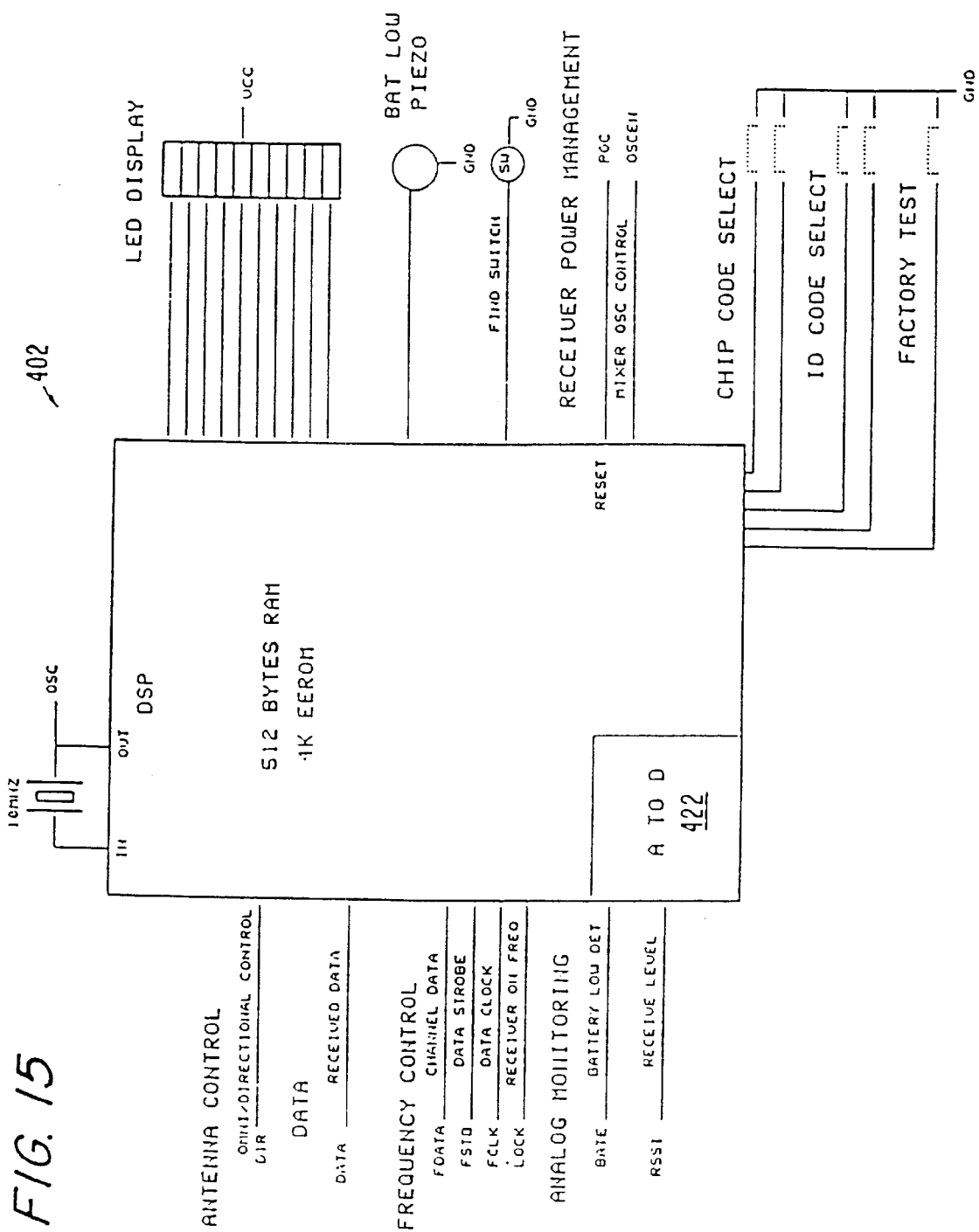
FIG. 15 is a circuit diagram of a preferred control CPU of the radio frequency receiver of FIG. 14.
Figure 16:
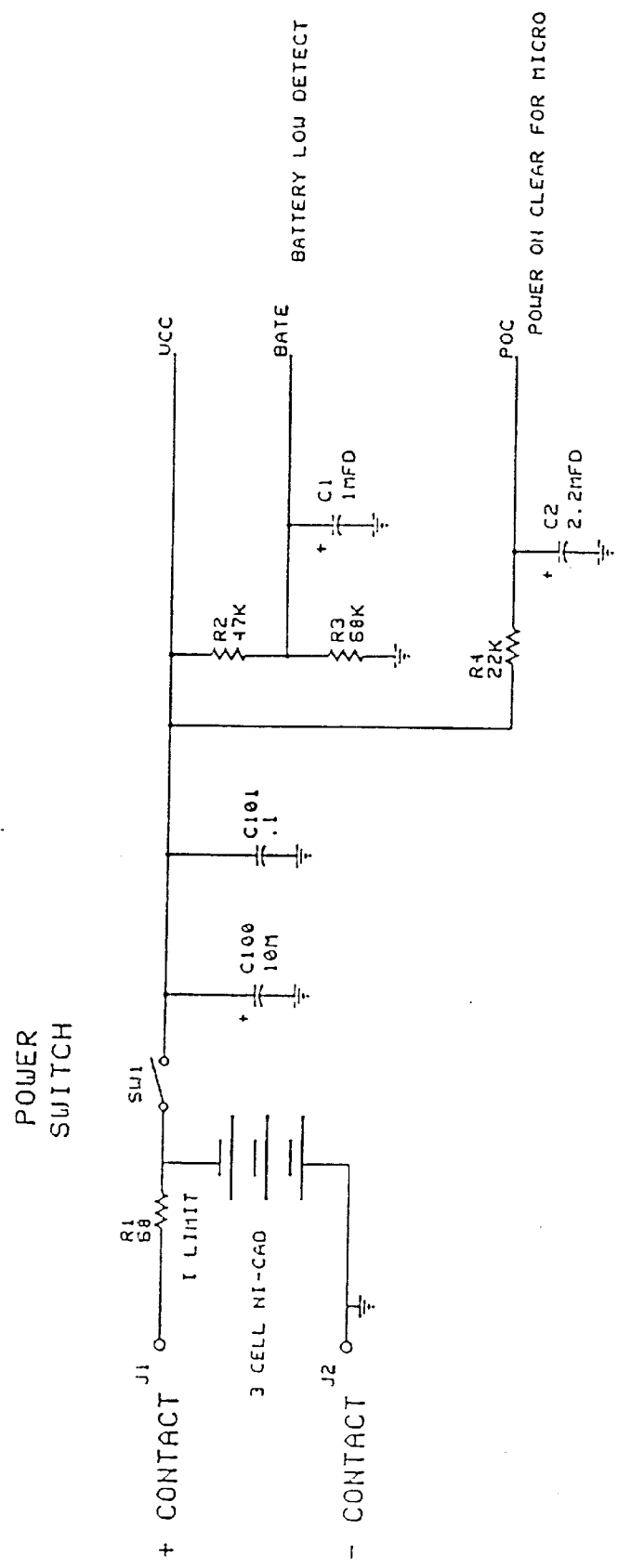
FIG. 16 is a circuit diagram of a preferred power supply of the radio frequency receiver of FIG. 14.

The control CPU 402 which, as stated above, is preferably a digital signal processor, is illustrated in FIG. 15 and provides the control of the embodiment 400 which permits the determination of range of the multiple radio frequency transmitters 14, 16 and 18 relative to the set range limit 20 specified by the setting of potentiometer 420 and further, the determination of the direction of a radio frequency transmitter relative to the radio frequency receiver, as described above, in conjunction with FIG. 2 either when a radio frequency transmitter has moved beyond the set range 20 or has instituted a "find me" command by closing of the "find me" switch 426 in association with the source code of columns 55–154 of U.S. Pat. No. 5,714,937. FIG. 15 illustrates a preferred circuit for implementing the control CPU 402.

The digital signal processor contains three eight-bit I/O ports that are utilized for the various control and data functions, 6K of ROM memory that contains the operating program, and 176 Kbytes of RAM memory. The digital signal processor also contains an eight-bit analog to digital converter which corresponds to the analog to digital converter 422 with an eight input multiplexer, reset and initialization watch dogs, a serial port, programmable timers, and the master processor oscillator. The digital signal processor controls via the digital ports the receiving frequency (frequency control lines) and the mode of the antenna array 405 (directional or omnidirectional control). The digital signal processor also drives light dots (illustrated in FIG. 2 as dots 24) of the LCD or LED display 424 which indicate a power on status and further the amplitude of the RSSI signal which, as described above in conjunction with FIG. 2 is preferably integrated, to eliminate the effects of noise. Additional lines are utilized to drive the piezoelectric alert speaker 428 which provides a warning to the user of the embodiment 400 that one or more of the radio frequency transmitters 14, 16 and 18 has moved out of the set range 20 or that the "panic" switch 114 of the radio frequency transmitter of FIG. 3 has been closed to signal the user of the radio frequency receiver that a user of one of the radio frequency transmitters 14, 16 and 18 wishes to be found or is an emergency situation, etc.

Inputs to the digital signal processor are accomplished via the data ports. The closing of the "find me" switch 426 causes the digital signal processor to change the configuration of the antenna array 405 by a command from the control CPU 402 to change the antenna reflector switch 406 to change the antenna array to be configured in a directional array such that the user of the radio frequency receiver 400 can attempt to line up the axis 26 of the directional antenna in the direction where a maximum magnitude RSSI signal is displayed on the dots 24 as described above in conjunction with FIG. 2. Furthermore, the detecting of the change in status of the "find me" switch 426 by the digital signal processor causes the digital signal processor to be conditioned for processing other necessary functions. The demodulated data which is received from detector/demodulator 420 is sent to the digital signal processor via data lines.

The analog to digital converter 422 performs a multitude of digitizations of sensed or inputted analog signals. One input is used for the measurement and monitoring of the battery condition. The analog to digital converter 422 digitizes the measured battery voltage for comparison to a stored operating voltage in the memory of the digital signal processor. When the monitored battery voltage falls below the predetermined threshold, the digital signal processor initiates a low battery warning.

A second input to the analog to digital converter 422 is connected to the analog RSSI signal which is outputted from the intermediate frequency amplifier within the bandpass filter/intermediate frequency amplifier 416 which is digitized for further processing including the preferred integration thereof to remove the effects of noise, the computing of averages of RSSI signals received from each of the radio frequency transmitters 14, 16 and 18 and the discarding of aberrant integrations for each RSSI signal integral which differ by the function as described herein. Up to hundreds of samples of the RSSI signal are made of each RSSI signal which is received to remove the effects of electrical noise as described. The samples are then further processed to provide a highly filtered and accurate distance measurement by the averaging process and the discarding of aberrant integrations as described.

A third input to the analog to digital converter 422 measures the DC voltage produced by the range setting of the range control 420 that is preset by the user of the embodiment 400. The measured DC voltage from the range control 420 is proportional to the desired range 20 and provides a comparison voltage necessary to determine when the set range has been exceeded. The preset range control voltage produced by the range control 420 is compared to the average of the RSSI signals which are preferably integrated prior to averaging to remove the effects of noise to perform the alerting function that one or more of the radio frequency transmitters 14, 16 and 18 has exceeded the set range 20.

The control processor portion of the digital signal processor provides all of the processing necessary to perform the decoding of the subcarrier as modulated with the IDENTIFICATION FRAME GROUP, as described above in conjunction with FIG. 9 and below in conjunction with FIGS. 21A, B, 22, 23A, B, 24A, B and 25, and operational status. The control processor portion of the digital signal processor also performs the necessary averaging of the RSSI signals generated in response to the reception of a valid identification code from each of the radio frequency transmitters 14, 16 and 18 which, as stated above, preferably, is an average computed from integrated RSSI signals to remove the effects of noise to provide an accurate determination of the range of the radio frequency transmitters 14, 16, 18 from the radio frequency receiver 12.

The digital signal processor also provides power management of the embodiment 400 to maximize the operating life of the battery. Only the portions of the embodiment 400 that need to be operational at any given time are turned on by the digital signal processor. For example, the digital signal processor during its off duty cycle remains in a low power consumption state and upon a predetermined timing cycle, commences the power up operation. To prepare the embodiment 400 to receive the radio frequency carrier containing the IDENTIFICATION FRAME GROUP, the digital signal processor first turns on the power to the synthesizer/phase lock loop 404. The digital signal processor then forwards via the serial data bus the desired frequency control to the synthesizer/phase lock loop 404. Immediately following the programming of the synthesizer/phase lock loop 404, 'the digital signal processor turns on the power of the voltage controlled oscillator 410 associated with the first mixer 408. The digital signal processor then awaits verification that the voltage controlled oscillator 410 has achieved the operating frequency via the lock on signal from the synthesizer/phase lock loop 404. The digital signal processor then simultaneously monitors the output of the detector/demodulator 418 for data being received in the format of the IDENTIFICATION FRAME GROUP of FIG. 9 and performs digital monitoring of the RSSI signal which is outputted by the intermediate frequency amplifier of the intermediate frequency amplifier and bandpass filter 416. This process continues until the transmitted radio frequency carrier is received in its entirety at which time the digital signal processor begins an orderly shut down process.

At all times, the digital signal processor is monitoring the battery voltage, as well as the "find me" switch 426. When the "find me" switch 426 is depressed by the user of the embodiment 400, the digital signal processor immediately implements the power up sequence (as previously described) and modifies the control program to display the integrated RSSI signal on the dots of the display 424.

Figure 18:
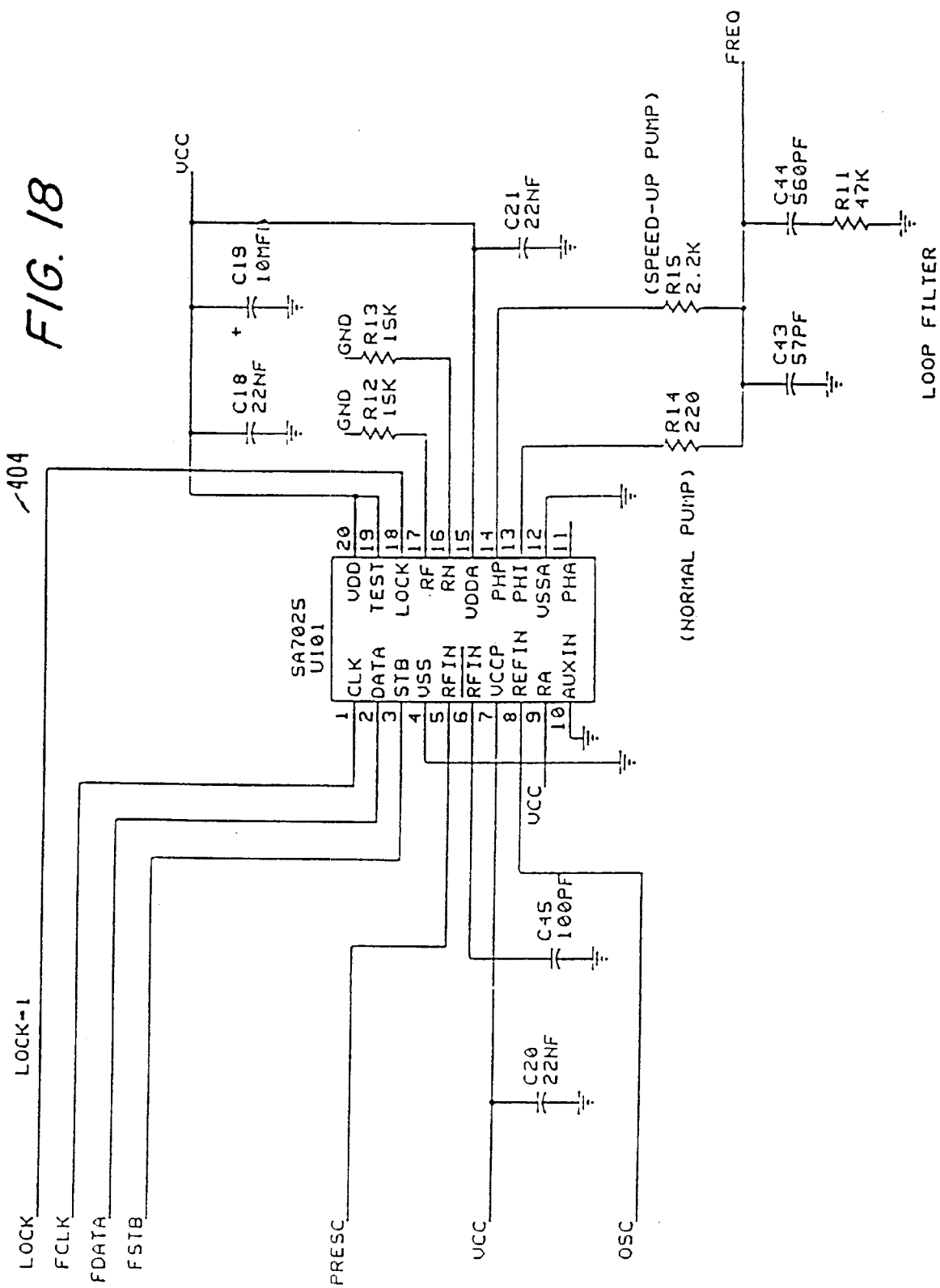
FIG. 18 is a circuit diagram of a preferred synthesiser phase lock loop of the radio frequency receiver of FIG. 14.

The synthesizer/phase lock loop 404 is a digitally programmable 900 MHz. synthesizer and phase lock loop circuit. FIG. 18 illustrates a preferred circuit for implementing the synthesizer/phase lock loop 404. The synthesizer/phase lock loop 404 also contains a prescaler to permit sampling of the oscillator frequency for comparison to the commanded frequency which is specified by the control CPU 402 to determine if the frequency is correct. The synthesizer/phase lock loop 404 receives digital data from the control CPU 402 that determines the desired operating frequency. The synthesizer/phase lock loop 404 then translates the received digital frequency information into an analog voltage that is applied to the voltage control oscillator.

The synthesizer/phase lock loop 404 is capable of operating at thousands of different frequencies in the 902–928 MHz. band and is programmable to a subset of fifty frequencies by the control CPU 402 which frequencies correspond to the frequencies which are programmed to be used sequentially by the radio frequency transmitters 14, 16, and 18.

An integral part of the synthesizer/phase lock loop 404 is a master reference oscillator that provides a high stability reference frequency that is utilized to generate the desired 900 MHz. receiving frequency that is applied to the mixer 408 to shift the received radio frequency carrier down to a, first intermediate frequency.

The low noise amplifier 407 has two stages and is directly coupled to the receiving antenna array 405 at is input through the antenna switch 408 and to the mixer 408 at its output. The low noise amplifier 407 is electronically controlled by the control CPU 402 to permit maximum battery savings when the embodiment 400 is not active. The low noise amplifier 407 provides approximately 11.5 dB of gain +/−0.2 dB over the entire 902–928 MHz. operating band.

Figure 17:
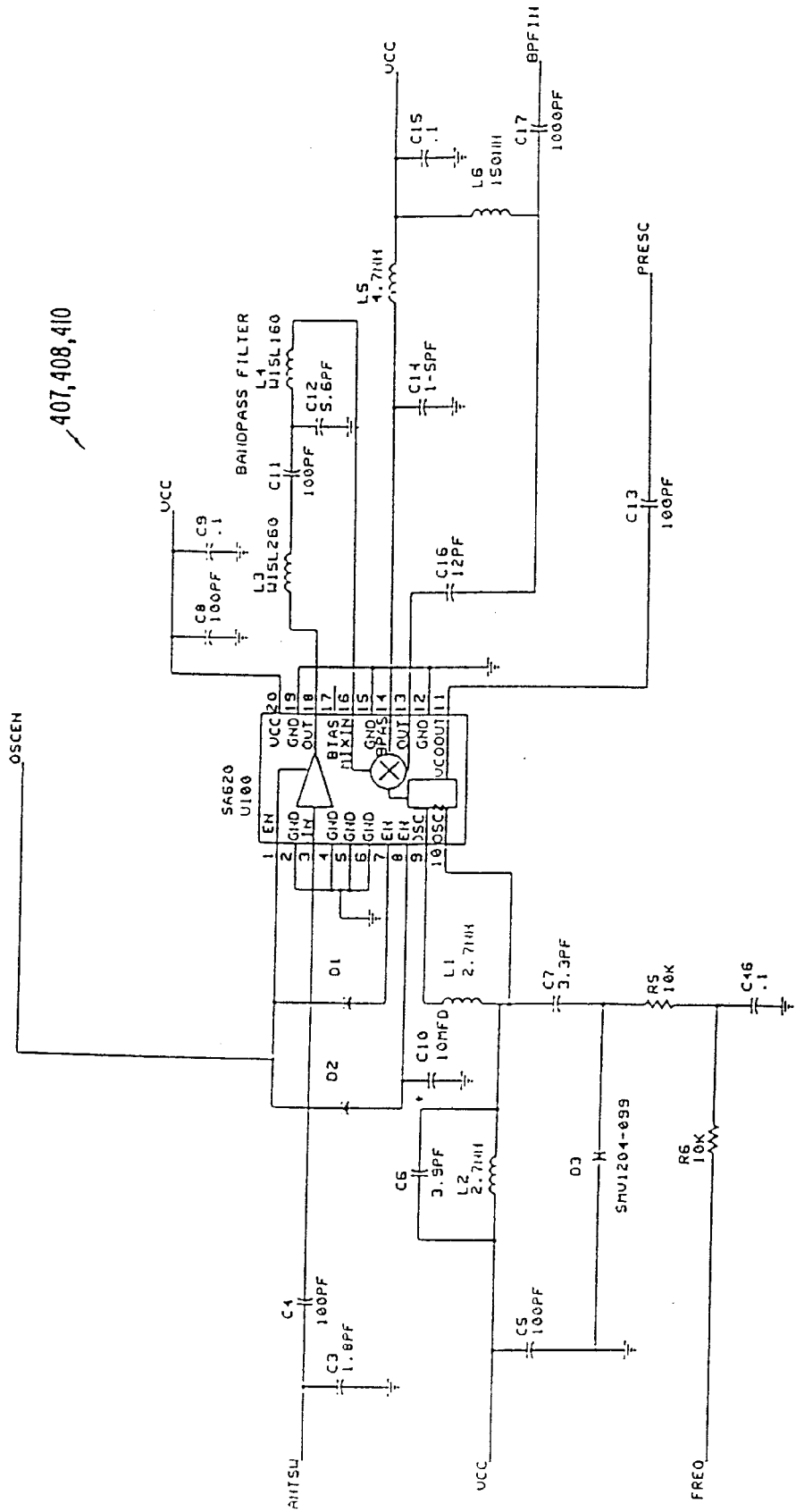
FIG. 17 is a circuit diagram of a preferred low noise amplifier, mixer and voltage controlled oscillator of the radio frequency receiver of FIG. 14.

The first mixer 408 is connected to voltage controlled oscillator 410 that is tuned by external coils and capacitors and a varactor diode to permit the oscillator frequency to be controlled directly by the synthesizer/phase lock loop 404. FIG. 17 illustrates a preferred circuit for implementing the low noise amplifier 407, first mixer 408 and voltage controlled oscillator 410. The analog voltage generated by the synthesizer/phase lock loop 404 is coupled to a varactor diode of FIG. 17 which changes the resident frequency and hence the operating frequency of the voltage controlled oscillator. 410 to the desired frequency. The oscillator of FIG. 17 has a frequency monitoring pin that provides a feedback signal to the synthesizer/phase lock loop 404 prescaler. This provides a closed frequency monitoring loop that permits the synthesizer/phase lock loop 404 to compare frequency of the voltage controlled oscillator 410 to the desired frequency requested by the control CPU 402. When the desired frequency and the operating frequency of the voltage controlled oscillator 410 differ, an error voltage is generated that changes the frequency of the voltage controlled oscillator to provide the correct frequency. The DC control voltage is filtered by components R6 and C46 of FIG. 17 to prevent oscillator instability.

The first mixer 408 is also contained within the circuit of FIG. 17 which mixes the oscillator output with the incoming filtered radio frequency signal outputted by a low noise amplifier 407 to produce the intermediate operating frequency. This intermediate frequency is a product of the two frequencies being mixed together. The resultant frequency and related undesired mixer frequencies are transmitted to the first intermediate frequency bandpass filter 409.

The bandpass filter 409 is comprised of discrete components that permit only the desired band of RF frequencies to pass from the first mixer 410 to the second mixer 414 and is the first of a series of bandpass filters. The first intermediate frequency bandpass filter 409 consists of a two-stage crystal lattice filter that is tuned to 10.7 MHz. The first mixer 408 produces this frequency as well as several undesired frequency components that are filtered out by the first intermediate frequency bandpass filter 409. When the two frequencies are mixed, e.g. 900 MHz. and 910.7 MHz., several mixed frequencies result. The first is the frequency that is the sum of the two frequencies and another is the difference. The embodiment 400 uses the difference frequency of 10.7 MHz. with the first intermediate frequency bandpass filter 409 passing only that frequency and not the other undesired frequency. The output of the first intermediate frequency bandpass filter 409 is applied to an impedance matching network (not illustrated in FIG. 14) which is coupled to additional gain stages in the second mixer 414.

Figure 19:
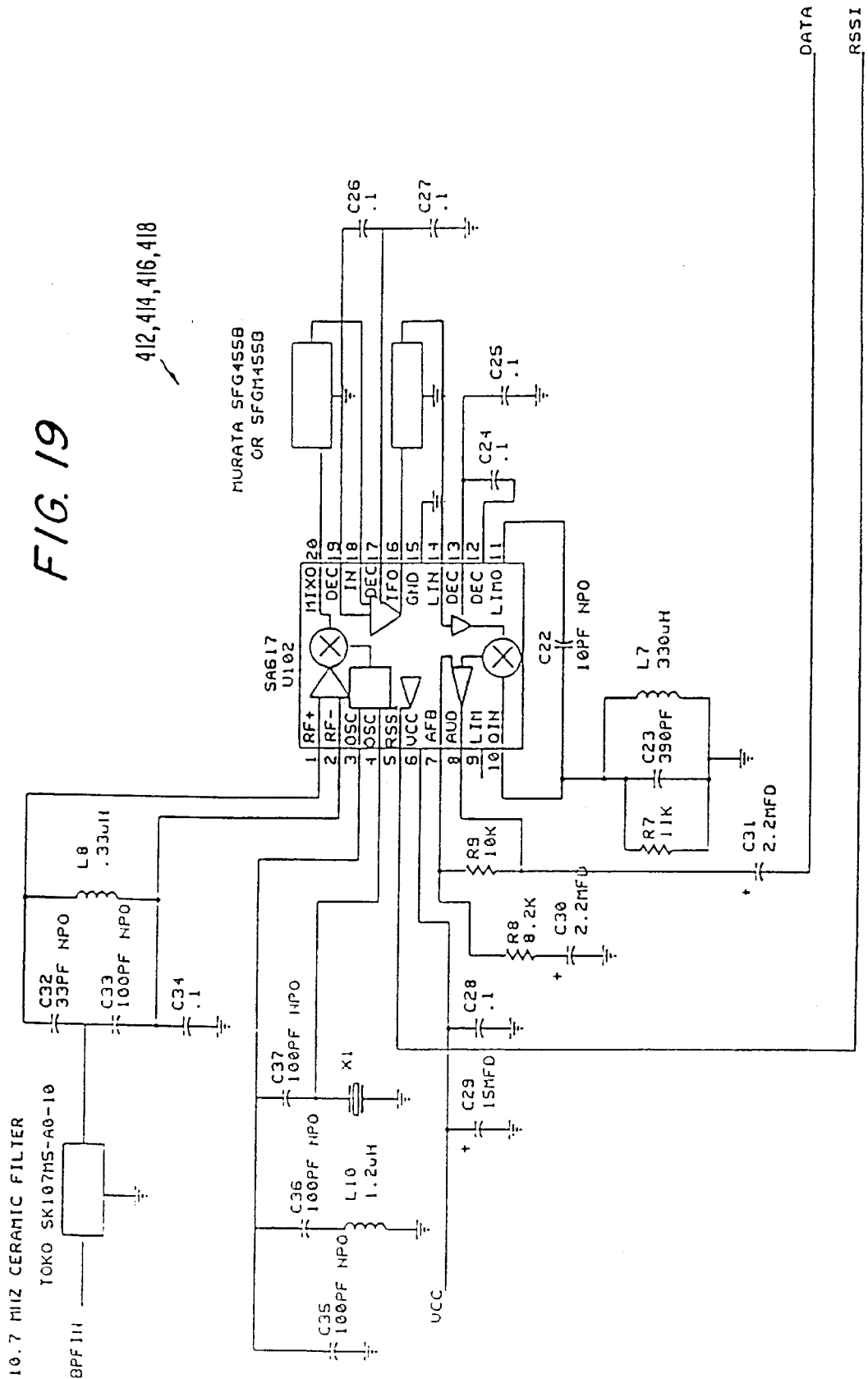
FIG. 19 is a circuit diagram of a preferred second mixer, bandpass filter and intermediate frequency amplifier and detector/demodulator of the radio frequency receiver of FIG. 14.

The second mixer 414 is part of a double conversion receiver design which provides the highest sensitivity and greatest rejection of adjacent channel interference and unwanted signals. FIG. 19 illustrates a preferred circuit for implementing the local oscillator 412, second mixer 414, second bandpass filter/intermediate frequency amplifier 416 and detector/demodulator 418. The output from the matching network and the output of local oscillator 412 are applied to the second mixer 414 to convert the signal down to a second lower intermediate frequency of 455 KHz. The second mixer 414 is similar to the first mixer 408 in that it produces signal components that must be filtered by the second intermediate frequency bandpass filter 416 and intermediate frequency amplifier so that only the desired intermediate frequency is applied to the demodulator/detector 418. The second intermediate frequency bandpass filter of the second intermediate frequency bandpass filter and intermediate frequency amplifier 416 is a two-stage filter. The amplification produced by the intermediate frequency amplifier is produced by multiple stages to provide the necessary amplification for appropriate signal detection by the detector/demodulator 418.

The detector/demodulator 418 receives the amplified intermediate frequency signal from a second limiting amplifier portion of the intermediate frequency amplifier section of the second bandpass filter and intermediate frequency amplifier 416 which is applied to a Gilbert cell quadrature detector. One port of the Gilbert cell is internally driven by the intermediate frequency amplifier. The second output of the preceding intermediate frequency amplifier is AC coupled to a tuned quadrature network. This signal, which now has a 90° phase relationship to the internal signal, drives the other port of the multiplier cell. The demodulated output of the quadrature detector drives an internal operational amplifier. This operational amplifier provides additional gain of the recovered and detected signal containing the information of the IDENTIFICATION FRAME GROUP of FIG. 9 and a minimal amount of filtering prior to coupling of the demodulated data of the IDENTIFICATION FRAME GROUP to the control processor 402.

The intermediate frequency amplifier section of the second bandpass filter and intermediate frequency amplifier 416 provides the RSSI signal which is processed as described above and below. The RSSI signal voltage is proportional in scale to the field strength of the radio frequency carrier received by the antenna array 405. When interferences occur, such as Rayleigh fading and multipath signals as described below in conjunction with FIGS. 31 and 32, the RSSI signal varies dramatically when observed on an instantaneous basis. The digital signal processor is utilized to provide a series of calculations of integrals or averages of the RSSI signals as described to remove the unwanted and instantaneous variations that typically render the RSSI signal useless or unreliable for range measurements. The RSSI signal is forwarded to the analog to digital converter 422 as described above. A detailed explanation of the integrations or averaging of the RSSI signals is described below in conjunction with FIGS. 31 and 32.

Figure 20:
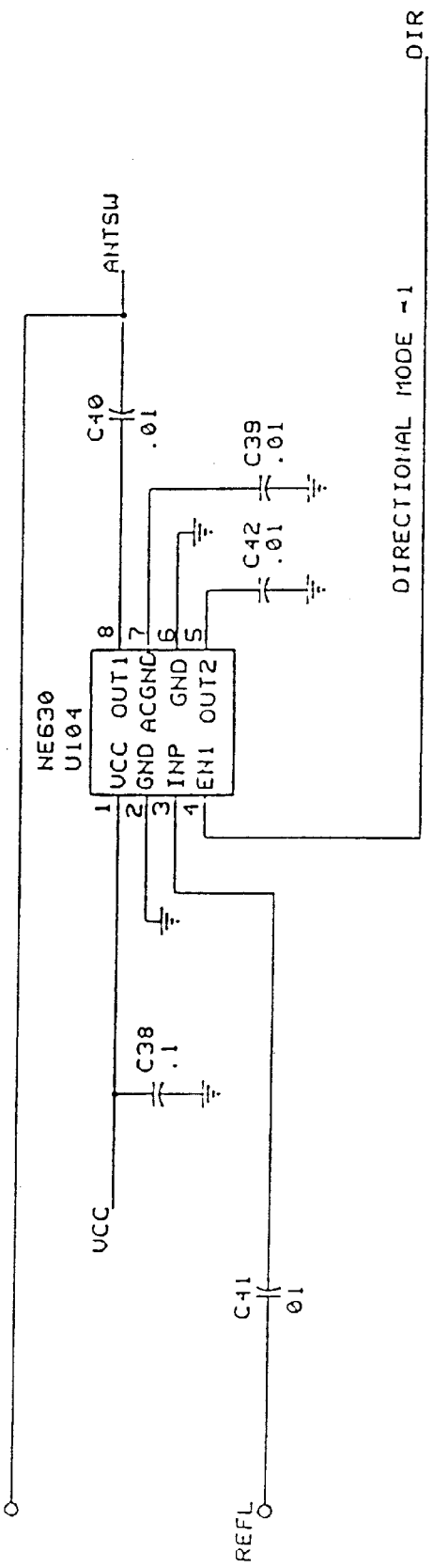
FIG. 20 is a circuit diagram of a preferred antenna reflector switch of the radio frequency receiver of FIG. 14.

The electronic antenna switch 406 is controlled by the control CPU 402. In the normal omnidirection receiving mode the radio frequency receiver antenna switch connects the reflector element 432 of the antenna array 405 to the driven element 431 of the antenna to produce an omnidirectional configuration. A preferred circuit for implementing the antenna switch 4076 is illustrated in FIG. 20. The use of the antenna reflector switch 406 to switch the configuration of the antenna assembly 405 between omnidirectional and directional modes is important in reducing the size and number of antenna components in a small form factor for wearing on a person's belt to obtain acceptable antenna performance for achieving the two different and competing signal reception characteristics for omnidirectional and directional reception. In this configuration, the received signal pattern is omnidirectional and the reflector assembly 432, as well as the driven portion 431 of the antenna array 405, are coupled together to receive signals from-the radio frequency transmitters 14, 16 and 18 by opening the antenna switch 406 to receive an omnidirectional pattern of the received radio frequency carriers and to couple them to the low noise amplifier circuit 407.

When the user closes the "find me" switch 406, which is also illustrated in FIG. 15, the control CPU 402 sends a digital signal to the antenna reflector switch 406 that changes the antenna configuration to a small aperture reflective array having the antenna axis 26 as described above in conjunction with FIG. 2. This is accomplished by grounding of the reflector array 432 by closing the antenna reflector switch 406. In this mode, only the center driven antenna portion 431 is connected to the low noise radio frequency amplifier 407 to provide highly directional reception of the radio frequency carriers to permit the user to determine the direction from where signals are received produces the maximum magnitude of the integrated RSSI signal relative to the alignment of the axis 26 of the directional antenna array 405. The axis 26 may be thought of as a pointer toward the mobile radio frequency transmitter 14, 16 or 18 being tracked. As explained above, when the axis 26 is pointing directly at the radio frequency transmitter 14, 16 or 18 whose range and position is being monitored, a maximum number of the dots 24 is activated as illustrated in FIG. 2. As has been explained above in conjunction with FIG. 2, the user rotates the radio frequency receiver 12 until a maximum number of the dots 24 is activated which signals the true direction of the radio frequency transmitter relative to the radio frequency receiver 12.

The antenna array 405 consists of two active components. The first is the driven or center element 431 which is composed of a heavy gauge wire loop that is matched to the low noise RF amplifier 407 by discrete components. The second element of the antenna array 405 is the reflector assembly 432. The reflector assembly 432 surrounds the driven element in a somewhat cylindrical fashion with a slot facing outward which is the antenna axis 26 and extends away from the user of the embodiment 400. The slot (not illustrated) permits the radio frequency carrier transmitted from the radio frequency transmitter being tracked, which has been modulated with the subcarrier modulated with the IDENTIFICATION FRAME GROUP information, to enter the reflector assembly 432 of the antenna to be received by the driven element 431.

As stated above, in the omnidirectional mode, the antenna switch 406 connects the reflector array 432 to the driven element 431 to collectively combine the two elements into a single receiving antenna. In this configuration, the antenna is omnidirectional and the reflective element 432 and the driven element 31 collectively contribute to receiving the radio frequency carrier containing the IDENTIFICATION FRAME GROUP information.

When the embodiment 400 is changed to the directional mode by switching the antenna reflector switch 406 under control of the control CPU 402, the antenna reflector switch disconnects the reflector element 432 and connects it to ground. Only the driven element 431 is used to receive the signal and the array becomes highly directional to the surrounding of the driven element by the reflector assembly 432. As is explained above, preferably the signal after qualification by the control CPU 402 that a valid identification code has been received is integrated by integrating the output of the RSSI signal from intermediate frequency amplifier of the second bandpass filter and intermediate frequency amplifier 416.

The integration of an analog subcarrier modulated, as illustrated in FIGS. 10A and 12, as part of the demodulation process is explained in detail as follows. FIG. 21A illustrates the received diphase quadrature modulated subcarrier as received from the detector/demodulate 418 of the radio frequency receiver. The data, modulates the subcarrier at the 45° and 135° phases with the 225° and 315° phases having been omitted from the illustration. Regardless of the number of spaced apart angular positions of the subcarrier which are modulated, the determination of whether a one or a zero is encoded in the modulation involves the discrimination of whether the integral falls on the "one" or "zero" side of the boundary on the vertical voltage axis V representing the magnitude of the integral. The lower magnitude voltage V range along the Y axis represents the encoding of a binary zero at 45° and the higher magnitude voltage range represents the encoding of a binary one at 135°.

The embodiment 400 has a digital signal processor clock which is synchronized by ID/S' field of FIG. 9 to the frames of the incoming IDENTIFICATION FRAME GROUP. This synchronization permits the digital signal processor to integrate in a window around the exact angular phase of where the modulation of each bit is placed. The sampling of the voltage, may begin at 35° and end at 55°. In the 20° window, the digital signal processor computes hundreds of samples which are integrated. The size of the window and the number of angular positions of the subcarrier which are modulated may vary in practicing the invention with much higher numbers of bits modulated per quadrant of the subcarrier being possible than illustrated in FIG. 10A.

Figure 21A:
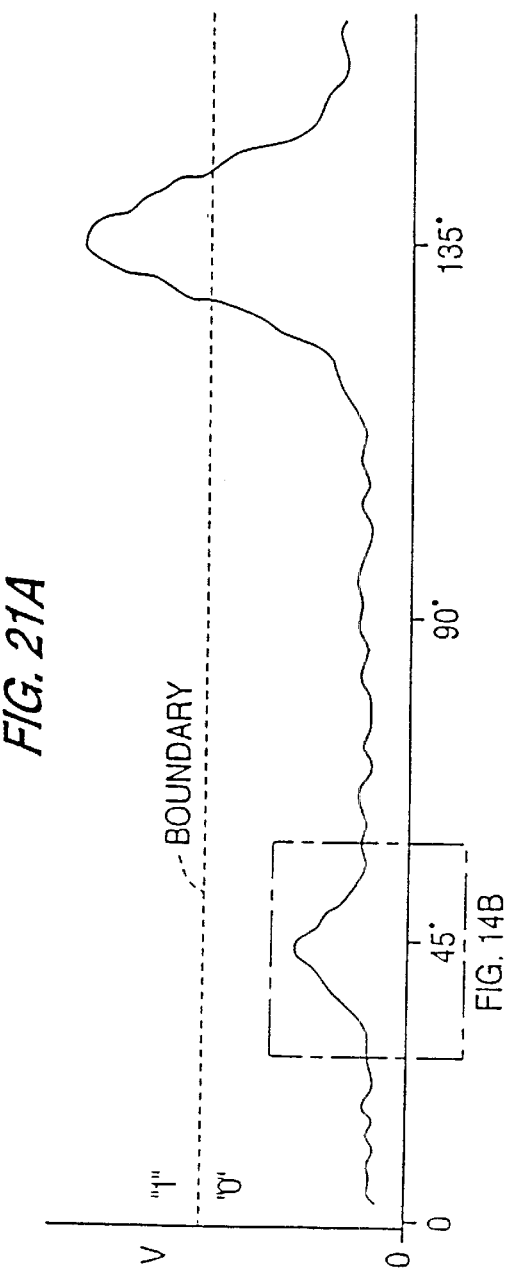
FIGS. 21A and 21B illustrate the integration of the detected modulated sinusoidal subcarrier in accordance with FIG. 10A the digital signal processor of the radio frequency receiver of the present invention.
Figure 21B:
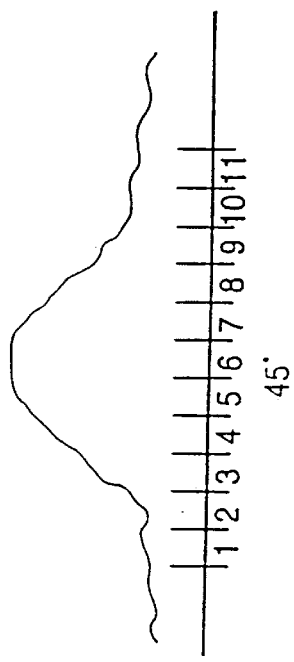

FIG. 21B illustrates a simplified example of computing the integral of the waveform at 45° in FIG. 21A where only eleven samples are taken which have an integrated value of eight. Once the integrated value is obtained, the digital signal processor looks in a prestored lookup table as described below in detail in conjunction with FIG. 25 which permits a value of zero to be within a numerical integration range between zero and sixteen. In FIG. 21A it can be that the numeric value for the data contained at the 135° phase will be greater than sixteen. Therefore, the same integration process and comparison with the range of prestored values centered in a 20° window around 135° yields a value of one at the 135° phase.

The actual values obtained in each step of the integration process will typically be much higher than the foregoing example of FIGS. 21A and B. The actual values obtained in each step of the integration process will be dependent upon many variables determined primarily by the receiving circuitry. The operating voltage, A to D sampling speed, and clock speed of the digital signal processor will all influence the actual numeric values obtained in this integration process. However, the transmitted waveform will appear essentially the same for all mobile data products using the invention. Each of the different received data waveforms will have different binary values and different binary ranges in their lookup tables.

Figure 22:
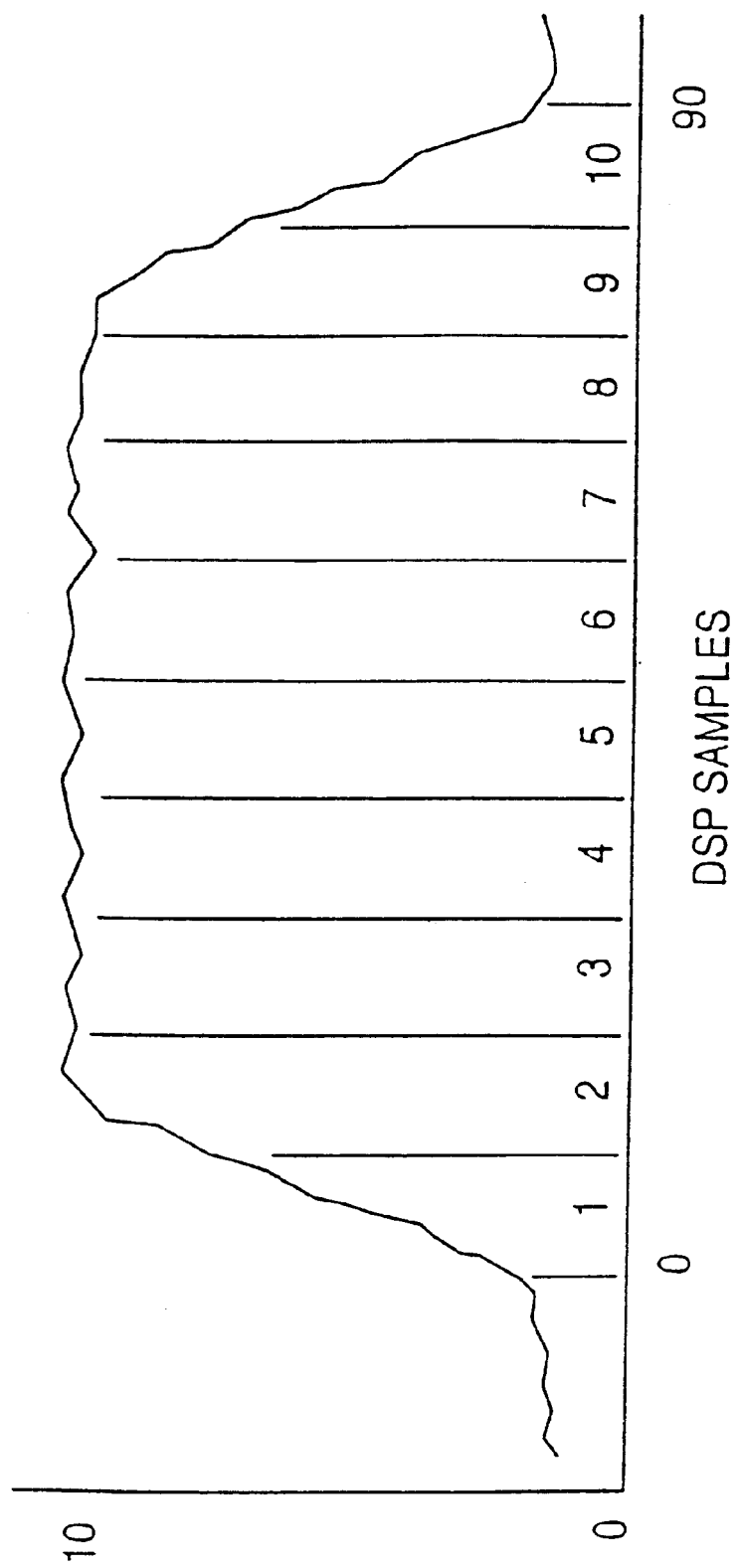
FIG. 22 illustrates the integration of the detected pulse width modulation subcarrier in accordance with FIG. 10B by the digital signal processor of the radio frequency receiver of the present invention.

The integration of a squarewave subcarrier with each half being pulse width modulated with four bits (numerical widths varying between one and sixteen), as illustrated in FIGS. 10B and 12 as part of the demodulation process, is described as follows with reference to FIG. 22. In this simplified example, the digital signal processor takes ten samples of the detected subcarrier where in actual practice hundreds of samples would be taken. The previously stored sample values representing the waveform are processed by the digital signal processor to integrate the area under the waveform. In actual practice, the number of samples will be dependent upon the sampling speed of the A to D converter 422 and the clock speed of the digital signal processor. In this example, there is a fixed numerical value assigned to the X axis and a value that is representative of the received voltage V of the waveform on the Y axis. The digital signal processor uses these values to calculate a numeric sum for each sample. These numerical values of each sample are in turn summed to provide a summation or integration of all of the samples under the pulse width modulated waveform. The summation value of FIG. 22 is ninety. This number would be much larger in actual practice. The digital signal processor then uses its prestored program to look up the range of summation values stored in its lookup tables as described below in detail in conjunction with FIG. 25. Because of signal distortions, which are always present in a wireless environment, the lookup tables contain finite boundaries or numeric ranges that pertain to each of the sixteen possible binary combinations. FIG. 22 illustrates that for a value of ninety the four bit combination of zero, one, zero, one is obtained. Any summation within the numeric range of eighty-five to ninety-five is represented in subsequent signal processing of the serial information by the aforementioned four bit combination.

Like the example discussed above involving multiple phase modulation, products using digital modulation will have prestored ranges depending upon the design of the radio frequency receiver. If very low received voltages are summed, smaller summation ranges are obtained.

Figure 23A:
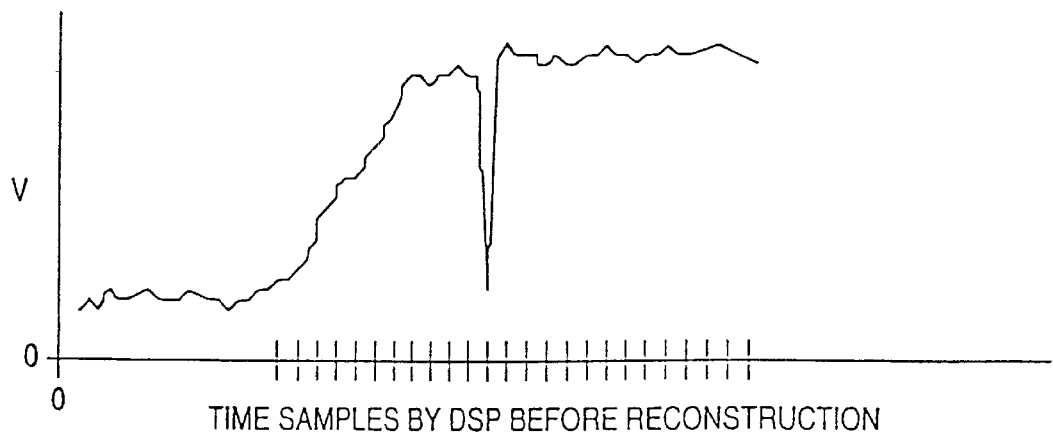
FIGS. 23A and 23B illustrate sample processing performed by the digital signal processor of the radio frequency receiver of the present invention to remove noise transients in a pulse width modulated subcarrier in accordance with the present invention.
Figure 23B:
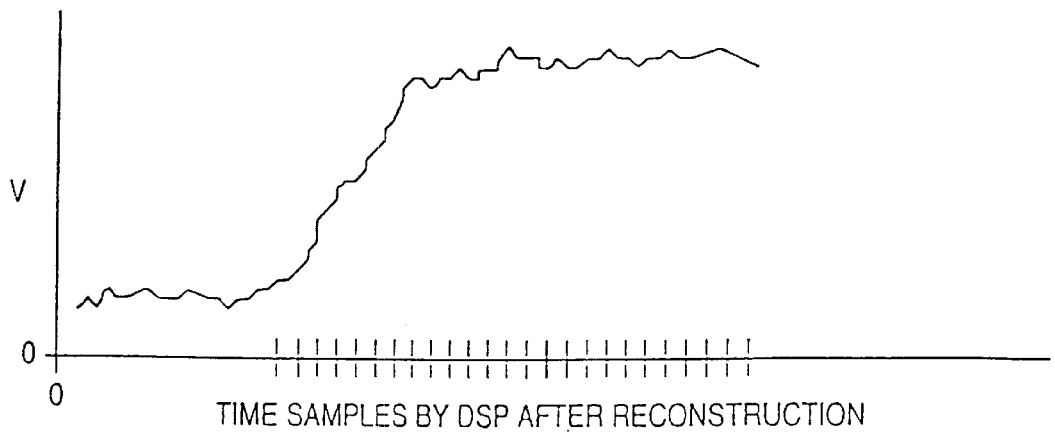

FIGS. 23A and 23B illustrate the sample processing of a half of a cycle of a pulse width modulated squarewave to eliminate the effects of noise which introduces error into the calculation of the integral of the half a cycle as described above in conjunction with FIG. 22. FIG. 23A shows the leading edge of the waveform that contains a noise transient. This negative going transient is not a portion of the actual pulse width modulated data and introduces error in the integration of the waveform by the digital signal processor. Sample signal processing is utilized to assist in the reconstruction of the pulse width modulated waveform to remove transients that are caused by noise and other man-made interference. While the digital signal processor is decoding the pulse width modulated waveform to transform the serial information into a series of numerical values each representing the range containing the calculated integral of each selected part, the numeric sample values encoded as groups of bits are stored in a temporary RAM memory. As illustrated in FIG. 23A, each of the samples is converted to a numerical value by an A to D converter 422 associated with the digital signal processor. The ROM associated with the digital signal processor stores a table of numerical ranges which represent valid sample values over the duration of a part of the cycle of the subcarrier which are to be included in the integration of the subcarrier. As illustrated, the numerical ranges are based upon expected ranges which occur for a particular radio frequency receiver design that represent signal levels which occur when the half of the subcarrier cycle is at its high or low level. For example, the illustrated transient is outside the numerical range of sample values which represent valid samples when the pulse width modulated carrier is at its high level. When a sudden or dramatic change in the A to D voltage reading occurs, as described above by the comparison of the sample value with a range of valid sample values, the digital signal processor is triggered to perform a series of calculations. Because of storage in a RAM buffer area of the sample values necessary to compute the integral, one or more sample values immediately before and immediately after a transient are used for signal processing to provide a replacement sample value. The replacement information is a function of sample values adjacent the sample value which is replaced. In one form of possible signal processing to replace the noise with a sample value more accurately representing what the actual sample values should have been, the immediately preceding and succeeding sample values are added and divided by the number of samples to be averaged to yield a replacement sample value average to fill in the erroneous sample caused by the noise transient. The resulting waveform appears in FIG. 23B as a small step that makes the resulting waveform more representative of the pulse width modulated waveform. In this example, if the preceding sample value from the A to D converter was 1 volt and the following reading was 1.1 volts, the replacement sample would have a value of 1.05 volts. This is considerably more accurate than the actual received pulse width modulated waveform that would have had a near zero value for the sampling period.

Figure 24A:
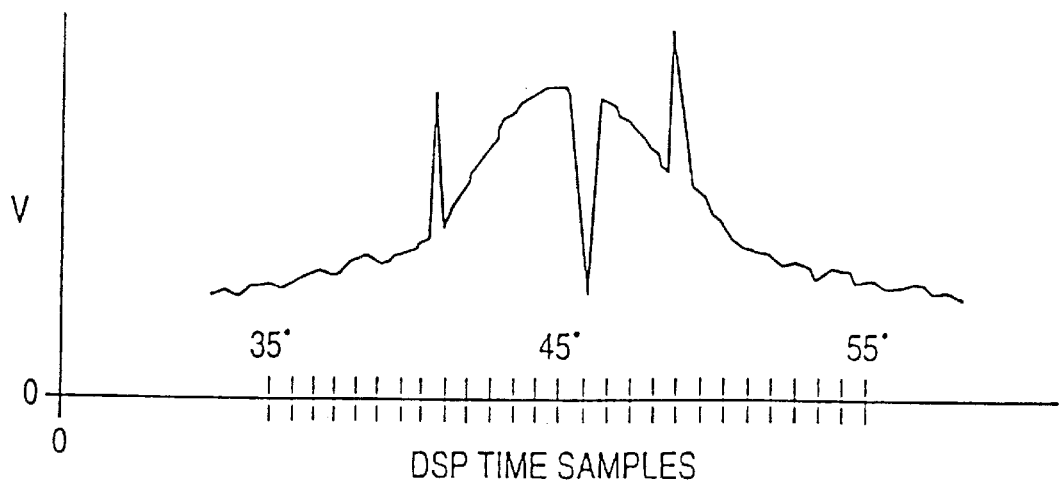
FIGS. 24A and 24B illustrate sample processing performed by the digital signal processor of the radio frequency receiver of the present invention to remove noise transients in a phase modulated sinusoidal subcarrier in accordance with the present invention.
Figure 24B:
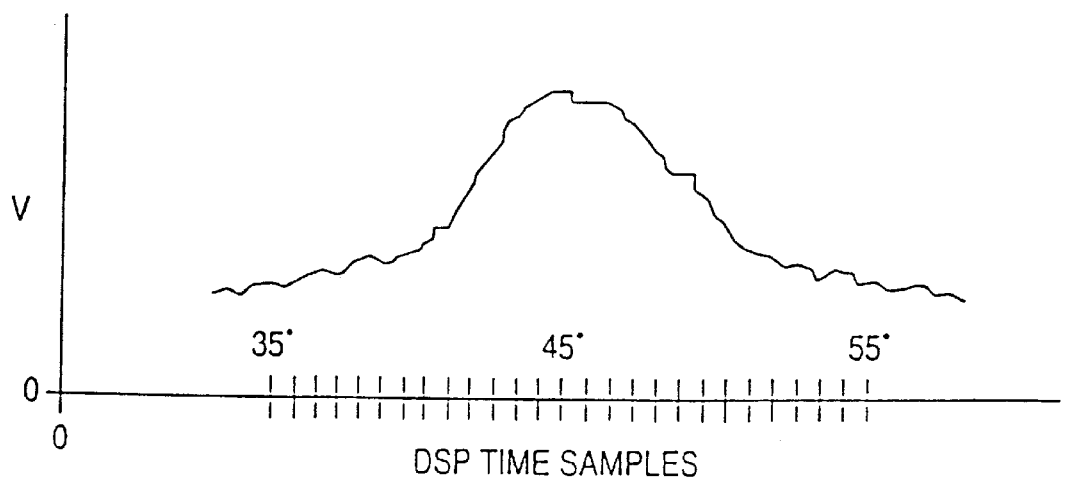

FIGS. 24A and B illustrate the reconstruction of a data waveform when modulation of the sinusoidal subcarrier is used as illustrated in FIGS. 10A and 11. In this example, the 45° phase being processed is modulated with binary information having noise riding on the data signal level. As discussed above in conjunction with the processing of a pulse width modulated waveform having noise riding on the data signal level, the digital signal processor stores the sample values in the temporary RAM buffer. As illustrated in FIG. 24B, each of the samples is converted to a numerical value by the A to D converter 422 associated with the digital signal processor. The ROM associated with the digital signal processor stores a table of numerical ranges which each represent valid sample values over the duration of a part of the cycle of the subcarrier which are to be included in the integration of the subcarrier. As illustrated, the numerical ranges are based upon expected ranges which occur for a particular radio frequency receiver design that represent signal levels which occur around the modulated phases of the subcarrier. For example, the illustrated transients are outside the numerical ranges of sample values which represent valid samples when the subcarrier is modulated with a one or zero as illustrated in FIG. 11 in the 20° window centered at 45°. When a series of voltage readings do not conform to the rate of rise or slope that would have been typical of valid binary encoding phase data, the signal processing is triggered to attempt to correct the data. The previous and subsequent voltage readings of the A to D converter 422 are added together and divided by the number of readings to substitute a more accurate sample value which would typically be present in the absence of noise for the sample value representing noise. As can be seen in FIG. 24B, the modified signal waveform resembles more closely and more accurately the actual transmitted data. When the digital signal processor now begins the integration process to determine if the phase information contained at the 45° phase sample is a binary one or zero, the accuracy of the integration (and, therefore, the determination) is considerably more accurate. FIG. 21A illustrates what the data would look like when subcarrier modulation is being transmitted. In FIG. 21A it can be seen that the binary value of the data at the 45° phase is a binary zero and the binary value of the data at the 135° phase is a binary one. When the radio frequency receiver 12 is located in an extremely noisy environment the aforementioned sample signal processing will serve to enhance and reconstruct the received data and will reduce the amount of error introduced by noise in the integrating process.

Figure 25:
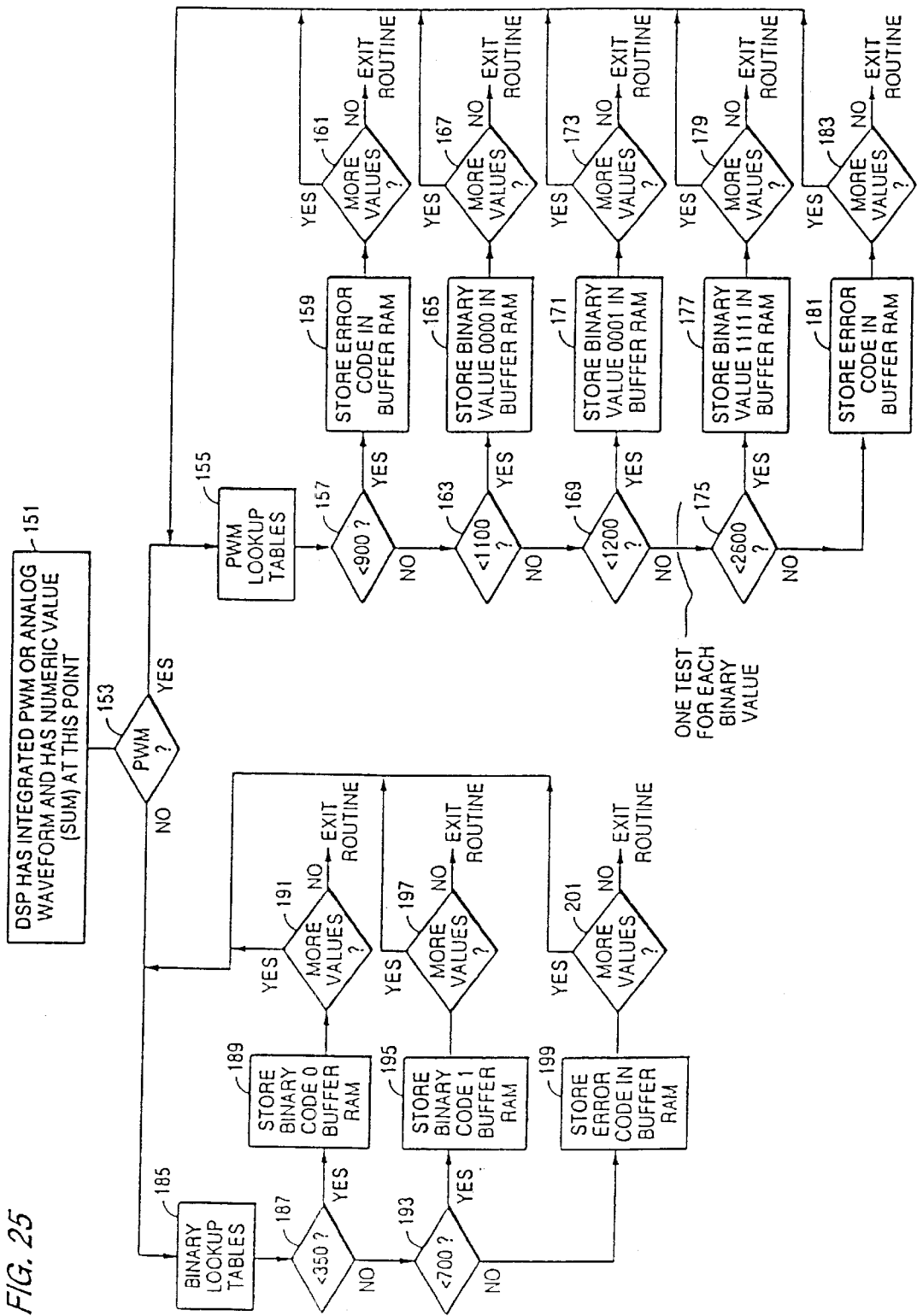
FIG. 25 is a flowchart of the operation of the digital signal processor of the radio frequency receiver of the present invention comparing integrals of the detected sinusoidal or digital subcarriers with prestored ranges to convert the serial information modulated on the subcarrier into a series of numerical representations of individual bits or groups of bits which are modulated on, the subcarrier in accordance with the protocol of FIG. 9.

FIG. 25 illustrates the processing of the digital signal processor which numerically compares each of the calculated integrals with a plurality of stored ranges which ranges each represent one of a plurality of possible numerical values that the selected part (one-half of a squarewave subcarrier or angular position of an analog subcarrier) may encode to identify a stored range numerically including the calculated integral and substituting for the at least one selected part of each of the cycles the one of the plurality of numerical values representative of the identified stored range including the calculated integral with each numerical value encoding at least a part of a data unit of the frames of information after the integrated value of the at least one selected part of a cycle of a subcarrier for a plurality of cycles has been determined which includes the integration of FIGS. 21A and B and 22 and the noise transient reduction of FIGS. 23A and B and 24A and B. The digital signal processor takes the obtained integrated value and looks up the resulting binary value of a single bit or a group of bits depending if the subcarrier modulation is analog or digital or equivalent in the prestored lookup tables. With reference to FIG. 25, the processing proceeds from step 151 where integration is completed to decision point 153 where a determination if the modulation is analog (multiple phase at spaced apart angular positions of the subcarrier of FIG. 10A) or digital (pulse width modulation of halves of the squarewave subcarrier of FIG. 10B) is made. If the answer is "yes" at decision point 153, processing proceeds to step 155 where the lookup tables for processing the integration of pulse width modulation of a half of a cycle of the subcarrier are accessed. The stored ranges are each 100 in magnitude. Processing proceeds to step 157 where a determination is made if the value of the integration is less than 900. A value at decision point 157 of less than 900 indicates that the pulse width modulated waveform has an inherent problem making the comparison process invalid. If the answer is "yes" at decision point 157, the processing proceeds to step 159 where an error code is stored in a buffer within the RAM. Processing proceeds from step 159 to decision point 161 where a determination is made if all of the stored integration values which are being group processed have been processed. If there are more values to be processed, the program loops back to step 155. Otherwise, the processing is complete. If the answer at decision point 157 is that the integral value is not less than 900, processing proceeds to decision point 163 where a determination is made if the integral is less than 1100. If the answer is "yes" at decision point 163, a four bit binary value of 0000 is stored at step 165 in the buffer RAM which represents at least a part of an information unit of the serial information. Processing proceeds to decision point 167 where a determination analogous to decision point 161 is carried out. If the answer is "no" at decision point 163, processing proceeds to decision point 169 where a decision is made if the integral value is less than 1200. If the answer is "yes" at decision point 169, processing proceeds to step 171 where a binary value of four bits of 0001 is stored in the buffer RAM. The processing proceeds to step 173 which is analogous to decision point 167. The broken line labelled "ONE TEST FOR EACH BINARY VALUE" indicates testing of the integral values for a series of increasing ranges which are increased in steps of 100 to determine if the binary values representing four bit groups between 0010 and 1110 should be stored in the buffer RAM. Decision point 175 represents the last test where a determination is made if the integration value is less than 2600. If the answer is "yes", the processing proceeds to step 177 where the four bit binary valve 1111 is stored in the buffer RAM. The processing proceeds from step 177 to decision point 179 which is analogous to decision points 167 and 173. If the answer is "no" at decision point 175, processing proceeds to step 181 where an error code is stored in the buffer RAM indicating that the integration value is greater than that which would be predicted by the prestored values (ranges) for each of the sixteen binary combinations. The processing then proceeds to decision point 183 which is analogous to decision points 167, 173 and 179.

If the answer at decision point 153 is "no", the processing proceeds to step 185 where the range for the binary values of one and zero are accessed for comparison with the integration value obtained at step 151 for the modulated separated angular phases of the subcarrier. The binary lookup tables are different than the pulse width modulation tables and are representative of the boundary between "1" and "0" values present in FIG. 21A for each of the separated angular phases which are modulated on the subcarrier. The integrated value falls within a range on one or the other side of the boundary for each separated angular phase which controls whether the modulation of the subcarrier at the separated angular positions is decoded as a one or a zero. When the integration process is completed, the processing compares the integrated value with ranges that define on which side of the boundary the actual integration lies. In this process the processing proceeds to decision point 187 where a determination is made if the value of the integral is less than 350. If the answer is "yes" the processing proceeds to step 189 where a binary zero is stored for the angular phase in a buffer RAM. The processing proceeds to step 191 where a determination is made if more values are to be processed. This step is analogous to steps 161, 167, 173, 179 and 183 previously described. If the answer is "no" at step 187, processing proceeds to decision point 193 where a determination is made if the value of the integral is less than 700. If the answer is "yes", processing proceeds to step 195 where a binary one is stored in a buffer RAM. The processing proceeds from step 195 to decision point 197 where a decision is made analogous to decisions 161, 167, 173, 179, 183 and 191 described above. If the answer is "no" at step 193, the processing proceeds to step 199 where an error code is stored in the buffer memory analogous to steps 159 and 181 as previously described. The processing proceeds from step 199 to decision point 201 which is analogous to decision points 161, 167, 175, 179, 183, 191 and 197.

The contents of the buffer RAM store a group of binary values representative of individual bits when multiple phase modulation at separated angular positions is modulated on the subcarrier and groups of bits representative of the possible modulated numerical values when pulse width modulation is modulated on the subcarrier. The contents of the buffer RAM store the detected serial information containing the detected IDENTIFICATION FRAME GROUP or modifications thereof for subsequent processing by the digital signal processor. Any errors caused by fading or other transmission faults which render one or more bits of individual frames erroneous and uncorrectable or a sequence of frames including whole frame groups which are erroneous are contained at this time in the buffer RAM. The digital signal processor detects when an error is present in each frame by processing the error correction code embedded in the frames of the stored serial information as described below.

Although the previously described sample processing will serve to remove transients that may produce the decoding of erroneous data when large errors are introduced into the calculation of the integrals, it is still possible that the integration of the data modulated on the subcarrier at a particular phase would result in an erroneous detection. Many discriminators in radio receiving electronics have finite voltage limits when data is being detected. When the radio frequency receiver is designed for low voltage operation, the recovered data will be between zero and one volt in amplitude. However, in many types of discrimination there are particular combinations of interferences (typically, adjacent channel interference) that can cause a noise signal to be much greater in amplitude than the one volt level. These spikes or noise may be as high as two or three times the expected amplitude and not be representative of a true received data signal. The problem is more prevalent when multiple phase data is being decoded as this type of adjacent channel noise that is detected by the discriminator contributes greatly to distorting of the detected waveform and may change a binary zero to a binary one and a binary one to a value much greater than what a binary one is predicted to be. As previously described, the sample signal processing has finite limits on an amount of data interpretation that can be accomplished. Specific high and low boundaries must be placed in the lookup tables to prevent such data interpretation from being considered invalid. This is the reason for finite boundary values as discussed above in processing both multiphase and pulse width modulation of the subcarrier. The boundaries and the need for such boundaries will be dependent upon the receiving circuitry design of the particular product. Therefore, the boundaries represented by decision points 159, 181 and 199 may or may not be necessary in the receiving circuitry of a particular multiple phase or pulse width modulation application of the receiving circuitry which can make steps 159, 181 and 199 unnecessary. If the receiving circuitry is based exclusively upon either the multiphase or pulse width modulation protocol of FIGS. 10A and B, decision point 153 may be omitted with only the necessary part of the processing for the particular protocol being included in the receiving circuitry.

Figure 26:
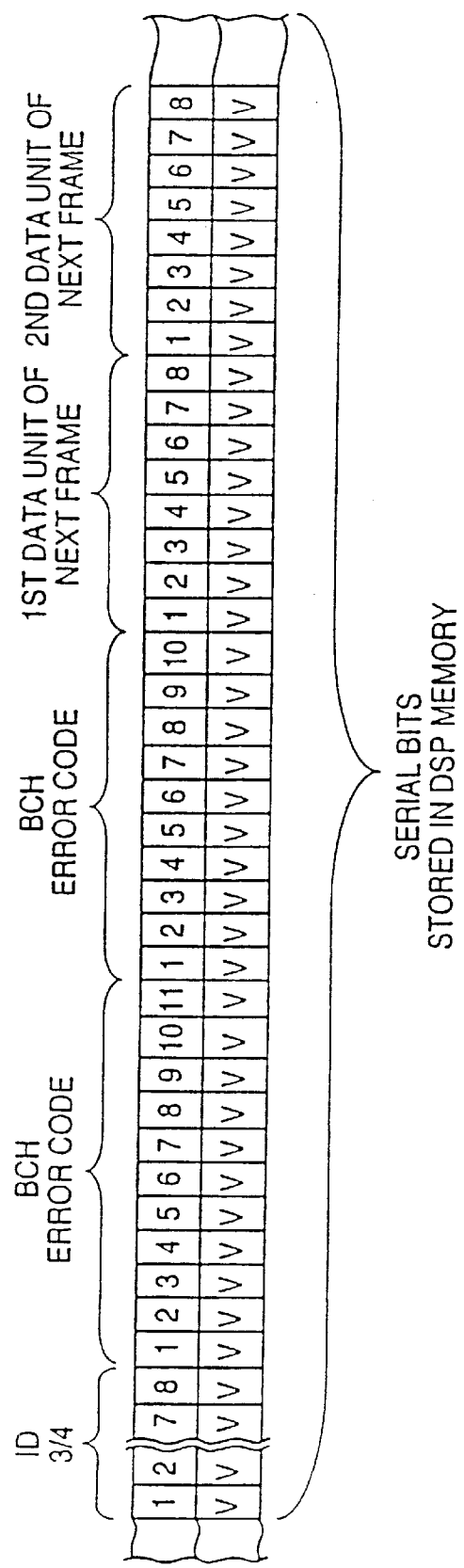
FIG. 26 illustrates a valid bit pattern of the frames in accordance with FIG. 9.

FIG. 26 illustrates a representation of bits of the fourth and fifth frames of the IDENTIFICATION FRAME GROUP in accordance with FIG. 9, after detection of the transmitted radio frequency carrier and demodulation of the subcarrier including the processing of FIG. 25. The bits of the error correction field are discarded when decoding is completed without any erroneous uncorrectable bits. This leaves the decoded bits for subsequent processing such as outputting of the data units or data bits for determining if the decoded identification code matches one of the identification codes of the radio frequency transmitters 14, 16 and 18 which the radio frequency receiver 12 is programmed to track and further information such as, but not limited to, the status of the "panic" switch 114. The data bits of FIG. 26 are all valid data bits which do not require reconstruction by the radio frequency receiver as described below in conjunction with FIGS. 27–29. As is illustrated in FIG. 26, a broken vertical line in the left-hand portion of FIG. 26 indicates a break in the time base between bits 2 and 7 in the tenth data unit. The upper series of numbers in the horizontal row of boxes, as indicated above, identifies bit positions within the fourth frame. The lower boxes containing the legend "V", which are for illustration purposes only, identify that the data is valid which signifies that the frame has been processed with the error correction code and no data bits within the frame have been found to be invalid beyond the bit error correction capacity of the error correction code. It should be understood that the use of the identifying letter "V" is not actually stored in the memory associated with the digital signal processor. The error correction code bits have a value which is a function of the bits of the data units contained in the frame. The actual value of the data bits and the functionally related error correction code bits has not been shown because it is not necessary for understanding the invention. In summary, FIG. 26 illustrates an example of the stored valid data which occurs when the error correction code capability of a frame is not exceeded, i.e. all bits are valid in the IDENTIFICATION FRAME GROUP of FIG. 9B stored in the radio frequency receiver RAM after processing with the error correction code is completed.

Figure 27:
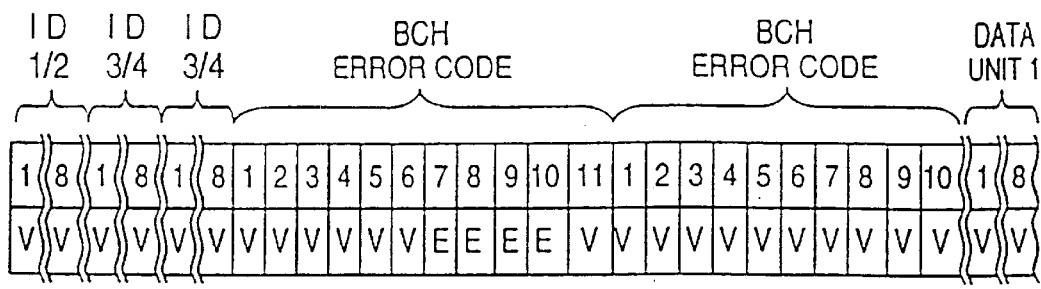
FIGS. 27–29 illustrate examples of bit patterns of frames in accordance with FIG. 9 containing erroneous uncorrectable bits that are processed by the digital signal processor of the radio frequency receiver of the present invention to attempt to reconstruct valid data which cannot be recovered by processing the frames with only the error correction code.
Figure 28:
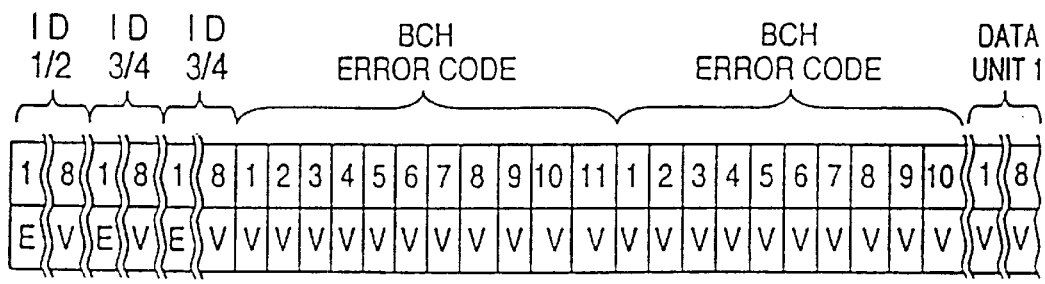
Figure 29:
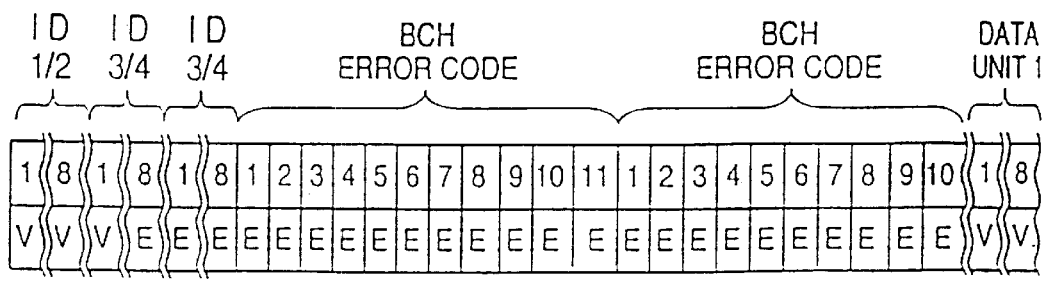

FIGS. 27–29 illustrate frames which contain at least one erroneous uncorrectable bit. As illustrated in FIGS. 27–29, like in FIG. 26, vertical wavy lines indicate time breaks between bit positions of a particular frame. The top horizontal row of numbers in FIGS. 27–29, like in FIG. 26, identify particular bit positions within the data units and within the error correction code of a frame within an IDENTIFICATION FRAME GROUP of a format of FIG. 9. The bottom series of letters use a "V" to identify valid data, and an "E" to identify erroneous bits which cannot be corrected by the processing of the bits of the frame with error correction code. It should be understood that the use of the identifying letters "V" and "E" are only for illustrative purposes and are not actually representative of data stored in the memory associated with the digital signal processor which, of course, is bit values of one or zero. Again, like in FIG. 26, knowledge of the actual value of the data units and error correction code is not necessary to understand the examples of FIGS. 27–29 illustrating erroneous uncorrectable bit patterns comprised of bits identified by the letter "E". Typically, the BCH 45/21 error correction code which is used with the protocol of FIG. 9 has the ability to correct up to two bit errors per frame. With the prior art, the presence of erroneous uncorrectable bits results in erroneous information because there was no processing capability provided in the receiving circuitry receiving a wireless transmission of information to recover erroneous bits after the error correction capacity of the error correction code is exceeded as is indicated symbolically by the letter "E" in FIGS. 27–29.

The error recovery and reconstruction capability of the present invention is based upon the processing capability of at least one processor within the embodiment 400 radio frequency receiver 12, which preferably is at least one digital signal processor as illustrated in FIG. 15, to detect erroneous bit patterns in the field of the error correction code bits after processing of the frame with the error correction code. The erroneous bit patterns either contain a series of all zeros or all ones of a number exceeding the bit error correction capacity of the error correction code. That is, if the BCH error code bit error correction capacity is two bits, a pattern of at least three or more all zeros or all ones would be the object of the pattern search. Once the error correction code has been processed in each frame and the computation result indicates that at least one erroneous bit is present, which signifies exceeding of the error correction capability of the error correction code contained in the frame, the digital processor searches the stored bits to look for the aforementioned erroneous bit pattern of all zeros or all ones located totally within the error correction bit field. Detection of these patterns and their position within the stored bits in memory by bit shifting or other known techniques after computation by the digital signal processor that at least one erroneous uncorrectable bit is present in a frame is used to determine in which bit positions the erroneous uncorrectable bits are present. If these bit patterns are found to be totally within the error correction code bit field, valid bits outside the bit field of the error correction code (data) are recovered and reconstructed as explained below in conjunction with FIG. 27 with the error correction code bits being discarded. If the pattern of all zeros or all ones is not found to be totally within the error correction code bit field, the data bits cannot be recovered and reconstructed which requires that further processing of the data bits of the frame not be undertaken. An uncorrectable error in the identification code will disqualify the use of the RSSI signal produced by that transmission. However, if an erroneous uncorrectable bit is present in frame four, which contains the bit field CB used to encode commands and the status of the "panic" switch 114, the resultant RSSI signal will be further processed to determine if it should be used as part of the average computation process as described above and below. All of the frames of the IDENTIFICATION FRAME GROUP of FIG. 9 may be reconstructed to recover otherwise erroneous uncorrectable data bits. Recovery of data bits, which would be erroneous when error correction code is the exclusive recovery mechanism, facilitates the ranging and tracking process by qualifying the greatest number of RSSI signals for subsequent processing as described above qualifying the greatest number of receptions of the identification code.

The digital signal processor processes the stored bits of the data frames within the IDENTIFICATION FRAME GROUP with the error correction code therein to determine if the plurality of bits of the frames do not contain any erroneous uncorrectable bits which dictates that the data be stored as valid data and the error correction code be discarded. If at least one erroneous uncorrectable bit signified symbolically by the letter "E" in FIGS. 27–29 which cannot be corrected with the error correction code is located, the digital signal processor processes the stored bits of the frames which contain the at least one erroneous uncorrectable bit somewhere therein to determine if the frames contain only valid data bits in the data field signified by the erroneous bits (the aforementioned multibit pattern of zeros or ones) being totally in the error correction code field which is illustrated in FIG. 27 which renders the data bits valid and the error correction is discarded.

As is illustrated in FIGS. 28–29, all of the data bits are not valid as symbolically identified by the letter "E" outside the error correction code bit field which renders the data bits of the frames of FIGS. 28 and 29 invalid. In FIGS. 28–29, the pattern of erroneous uncorrectable data bits identified by the letter "E" is not totally contained in the error correction code bit field which makes it impossible for the digital signal processor to discriminate whether or not any of the data units contain valid data. It is not possible to determine reliably whether any of the eight bit data unit bit groups illustrated in the IDENTIFICATION FRAME GROUPS of FIGS. 28 and 29 are valid data when erroneous uncorrectable bits are not totally present within the error correction code, as, for example, being totally contained in the data units in FIG. 28 or spanning the error correction bit field and the data unit bit field as illustrated in FIG. 29.

The process of determining whether valid data can be reconstructed from frames of the IDENTIFICATION FRAME GROUP containing at least one erroneous uncorrectable bit by processing the error correction code of the frames can only be successfully performed in situations when minor fades or transmission errors occur where synchronism is not lost and when the bit error correction capacity of the error correction code is exceeded. As illustrated in FIG. 27, only the circumstance when the error correction code bit field is determined by the aforementioned pattern recognition capability of the digital signal processor to totally contain a successive pattern of all zeros or all ones, such at least three successive bits when the BCH code is capable of correcting for a two bit error, represents recoverable and reconstructible data.

After the reconstruction is complete, there no longer is a need for processing the error correction code bits. Thereafter, the error correction code bits are discarded and only the bits of the data units of the frames (bits other than error correction code) are stored in memory for further processing to identify if the radio frequency carrier contained a valid identification code of a radio frequency transmitter and what the status of the "panic" switch 114 is and any other information from the radio frequency transmitters 14, 16 and 18 which are assigned to the radio frequency receiver for tracking or monitoring functions, etc. Thereafter, processing of the RSSI signals and the status of the "panic" switch 114 as described below is preformed by the digital signal processor.

The radio frequency receiver embodiment 400 must perform a multiplicity of functions in order to reliably monitor and track the transmitters 14, 16 and 18. Battery longevity is an important concern. The radio frequency receiver embodiment 400 and the radio frequency transmitter embodiment 100 are designed to be a portable product with the battery lifespan being maximized by the operating software of the digital signal processors contained in the radio frequency receiver and radio frequency transmitter by performing numerous power management functions. The power management functions of the radio frequency transmitter embodiment 100 have been described above. In the radio frequency receiver embodiment 400 only those circuits which need to be in operation at a given time are turned on to conserve battery lifespan.

Figure 30:
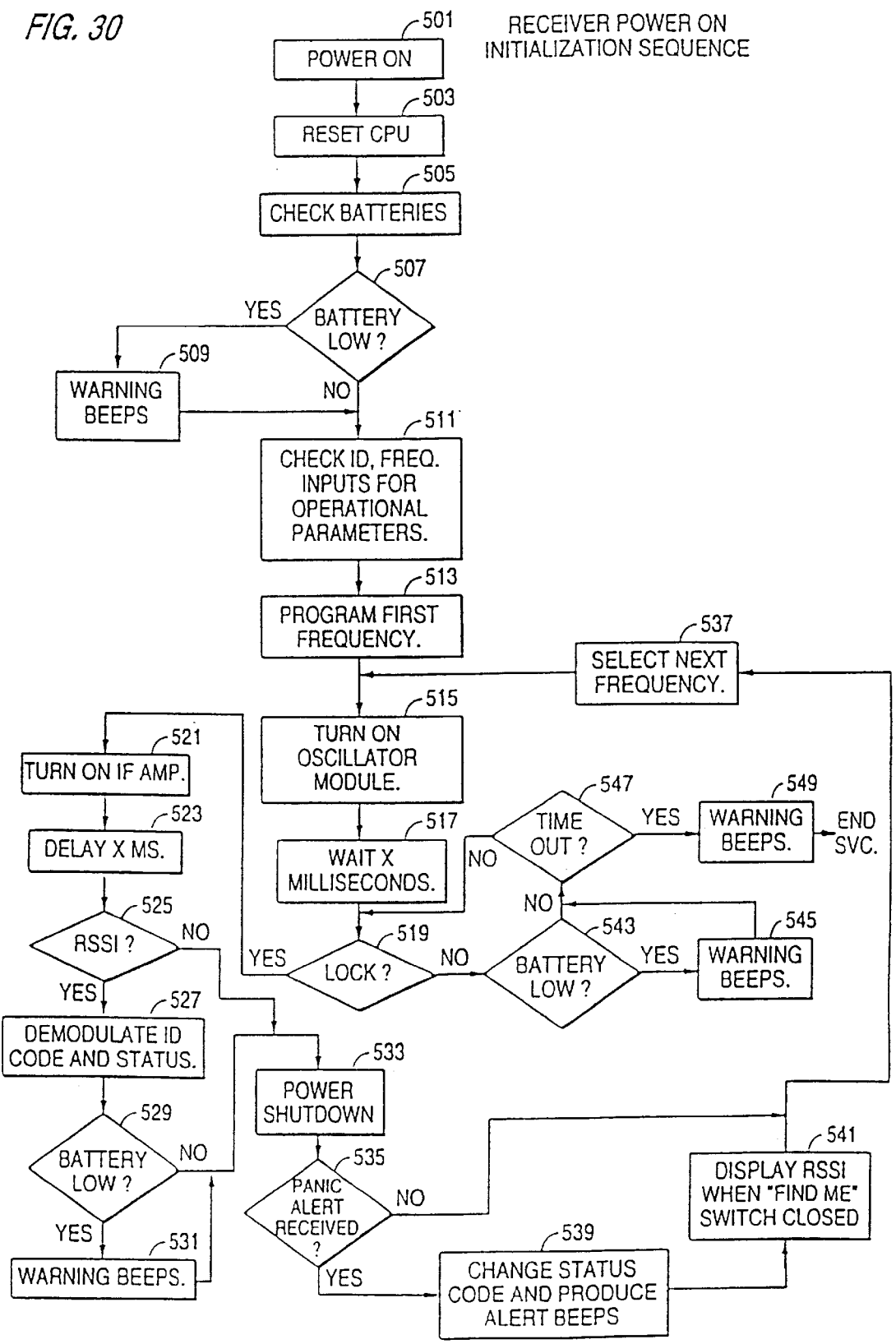
FIG. 30 illustrates a block diagram of the operation of the radio frequency receiver including the power on and initialization sequence.

FIG. 30 is a flowchart of the operation of the radio frequency receiver embodiment 400 including battery conservation and initialization techniques. Operation proceeds from the turning on of the power at point 501 to point 503 where the control CPU 402 is reset. At point 505 the potential of the batteries is read. Processing proceeds to decision point 507 where a determination is made if the battery voltage as read at point 505 is sufficient to provide sufficient power to begin the receiving process. If the answer is "yes" at decision point 507, processing proceeds to point 509 where the digital signal processor causes the alert 428 to emit warning beeps. If the answer is "no" at decision point 507 or the warning beeps have been emitted at point 509, processing proceeds to point 511 where the digital signal processor causes a check to be made of the factory programmed inputs for the operational parameters of the radio frequency receiver embodiment 400. These operating parameters include the specified series of frequencies (e.g. fifty) on which the radio frequency receiver embodiment 400 will receive the IDENTIFICATION FRAME GROUP of FIG. 9 from each of the radio frequency receivers 14, 16 and 18 that are being monitored by the radio frequency receiver. The digital signal processor commences at point 513 to program the first radio frequency carrier frequency by sending a serial stream of digital data to the synthesizer and phase lock loop 404. Upon programming the start frequency, the digital signal processor turns on the voltage controlled oscillator 410 as indicated at point 515. The operation proceeds to point 517 which is wait period during which the digital signal processor looks to receive the lock on signal from the phase lock loop of the synthesizer/phase lock loop 404.

The lock on time of the phase lock loop of the synthesizer/phase lock loop 404 may vary depending upon the components of the loop filter as well as the battery voltage. As the battery voltage drops, the lock on time becomes progressively longer until, at some point in time, a frequency lock on condition cannot be achieved. This is due to the fact that the batteries no longer have sufficient voltage to provide the necessary power to the voltage controlled oscillator 410 (and other circuits) to maintain the radio frequency receiver embodiment 400 in an operational status. Processing proceeds to decision point 519 where a determination is made if the lock on signal has been received. If the answer is "yes" at decision point 519, processing proceeds to point 521 where the intermediate frequency amplifier in the bandpass filter/intermediate frequency amplifier 416 is turned on. Processing proceeds to point 523 where a set delay of a number of milliseconds is allowed to expire to provide sufficient time for the intermediate frequency amplifier of the bandpass filter/intermediate frequency amplifier 416 to come up to an operational status. Processing proceeds to decision point 525 where a determination is made if a RSSI signal is being outputted by the bandpass filter/intermediate frequency amplifier 416. If the answer is "yes" at decision point 525, processing proceeds to point 527 where the IDENTIFICATION FRAME GROUP is decoded including demodulating the identification code of the transmitter and the status of the "panic" switch 114 of the radio frequency transmitter embodiment 100 as encoded in the field CB of the IDENTIFICATION FRAME GROUP. Processing proceeds to decision point 529 where a determination is made if the battery voltage is low. If the answer is "yes" at decision point 529, processing proceeds to point 531 where warning beeps are caused to be emitted by the alert 428. If the answer is "no" at decision point 529 or warning beeps have been emitted at point 531, processing proceeds to point 533 where the digital signal processor 402 begins an orderly shut down process of unnecessary receiving circuits which consume power and begins the analysis of the data contained in the CB field, as well as the processing of data units 1–5, if the data units 1–5 of the IDENTIFICATION FRAME GROUP contain any necessary data for the operation of the radio frequency receiver embodiment 400. The embodiment 400 does not use data units 1–5 to perform range monitoring and directional tracking. If the answer was "no" at decision point 525 that no RSSI signal is being outputted by the bandpass filter/intermediate frequency amplifier 416, processing proceeds to the power shutdown point 533 as described above. If no RSSI signal voltage is outputted by the bandpass filter/intermediate frequency amplifier 416, the digital signal processor immediately begins the power down sequence. The presence of the RSSI voltage is an indication that a transmitted radio frequency carrier is present and therefore, the decoding process should be enabled. If the RSSI voltage is not present, this is an indication that there is no longer a need for the radio frequency receiver embodiment 400 to remain on as none of the radio frequency transmitters 14, 16 and 18 are transmitting at this time.

If upon successfully receiving the identification code and the status code, contained in the field CB of the IDENTIFICATION FRAME GROUP, the digital signal processor examines the field CB to see if an alert status has been received which is caused by the user of the radio frequency transmitter closing the "panic" switch 114. Processing proceeds from point 533 to decision point 535 where a determination is made if the field CB of the IDENTIFICATION FRAME GROUP contains an indication of a "panic" status produced by the user of the radio frequency transmitter closing the "panic" switch 114. If the answer is "no" at decision point 535, processing proceeds to 537 where the digital signal processor selects the next frequency of the staircase sequence of radio frequency carrier frequencies on which the radio frequency receiver embodiment 400 is receiving transmissions. If the answer is "yes" at decision point 535, processing proceeds to point 539 where a change in the status code is made and the digital signal processor produces alert beeps with the alert 428. Processing proceeds to point 541 where a waiting period is entered permitting the user of the radio frequency receiver to close the "find me" switch 426. Closing of the "find me" switch 426 by the user of the radio frequency receiver embodiment 400 causes the digital signal processor to change its software routine to convert the antenna array 405 to a directional array, as described above, and to further activate the LCD or LED display 424 to display the magnitude of each successive RSSI signal, which is preferably the integral thereof, as part of the tracking process as described above in conjunction with FIG. 2. The processing proceeds from point 541 to point 537 where the next received frequency is programmed into the synthesizer/phase lock loop 404. If the answer is "no" at decision point 519, processing proceeds to decision point 543 where a determination is made if the battery voltage is low. If the answer is "yes" at decision point 543, processing proceeds to point 545 where the digital signal processor causes warning beeps to be emitted analogous to those admitted at point 531. If the answer is "no" at decision point 543 or warning beeps have been emitted at point 545, processing proceeds to decision point 547 where a determination is made of whether a time interval has elapsed which signifies that the radio frequency receiver embodiment 400 cannot lock onto the commanded frequency. If the answer is "no" at decision point 547, processing proceeds back to decision point 519 as described. If the answer is "yes" at decision point 547, processing proceeds to point 549 where warning beeps are emitted which are analogous to the warning beeps at points 545 and 531 as described above.

The lowest operating voltage of the batteries is obtained when all of the electronics are turned on including the LCD or LED display 424 (if the turning on of all of the electronics causes the voltage to drop below the minimum threshold, the digital signal processor begins the battery low alerts to indicate to the user that the batteries are in need of recharging).

When the receipt of a valid identification code has been verified, a large number of samples are taken of the RSSI signal voltage produced by the output of the intermediate frequency amplifier which is part of the bandpass filter/intermediate frequency amplifier 416. For example, if the transmitted duration of the IDENTIFICATION FRAME GROUP is 100 milliseconds, thirty to forty RSSI samples may be taken during this period. This integration process tends to cancel out the rapidly fluctuating electrical noise which rides on the top of the average value of the RSSI signal. The electrical noise is a product of the environment in which the radio frequency receiver 400 embodiment is operating.

Figure 31:
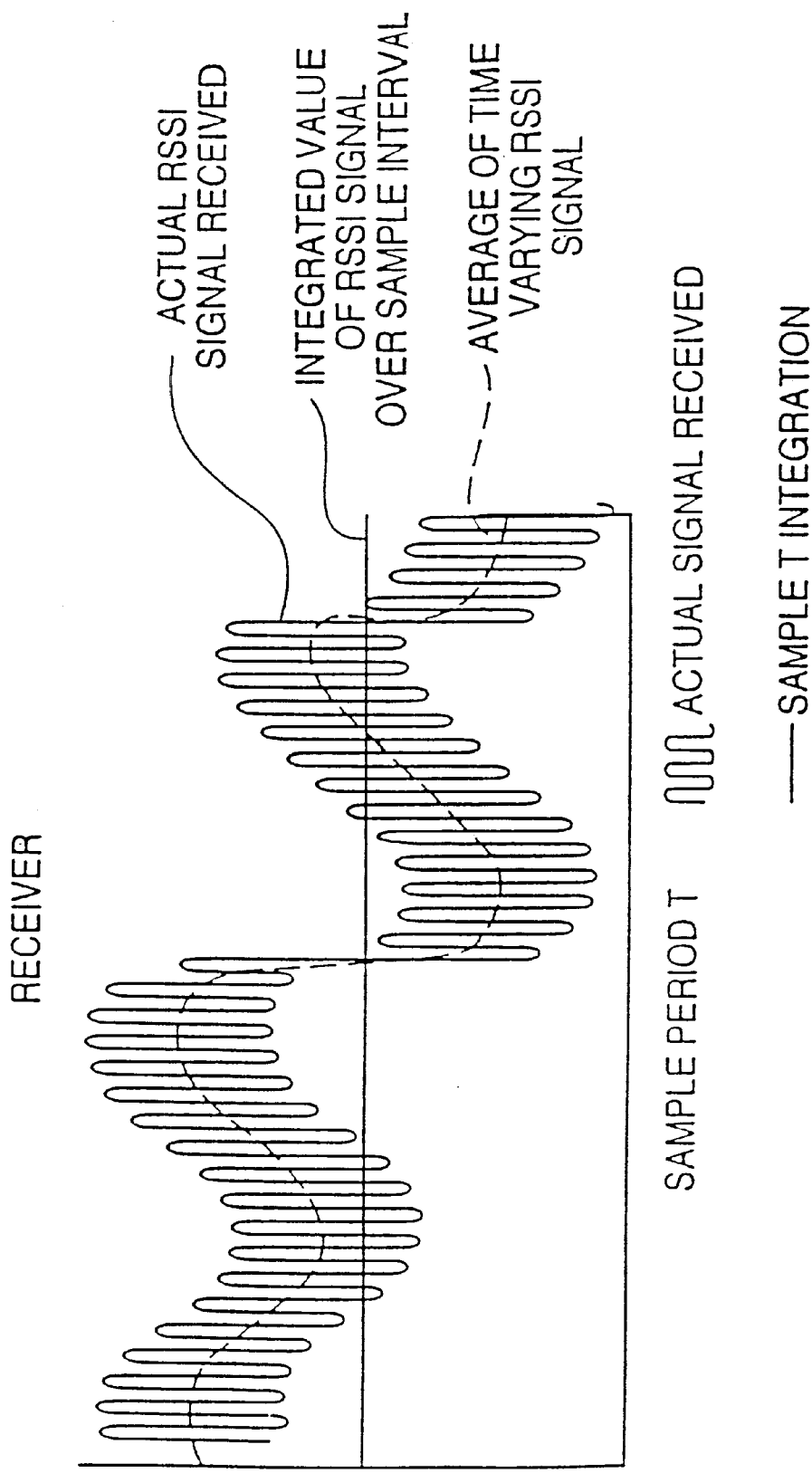
FIG. 31 illustrates a waveform of a RSSI signal and its processing during a single transmission interval of the identification code of a radio frequency transmitter being tracked by the radio frequency receiver of the present invention.

FIG. 31 illustrates a typical voltage fluctuation in a RSSI signal produced during the reception of the IDENTIFICATION FRAME GROUP which is preferably integrated to remove the rapidly varying noise which is indicated by the solid rapidly varying line illustrated in FIG. 31. The RF environment of the radio frequency receiver embodiment 400 is typically hostile and, as illustrated, the average RSSI signal amplitude also varies more slowly in amplitude due the effects of Rayleigh fading and multipath signals as indicated by the dotted line. The more slowly varying noise would contribute significantly to erroneous calculation of the transmitter's range if the effects of this noise were not eliminated by an averaging or integration of the RSSI signal over the entire sampling period T, as described above, where a running average of successive integrated RSSI signal samples for each of the radio frequency transmitters 14, 16 and 18 is made by the digital signal processor in order to determine if any one of the radio frequency transmitters exceeds the set range 20 as described above. The integration or averaging process which yields the true integral value over the sample interval T, by taking numerous samples, removes the rapidly and slowly varying electrical noise to produce an integrated value as indicated by a solid horizontal line of the RSSI signal which does not contain the effects produced by Rayleigh fading, etc. The solid line represents the actual integrated value of all of the samples over the entire sampling period T which corresponds to the time of reception of the IDENTIFICATION FRAME GROUP. Each of the multiple samples are taken in relation to each other to provide the actual voltage variation represented by the dotted line in FIG. 31. Upon completion of the sampling period T, all of the samples are summed and divided by the number of samples to provide the average or integration value over the reception period of the IDENTIFICATION FRAME GROUP period as indicated by the solid horizontal line.

The rationale behind the averaging process performed by the integration as described above in conjunction with FIG. 31 is that the radio frequency transmitter is designed to be worn by a small child and therefore, only relatively small changes in the average RSSI signal will occur as a consequence of actual motion of the child. As has been explained above, the broadcast of the identification code may occur at a frequency of up to ten times per second which means that the relative motion which could occur between the successive transmissions by the radio frequency transmitter is small.

As is apparent from FIG. 31, over the sample period T, significant variation occurs in the RSSI signal which is not caused by motion of the user of the radio frequency transmitter embodiment 400. In fact, quite typically, the entire reading may be averaged to be higher or lower than that which would be representative of the actual distance of the radio frequency transmitter 14, 16 or 18 from the radio frequency receiver 12 due to the effects of Rayleigh fading and multipath interference. A second integration or averaging of the individual RSSI integrations, each represented by the horizontal solid line in FIG. 31, is necessary to most reliably determine the distance of the radio frequency transmitters 14, 16 and 18 from the radio frequency receiver 12.

During the receiving process, the digital signal processor is performing two simultaneous tasks. The first is the analysis of the RSSI signals and the second is the verification of the identification code contained in the IDENTIFICATION FRAME GROUP. The digital signal processor must begin the RSSI signal sampling process immediately upon the onset of the signal reception. However, during this period of time, the radio frequency receiver 12 is unaware if the RSSI signal belongs to a transmitter which is being monitored by the radio frequency receiver. It is not until synchronization between the at least one transmitter 14, 16 and 18 and the receiver 12 is achieved under control of the digital signal processor and the receipt of a statistically reliable number of the digits of the identification code as described below or the entire identification code which is produced by the decoding of the identification code contained in the IDENTIFICATION FRAME GROUP that a determination can be made by the digital signal processor that the RSSI signal indeed corresponds to that of one of the monitored radio frequency transmitters 14, 16 and 18. If a match of the identification code does not occur, the averaged (integrated) RSSI signal data taken during the sampling of the RSSI signal is discarded. Only when verification occurs that the RSSI average (integration) data indeed belongs to one of the radio frequency transmitters 14, 16 or 18 being monitored, is the RSSI average data stored in a RAM memory of the radio frequency receiver embodiment 400.

Figure 32:
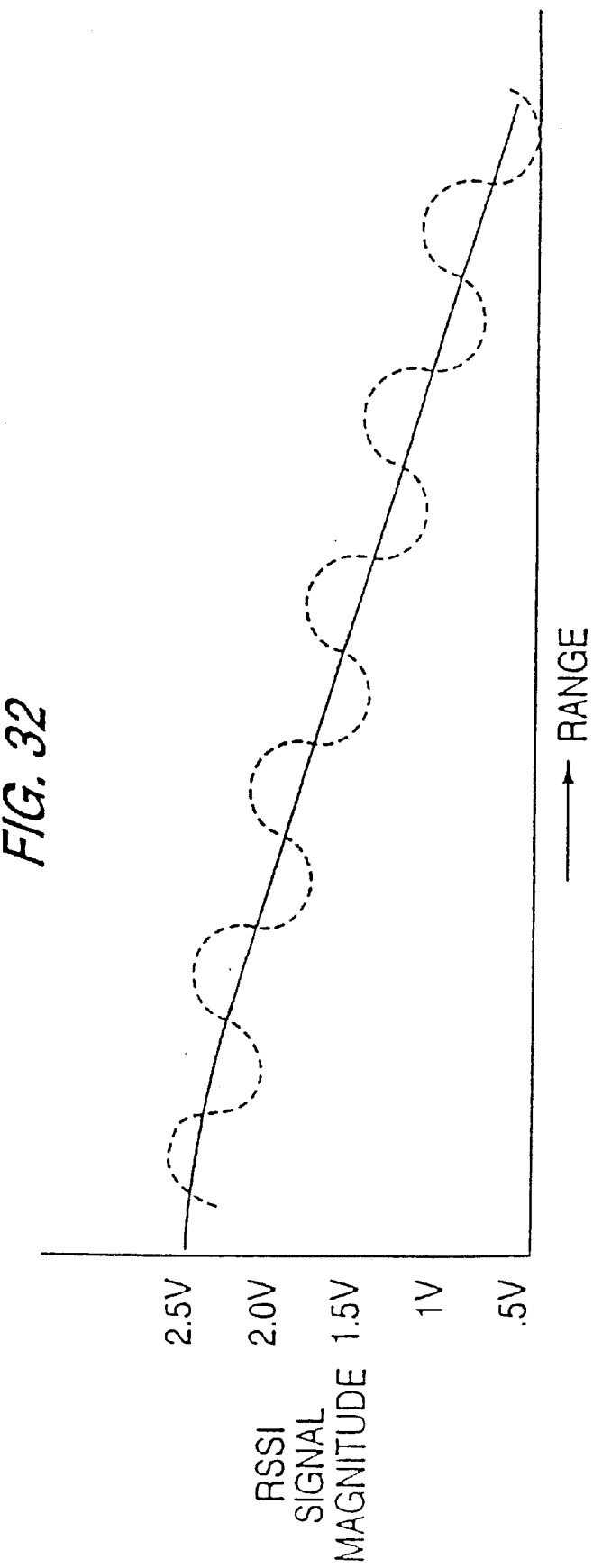
FIG. 32 illustrates the time variation of the individual integrated RSSI samples and their average as a function of relative movement between the radio frequency transmitter and the radio frequency receiver.

In order to obtain the most reliable distance information from the RSSI signal, a second integration or averaging process is performed which removes the effects of time variation on each integrated RSSI signal over the sampling interval T of FIG. 31 not representing the true received signal strength because of the effects of fading, etc. The dotted line in FIG. 32 represents the value of the integration of the RSSI signal of FIG. 31 which would occur at any instant in time as a function of distance. Over time for a fixed distance, the value of the individual integrations of each radio frequency carrier transmission containing a valid identification code as illustrated in FIG. 31 would vary on both sides of the solid line. Thus, the dotted line will vary over time and, at any single point in time, represents at any fixed distance the instantaneous value of each integration of FIG. 31. The second integration or averaging represented in FIG. 32 removes the effects of this time variation on the magnitude of the integrations of FIG. 31 so that the time averaged or integration of the integrated samples of FIG. 31 represented by the solid line is purely a function of distance.

Furthermore, as explained above, each successive integrated RSSI sample is first tested to make sure that its reading is not above or below a certain predetermined function, as described above, which is indicative of a Rayleigh fade or multipath interference or other signal degrading phenomena. If the most current integrated RSSI signal is above or below the previous integrated average by a function, such as twenty percent, of the average of the integrated RSSI signals, the sample is discarded and a number of previous samples, such as five samples, are utilized to compute the average. This has the net effect of removing the fading and multipath components that are present in each RSSI sample as indicated by the time fluctuating dotted line in FIG. 32.

The RSSI signal voltage is representative of the amount of radio voltage present at the input of the radio frequency receiver embodiment 400 as applied to the low noise amplifier 407. The RSSI signal voltage is essentially linear and is a very accurate indication of the distance between the radio frequency receiver 12 and the radio frequency transmitters 14, 16 and 18. The aforementioned double processing steps of integrating or averaging the individual samples and then further integrating or averaging the samples to produce an average which is compared to the output voltage produced by the range control 420 permits an extremely accurate monitoring of distance to be made which permits the user of the radio frequency receiver 12 to accurately determine if any of the radio frequency transmitters 14, 16, or 18 have moved outside the set range 20. The radio frequency receiver 12 has the ability to perform this range determination due to the fact that the output power from each of the radio frequency transmitters 14, 16 and 18 is known and constant as a consequence of their design. Therefore, the RSSI signals, as processed as described above to remove the effect of noise, are directly representative of range information.

This mode of operation is different than ranging systems where the power of the transmitter is typically not known and, therefore, little credibility can be given to a RSSI signal as the basis for measurement of a distance between a radio frequency receiver and a radio frequency transmitter.

As is illustrated in FIG. 32, the particular embodiment as described will have a RSSI voltage which varies between approximately 0.5 and 2.5 volts. This corresponds to a working range between a few feet out to and exceeding 1000 feet of separation between the radio frequency receiver 12 and the radio frequency transmitters 14, 16 and 18 as discussed below. The double integrated or averaged RSSI voltages are used for comparison by the digital signal processor to provide the range and direction control of the radio frequency receiver 12.

The user of the radio frequency receiver 12 uses the variable range control 420 to set the variable distance 20 which determines when the radio frequency receiver 12 generates an alert for the benefit of the user that one or more of the transmitters 14, 16 or 18 have moved outside the set range. As has been explained above, the range control 420 produces a variable range voltage that is presented to the digital signal processor for comparison with the averaged RSSI signals as described above. The digital signal processor is constantly comparing the present voltage representing the set range 20 produced by the range control 420 to the average RSSI voltage which, preferably, is processed with the double integrations, or averages, as described above. For ranges less than approximately fifty feet, the RSSI voltage may become somewhat non-linear, but for ranges exceeding fifty feet, the RSSI voltage will be substantially linear.

When the alert 428 of the radio frequency receiver 400 generates an alert, the user of the radio frequency receiver is alerted that one of the radio frequency transmitters has exceeded the set range 20. The following steps are taken which have been described above generally with respect to FIG. 2. The user of the radio frequency receiver 12 typically would remove the unit from a belt and hold the unit in such a position that the LCD or LED display 424 is readily visible and depress the "find me" switch 426. The digital signal processor senses that the "find me" switch 426 has been closed and changes its operating mode to provide a dynamic display of each successive RSSI signal which as described above is preferably integrated to remove the effects of noise. There is no need at this point for the second integration or averaging process, as described above in conjunction with FIG. 32, because it is only necessary to have constantly updated integrated RSSI samples in accordance with the solid line of FIG. 31 which are indicative of any true relative motion between the radio frequency transmitter 14, 16 or 18 being monitored and the radio frequency receiver. As explained above, the digital signal processor changes the antenna array 405 from a omnidirectional to a directional antenna which permits the radio frequency receiver to orient its received beam width which is represented by the axis 26 of FIG. 2 to a very narrow angle. The user of the radio frequency receiver then can physically rotate the receiver as illustrated in FIG. 2 to an orientation 22 which maximizes the display produced by the LCD or LED display 424. The user of the radio frequency receiver 12 then walks in the indicated direction from which the maximum signal strength is being received to find the radio frequency transmitter 14, 16 or 18 being tracked.

The system 10 is based upon one-way data transmission. A mobile radio frequency transmitter 14, 16, or 18 located, for example, on a child transmits its identification code to the radio frequency receiver 12. In order to synchronize the radio frequency receiver to the radio frequency transmitters, the following procedure takes place upon turn on. The transmitter is first turned on followed by the radio frequency receiver 12. Upon turn on of one radio frequency transmitter, it immediately begins its frequency hopping "chirping" and continues to do so at a fixed rate. When the radio frequency receiver 12 is turned on, it initially camps on a single frequency and awaits to receive a chirp code from the radio frequency transmitter. When the transmitter code is received, the radio frequency receiver 12 then establishes synchronization with the radio frequency transmitter.

The radio frequency receiver 12 will then automatically follow the radio frequency transmitter by arriving at the next sequenced frequency ahead of the radio frequency transmitter and awaiting to receive the identification code. Upon receipt of the identification code from the radio frequency transmitter, the radio frequency receiver continues the stepping process to track the radio frequency transmitter through the entire range of spread spectrum frequencies.

When multiple radio frequency transmitters 14, 16 and 18, as illustrated in FIG. 1 are utilized, a similar camp and wait function is performed by the radio frequency receiver 12 with one slight variation in operational performance. The radio frequency receiver 12 measures the time between the two received transmitted signals and then performs a dual or multiple mode hopping, where it follows each of the sequences of the radio frequency transmitter 14, 16 and 18 correspondingly. Since there is a finite period of time between transmissions and multiple radio frequency transmitters typically are slightly offset in their timing, collision avoidance is enhanced and does not become a problem.

Even with a minimal number of chirp codes and a minimal number of identification codes (e.g., four each) there is a tremendous resilience to interference from the radio frequency transmitters 14, 16 and 18. Different chirp codes reduce the probability of interference to approximately two percent. The identification codes further reduce interference when the same chirp code is present on numerous radio frequency transmitters in a given area. This collision interference avoidance is further enhanced by the fact that even though multiple radio frequency transmitters 14, 16, or 18 may reside in a given area with the same chirp code and the same identification code, the probability of the hop sequences (with fifty frequencies) provides an additional interference probability of less than two percent. This occurs because the probability of multiple radio frequency transmitters 14, 16 or 18 with the same chirp code and identification codes hopping on the same frequency at precisely the same time is extremely low. This interference resistance is further enhanced by the fact that the capture effect of the radio frequency receiver 12 will only select the closest radio signal and therefore, minimizes the same frequency interferences from other radio frequency transmitters in a given area.

It has been discovered that after the synchronization of frequency hopping between the transmitters 14, 16 and 18 and the receiver 12 has been established, the validation of the identification code of each of the transmitters under control of the digital signal processor of the receiver may be based upon a matching of less than all of the identification code digits of each transmitter to qualify the RSSI signal for full signal processing as described above which enhances the sensitivity of the receiver providing range and directional tracking. For example, with a four-digit identification code, matching of two or three identification code digits after synchronization between the frequency hopping transmitters 14, 16 and 18 and receiver 12 is established can be used to qualify statistically reliable RSSI signals which provides highly sensitive distance and directional tracking information as described above. The number of digits of the identification code of each transmitter 14, 16 and 18 necessary to be matched less than the full number of identification code digits depends on the application and the number of digits used in the identification code. As a result, weak transmissions from the transmitters 14, 16 and 18 which are close to the signal to noise limit of the receiver 12 may be validly processed to enhance the operation of the ranging and directional finding functions as described above.

In order to gain insight as to the reliability and ranging characteristics of the present invention, an evaluation of the components of the radio signal from the radio frequency transmitters 14, 16 and 18 to the radio frequency receiver 12 is made. The final power is amplifier PA2 of the radio frequency transmitter has an output of approximately five milliwatts. In the radio environment, typically these radio powers are expressed in dbm (five milliwatts would equal a +7 dbm power level).

The antenna in the radio frequency transmitters 14, 16 or 18 is very small and is approximately a quarter wavelength. This provides a gain of typically zero dbm. However, because of the shielding constraints of the housing of the radio frequency transmitter and the fact that it is worn on a person's belt, the anticipated gain will be −10 dbm. This provides an actual radiated power of −3 dbm at the antenna.

Figure 33:
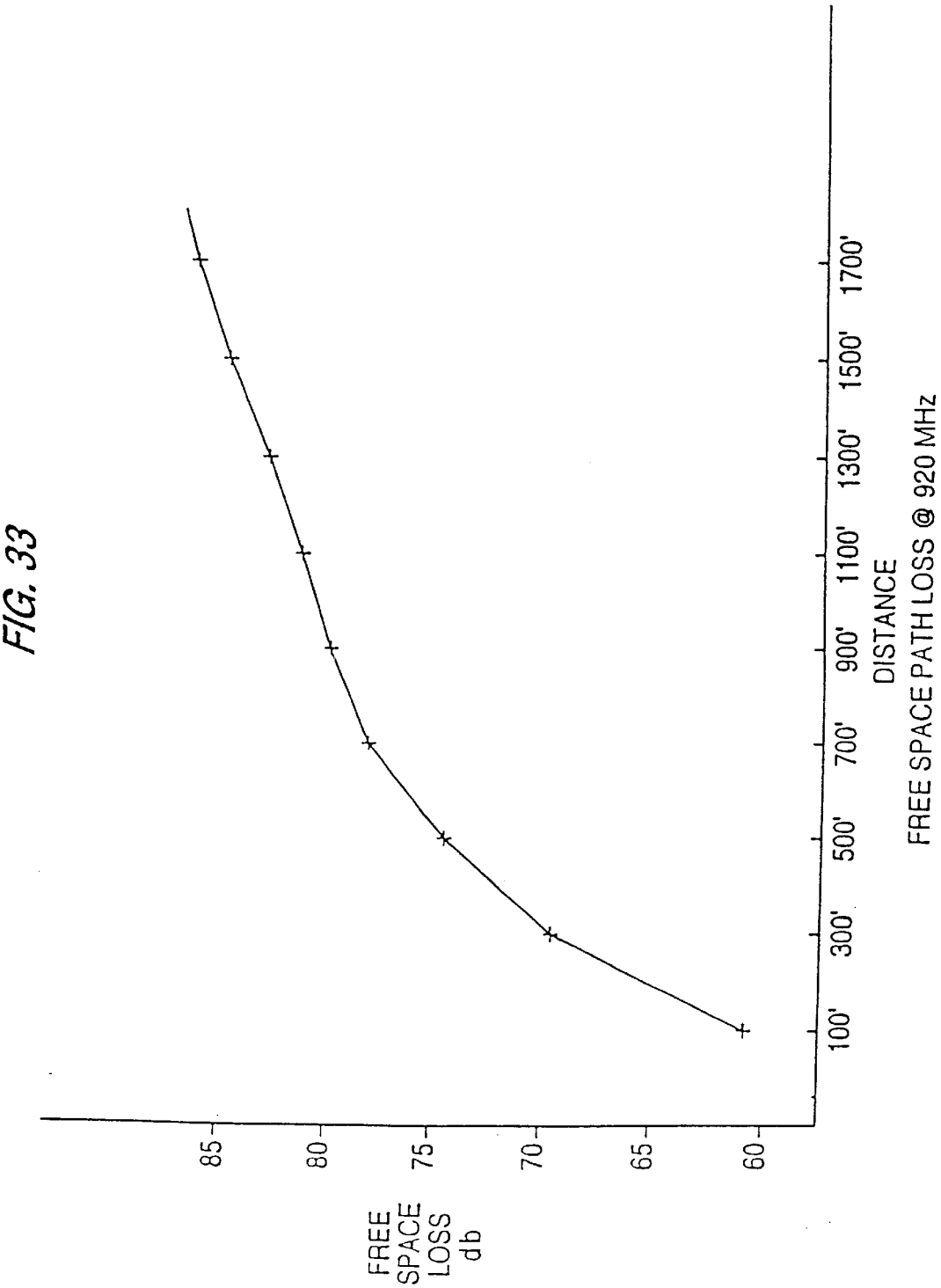
FIG. 33 is a graph of free space loss in db as a function distance between the radio frequency receiver and the radio frequency transmitter.

The path loss at 920 MHz. varies proportionally with distance. Although the formulas to support these calculations are not stated herein, the empirical results are illustrated in FIG. 33. FIG. 33 plots the free space loss in dbm as a function of the distance between the radio frequency transmitters 14, 16 or 18 and the radio frequency receiver 12. It should be noted that at approximately 100 feet there is 62 dbm path loss and that increases to approximately 86 dbm at 1700 feet.

The antenna 405 of the radio frequency receiver embodiment 400 has the net gain of −10 dbm. The radio frequency receiver input sensitivity is a −115 dbm and therefore, when added to the antenna gain (actually a loss), a −105 dbm receiver sensitivity is achieved at the antenna input terminals.

Mathematically, it can be seen that a −85 db path loss added to a −3 db loss at the antenna results in a −88 db signal presented to the radio frequency receiver including antenna loss having the sensitivity of a −115 db. The net result is approximately a 30 db difference over and above what the radio frequency receiver embodiment 400 needs as an acceptable signal level and therefore, the radio frequency receiver should work to a distance reliably of at least 1700 feet.

Two factors contribute additional loss which are body and building attenuation. Attenuation on a human body at 900 MHz. is approximately 10 db. The attenuation in a residence (typical, wood, aluminum, or brick structure) is also 10 db. When collectively added together, an additional 20 db of loss occurs in the path by the effects of the home residence as well as the possibility that a person is facing away from the home and therefore, the radio signal must penetrate through the body of the user of the radio frequency receiver 12. At a 1700 foot distance, this leaves an adequate signal reserve of 10 dbm.

Figure 34:
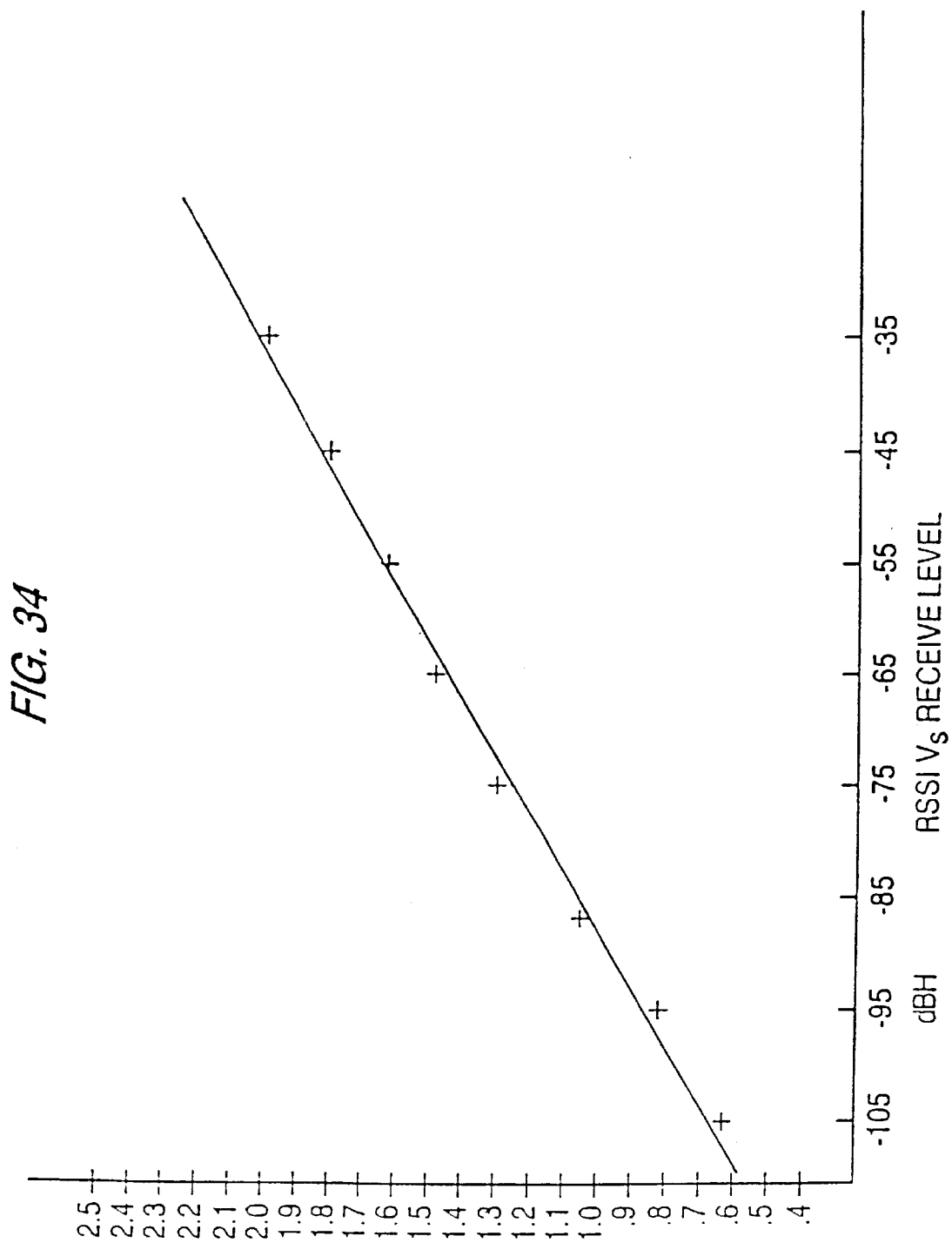
FIG. 34 is a graph of the RSSI voltage as a function of the received signal level in dbm.

FIG. 34 illustrates the relationship between the input field strength and the RSSI signal voltage. This voltage varies between approximately 0.5 and 2.5 volts depending upon the received radio field strength. This wide dynamic range permits the radio frequency receiver embodiment 400 to readily determine the relationship between distance and voltage when the double averaging/integration processes described above are used to remove the electrical noise, Rayleigh fading and multipath anomalies that typically exist in the RSSI signal prior to processing by the digital signal processor. There is approximately a 20 db margin which permits the radio frequency receiver in a non-noisy environment to operate at distances approaching a mile.

FIG. 35 illustrates free space loss over a distance of up to one mile. As can be seen, the radio frequency receiver 400 may have the capability of operating at a distance as great as one mile providing that there are no additional attenuations to minimize the path loss.

Furthermore, the design of the antennas of the radio frequency receiver 12 and the radio frequency transmitters 14, 16 and 18 may be optimized to emphasize the most accurate range readings for separation distances between 100–900 feet.

This is monitoring range is adequate for most distance monitoring functions involving people such as small children. However, variations may be made to permit tracking up to a distance of a mile.

In an extended range version, the radio frequency receiver 12 will immediately return to a single frequency until the radio frequency transmitter 14, 16 or 18 identification code is again received to reestablish synchronization. This permits a complete loss of the transmitted signal to occur and by a person moving around in a search pattern an attempt may be made to reestablish synchronism with the radio frequency transmitter 14, 16 or 18 which is being tracked and to begin the directional tracking process.

FIGS. 36–38 illustrate the present invention being used by a user 600 to directionally track a transmitter 18 and a preferred design of a housing 614 for the receiver unit 12' which enhances the sensitivity of the reception by the receiver unit as a consequence of requiring the user to hold the receiver unit in the user's hand 602 at a position spaced away from the body and in elevated positions preferably at least at chest height. As illustrated in FIG. 36, the receiver unit 12' may be held away from the body in the hand 602 of the user 600 in a range of elevated positions 611 between waist level and eye level. The range of elevated positions includes substantially at arm's length at or slightly above waist height depending upon the length of the user's arms as indicated in phantom at position 604, away from the body substantially at arm's length at or slightly above chest height as indicated in solid lines at position 606 or away from the body as illustrated in phantom at position 608 substantially at eye level. The transmitter 18 produces transmissions 610 which travel in a line of sight to the receiver unit 12' as indicated. The height 611 represents a range of vertical orientations in which the display 424 of FIG. 14 may be viewed. The sensitivity of reception by the receiver unit 12' is enhanced both by positioning of it away from the body to provide for reception closer to free space conditions and further to enhance the height of the receiver unit which also enhances receiver reception sensitivity. As illustrated, it is desirable to space the receiver unit 12' one or more wavelengths nλ away from the body of the user 600 indicated by the distance 612 in FIGS. 36 and 38 to provide conditions which are more representative of free space reception to enhance the sensitivity of the reception of the transmissions 610 from the transmitter 18.

Enhancement of the sensitivity of reception of the transmissions 610 is highly desirable for a low power battery operated unit which operates at a maximum typically of 100 milliwatts or below in accordance with FCC regulations for spread spectrum transmissions. Enhanced sensitivity of reception of the transmissions 610 provides improved monitoring of the transmitters 14, 16, and 18 at the greatest possible range from the receiver unit 12' and further greater capability for performing directional tracking of the transmitters 14, 16 and 18 as described above.

As illustrated in FIG. 37, the transmitter unit 12' is preferably contained in a plastic housing 614 which contains the electronics described above in a surface mounted circuit board including the display 424 to provide a visual indication of the magnitude of the received signal strength of the transmissions 610 from the transmitter 18 to facilitate directional tracking as described above. The detailed electronics of the receiver 12 of the receiver unit 12' have been omitted from FIGS. 36 and 37 and preferably are as described above. As illustrated in FIG. 37, the switch 426 is mounted in the housing 614 and is electrically coupled to the receiver electronics to activate the directional antenna function. The switch 426 has a first position at which the directional antenna 431 is not operative to receive the radio transmissions 610 from the at least one radio transmitter 18 and a second position at which the directional antenna is operative to receive the radio transmissions from the at least one radio transmitter.

The switch 426 is positioned relative to the housing 614 so that the hand 602 of the user 600, including the thumb 616, holds the switch in the position to activate the directional antenna 431 such that the directional antenna is positioned relative to the housing so that during the holding the switch in the second position by the user's hand, a line of sight of the transmissions 610 exists between the directional antenna and the at least one transmitter which is not occluded by the user's hand as illustrated holding the switch in the second position.

A field of view limiter 618 limits light emanating from the display 424 to a field of view of the display when the user 600 holds the receiver unit in the user's hand away from the body of the user as illustrated in FIG. 36. The field of view with reference to FIG. 36 is limited to planes extending upward from a plane of sight 620 extending from the eyes 621 of the user 600 downward and intersecting a horizontal plane 622 extending from or slightly above the user's waist substantially at arm's length as illustrated by the lower phantom position 604 in FIG. 36. Acceptable planes in the field of view are those planes rotated upward from plane of sight 620 from the lower phantom position 604 to and above the upper phantom position 608 illustrated in FIG. 36. Each of these upward extending planes beginning with the plane of sight 620 extending from the eyes 621 of the user 600 to the lower phantom position 604 to and above the upper phantom position 608 require the user to hold the receiver unit 12' away from the body and at successively higher positions which enhances reception by causing the receiver unit to be positioned closer to a free space condition and further vertically upward within the range 611 for enhancing receiver sensitivity by spacing the receiver away from the ground. As illustrated, preferably nλ multiple wavelengths 612 space the receiver unit 12' away from the user 600 when the receiver unit is positioned in the upwardly extending planes as described above while viewing the display 424 to directionally track the transmitter 18.

As illustrated in FIG. 37, the position 608 of holding the housing 614 of the receiver unit 12' is such that the display 424 for displaying the strength of the received transmissions 610 from the transmitter 18 during directional tracking is in the line of sight of the eyes 621 of the user 600 to the display 424 which is located in a recess 623 having ends defined by bottom 624 and an opening 626 within the housing 614. In a preferred embodiment of the present invention, the display 424 is surface mounted on a circuit board (not illustrated) containing the receiver electronics as described above. As can be seen from FIG. 37, the field of view limiter 618 is set in the housing 614 in front of the directional antenna 431 with reference to the line of sight extending between eyes 621 of the user 600 and the at least one transmitter 18.

FIG. 38 illustrates an enlarged view of the field of view limiter 618. The field of view limiter 618 is set in the recess 623 in the housing 614 in opening 626 extending inward from outer surface 628 of the housing. The display 424 is located at the bottom 624 of the opening 626 preferably as stated above as part of a surface mount on a circuit board containing the receiver electronics. However, it should be understood that the invention is not limited to the surface mounting of the display 424 on the circuit board of the receiver electronics.

The field of view is defined by a pair of lines 630 and 632 representing light rays respectively extending from opposed edges 634 and 636 of the display 424 to opposed edges 636 and 638 of the opening 626 respectively. The angle 640 subtended by the straight lines 630 and 632 may be as great as 450 with 300 or less being preferred. The aforementioned angular ranges require the user 600 when holding the receiver unit 12' in the user's hand 602 to position the receiver unit within an angular orientation such that the line of sight of the user extends from the user's eyes 621 permitting light rays 630 and 632 to travel from the bottom 624 of the opening 626 to the user's eyes 621.

With the configuration of the housing 614, as illustrated in FIG. 37, including the positioning of the switch 426, directional antenna 431 and the field of view limiter 618 relative to the housing, the user 600 must position the receiver unit 12' between positions 604, 606 and 608 and above away from the body and in planes at or above plane of sight 620 as illustrated in FIG. 36. With this set of spatial conditions, when the hand 602 of the user 600 holds the directional antenna activating switch 426 in the position activating the directional antenna 431, the transmissions 610 extend directly between the directional antenna of the receiver unit 12' and the antenna of the transmitter 18, without signal attenuation or radio interference introduced by the holding of the receiver unit in the hand 602 of the user 600 in the line of sight between the antennas of the receiver unit 12' and the at least one transmitter unit 14, 16 and 18. Furthermore, the field of view limiter 618 enhances reception by causing the user to hold the receiver unit 12 in an elevated position away from the body of the user 600 to make the display 424 visible.

While a preferred form of the field of view limiter 618 is as illustrated in FIG. 38, it should be understood that other optical or mechanical mechanisms or combinations thereof may be used, which prevent the user 600 from seeing the display 424 when the receiver unit 12' is held in positions close to the body in a lowered position, with the practice of the invention. Such field of view limiters could include other optical elements such as lenses and/or reflective surfaces alone or in combination with the recess 623 as illustrated in FIGS. 37 and 38.

Figure 39:
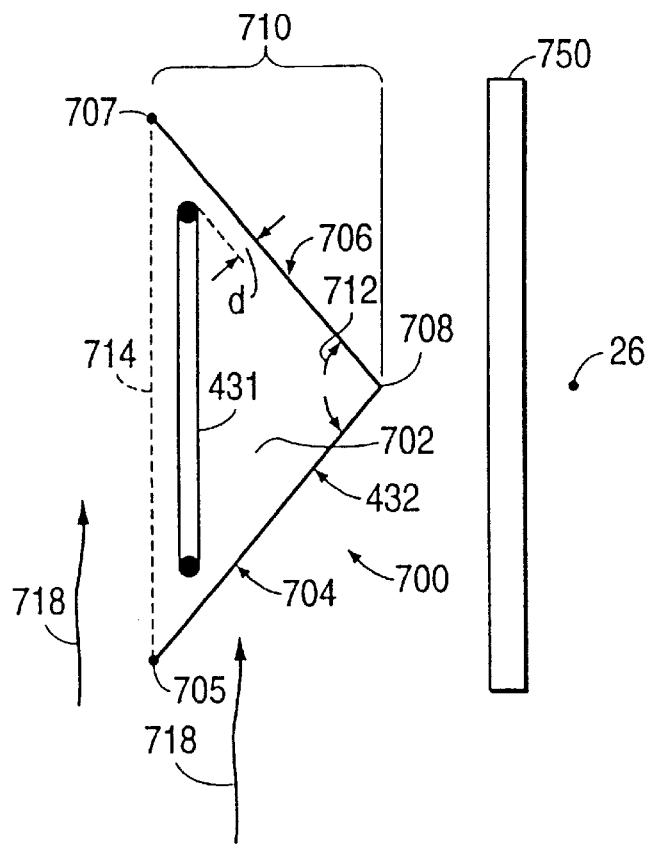
FIG. 39 illustrates a top view of a preferred antenna assembly of the present invention including an electrically conductive loop and an electrically conductive reflector without illustration of electrical connections therebeteen.

FIG. 39 illustrates a top view of a preferred antenna assembly of the present invention, including the electrically conductive loop 431 and the electrically conductive reflector 432 without illustration of the electrical connections therebetween which are illustrated in detail as described below in conjunction with FIG. 42. The antenna assembly 700 has a cavity 702 which is defined by a surface, including a first part 704 having an end 705 and a second part 706 having an end 707. Ends of the first part 704 and the second part 702, which respectively are remote from the ends 705 and 707, meet at the bottom of the cavity 708 in a vertex. While the cavity is preferably triangular in cross section, it should be understood that the invention is not limited to a triangular cross sectional cavity. The cavity has a depth 710 which is defined between the bottom 708 and the ends 705 and 707. The first part 704 and second part 706 define an oblique angle 712, having the vertex which is at the bottom 708, which may be varied so as to accommodate the containment of the loop 431 at least partially, and preferably totally, within the cavity 702 between the bottom 708 and the opening 714. As the width of the loop 431 increases relative to reflector 432 as viewed in FIG. 39, it may be necessary for the oblique angle to increase to accommodate the loop within the cavity 702. The respective ends 705 and 707 of the first part 704 and the second part 706 define the opening 714. As illustrated, the loop 431 is positioned between the bottom 708 and the opening 714 of the cavity 702. A closest spacing d between the conductive loop 431 and the reflector 432 is varied to change the beam width of the maximum signal response produced by the antenna assembly when it is operated in a directional mode as described below. The closest spacing d is preferably not greater than one-tenth of a wavelength of the frequency band of the radio transmissions and more preferably, ranges between 0.005 and 0.02 of a wavelength of the frequency band. As illustrated, the first part 704 and the second part 706 of the reflector 432 shield the loop 431 from receiving side lobe radiation 718 which enhances the directional response of the antenna assembly. Furthermore, as described below in conjunction with FIG. 42, the electrical conductive coupling between the loop 431 and the reflector 432 produced by the closing of the RF switch 406 and the capacitive coupling caused by the parasitic capacitances further enhances the omnidirectional function of the antenna assembly by providing increased signal response consequent from the combined conductive and capacitive coupling between the loop 431 and the reflector 432. Finally, circuit board 750 has the RF amplifier, digital signal processor and other components mounted thereon, as described above in conjunction with the receiver embodiment 400, as illustrated in FIGS. 14–20. The circuit board 750 is located farther from the electrically conductive loop 431 than the vertex 708. The antenna reflector 432 is connected to the board 750 with supports (not illustrated) which extend from the board and are soldered to the backside of the reflector. The loop 431 is connected to the board 750 with the circuit connections illustrated in FIG. 42 discussed below.

Figure 41:
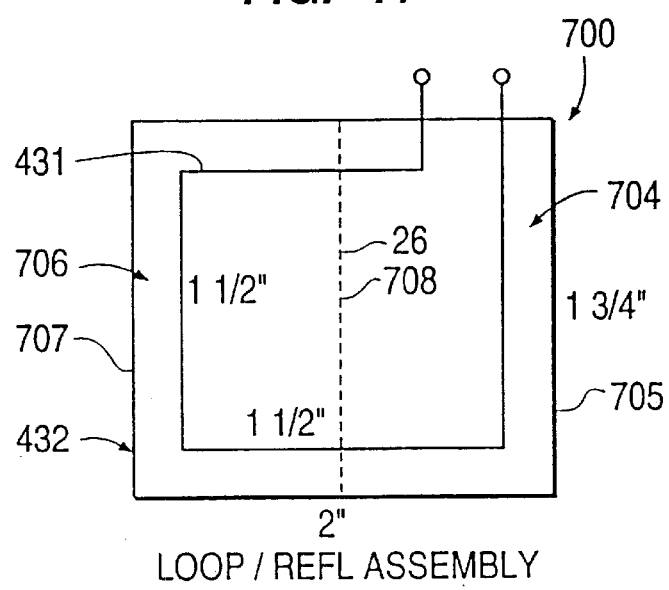
FIG. 41 illustrates a front elevational view of the antenna assembly of FIG. 39, including dimensions for optimized operation in the 902 to 928 MHz. frequency band.
Figure 40A:
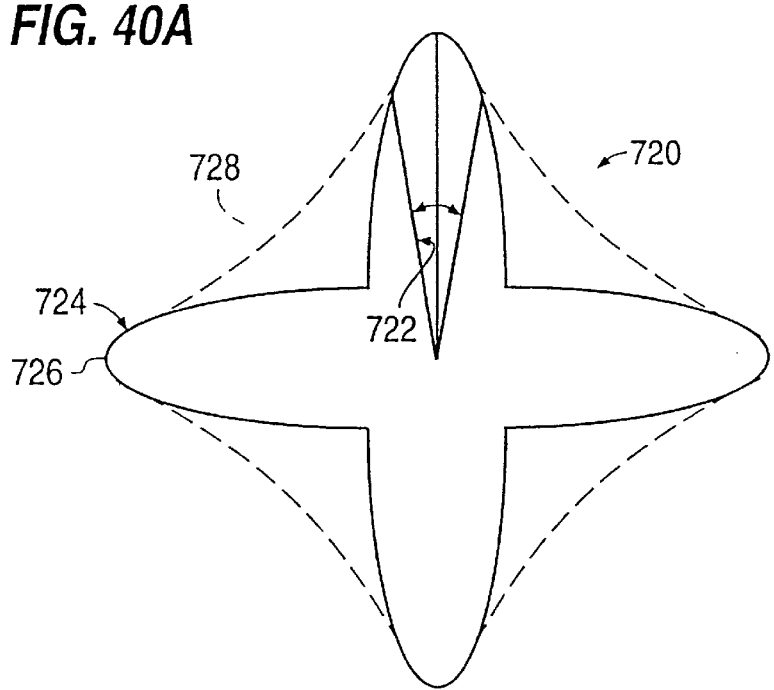
FIGS. 40A and 40B illustrate a composite antenna, response of the antenna assembly of FIG. 39 including illustrating the effects respectively of increasing spacing between a closest separation of the loop and the reflector on the beam width of the directional antenna response.
Figure 40B:
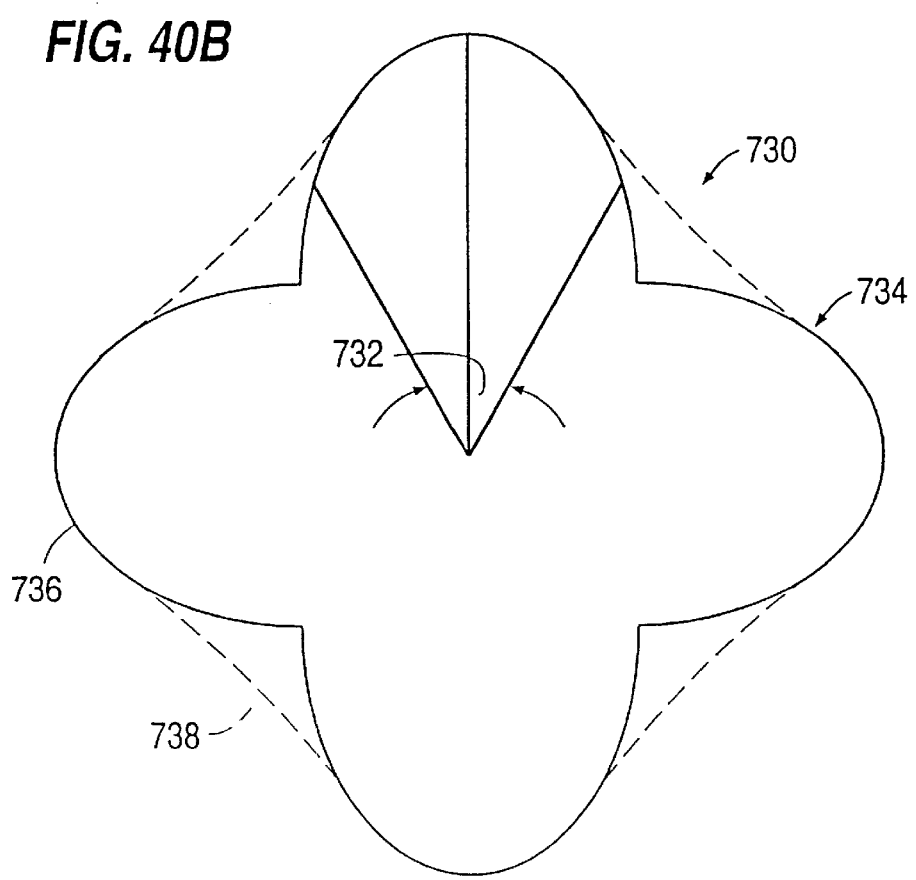

FIGS. 40A and 40B illustrate a composite directional and omnidirectional antenna response, which is not drawn to scale, of the antenna assembly 700 of FIG. 39. FIG. 40A illustrates a beam width 722 of approximately 10° which is achieved with a preferred spacing d of approximately 0.2 inches when the antenna assembly is operated in the 902–928 MHz. band with the dimensions as illustrated in FIG. 41. The combined antenna response 720 includes the aforementioned beam width 722 of approximately 10° when operated in a directional mode and further includes an omnidirectional response 724 which does not contain the aforementioned directional response 722. The omnidirectional response 724 includes lobes 726 which are omnidirectional as illustrated and further an enhanced response 728 which is consequent from the aforementioned electrical coupling between the loop 431 and the reflector 432. The enhanced response 728 has been confirmed with testing to improve the overall omnidirectional reception of the antenna assembly 700. The presence of electrical coupling between the loop 431 and the reflector 432 enhances the overall omnidirectional response so that signal response is enhanced between the individual lobes 726 with the enhanced response 738.

FIG. 40B illustrates a combined antenna response 730 of directional and omnidirectional components, which is also not drawn to scale, of the same type as illustrated in FIG. 40A except that the spacing d between the loop 431 and the reflector 432 has been decreased to 0.1 inches. The beamwidth 732 is approximately 30°. The complete omnidirectional response characteristic 734, which is analogous to that of FIG. 40A, includes lobes 736 which would be achieved from the loop 431 without the reflector 432 being electrically coupled thereto. The enhanced response 738 has been conformed with testing to improve the overall omnidirectional reception of the antenna assembly 700 and is generally less desirable than the response characteristic of FIG. 40A in view of the directivity being less sensitive which makes direction finding more difficult.

A comparison of the directional antenna response characteristics of FIGS. 40A and 40B clearly reveals that the beam width narrows as the loop 431 is moved from a closest preferred spacing d of 0.1 away to 0.2 inches from the reflector 432. Thus, placement of the loop 431 relative to the reflector 432 may be used to focus the beam width of maximum response (sensitivity) and is a mechanism for fine tuning directivity.

FIG. 41 illustrates a front elevational view of the antenna assembly 700 including dimensions for optimized operation in the 902–928 MHz. band for use in a hand-held radio receiver 12 for monitoring whether the transmitters 14, 16 and 18 are within a set range from the radio receiver and further directional tracking of the radio transmitter. As illustrated, the reflector 432 is rectangular in cross section and has a length and a width less than 2.5 inches with the preferred dimensions as indicated of a width of 2 inches and a height of 1.75 inches. Furthermore, the loop 431 is square in cross section and is an inch and a half on each side with the exception of the output at the top of the reflector 432. As illustrated, the loop 431 is symmetrically disposed relative to the bottom and vertex 708 and the antenna axis 26 which are collinear when viewed from the perspective of FIG. 41. As described above, the oblique angle formed with the bottom and vertex 708 and the sides 704 and 706 may be varied to accommodate loops 431 of different widths relative to the width of the reflector as illustrated in FIG. 39 so as to accommodate the loop 431 within the cavity 702 as well as varying the spacing d between the loop 431 and the reflector 432 to vary or focus the beam width. It should be understood that the dimensions of the antenna assembly 700, as illustrated in FIG. 41, are optimized for a radio receiver as described above operating in the 902–928 MHz. band as described above and may be varied to accommodate operation in receivers in different frequency bands having different form factors.

Figure 42:
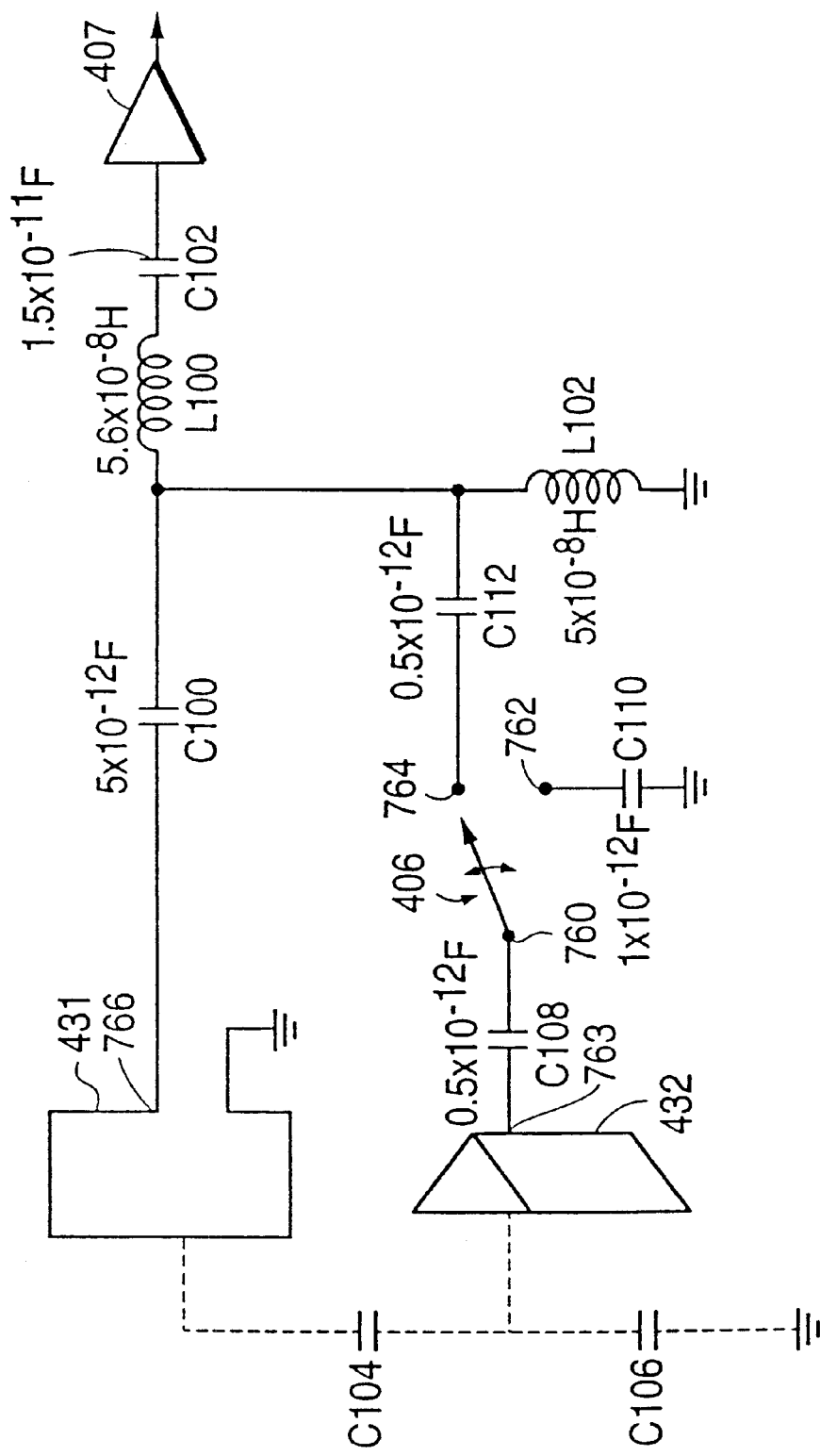
FIG. 42 is a circuit schematic illustrating a preferred embodiment of the antenna assembly of FIG. 39 for operation in the 902–928 MHz. frequency band.

FIG. 42 illustrates an electrical schematic of the antenna assembly 700 as illustrated in FIG. 39. As illustrated, RF switch 406 has an input 760, a first output 762 and a second output 764. The switch 406 has first and second switching states which are controlled by the control processor 402 which is preferably a digital signal processor as described above. The loop 431 is coupled to ground and has an output 766 for coupling to the RF amplifier 407 through capacitor C100, inductor L100 and capacitor C102 to RF amplifier 407. The electrically conductive loop 431 has a length between output 766 and ground greater than 0.2 times the wavelength of the frequency band of the received radio transmission. Furthermore, parasitic capacitance C104 couples the loop 431 to the reflector 432 and further to ground through parasitic capacitance C106. As described above, the parasitic coupling of the loop 431 to the reflector 432 contributes to the enhancement of the omnidirectional signal response. The reflector 432 is also coupled via output 763 to the input 760 of the switch 406 by capacitor C108. The first output 762 of the RF switch 406 is coupled to ground through capacitor C110. The second output 764 of the RF switch 406 is coupled to the loop 431 through a conductive path including capacitor C112 and the aforementioned capacitor C100. Additionally, the second output 764 is coupled to ground through inductor L102.

Surprisingly, as discussed above, movement of the loop antenna 431 from the closest separation distance d from a spacing of 0.2 inches to 0.1 inches increases the beam width from 10° to 30°. A narrowed beam width providing greater directional sensitivity is highly desirable with the use of the antenna assembly in a preferred application of a direction tracking receiver as described above.

Furthermore, the feed resistance of the loop antenna with a close spacing to the reflector is substantially increased over that which is achievable with a loop antenna alone. Thus additionally, the containment of the loop antenna 431 within the cavity 702 with the electrical conductivity between the loop and the reflector as described above, facilitates impedance matching with standard impedances such as commercially available integrated RF amplifiers which have input impedances such as 50 ohms which are readily matched to an impedance in a range between 20–40 ohms which is achieved with the antenna assembly as described above in the 902–928 MHz. band.

Finally, the parasitic capacitances C104 and C106 form a divider network effectively lowering the amount of transmitted signal, received by the reflector 432, from being coupled to the loop antenna 431 which reduces side lobes 718 as discussed above when operating in a directional mode.

While the invention has been described in terms of its most preferred implementation of an antenna assembly designed for operation in the 902–928 MHz. frequency band, it should be understood that the antenna assembly may be used in other frequency bands, such as without limitation, between 800 MHz. to 2 or more gigahertz where an antenna assembly of small size is required to perform the dual selective functions of omnidirectional and directional reception. Furthermore, the dimensions, form factors and circuit components may be changed while utilizing the antenna assembly in other applications than the receiver discussed above. It is intended that all such changes fall within the scope of the appended claims.

What is claimed is:

1. An antenna assembly providing selectable omnidirectional or directional reception of radio transmissions in a frequency band comprising:

an electrically conductive reflector defining a cavity having a bottom, an opening, a surface extending from the bottom to the opening and an electrical output; and an electrically conductive loop electrically coupled to ground and having an electrical output for coupling to an RF amplifier, the loop being positioned between the bottom and the opening of the cavity.

* * * * *